US006759827B2

(12) United States Patent
Kawashima

(10) Patent No.: US 6,759,827 B2
(45) Date of Patent: Jul. 6, 2004

(54) CONTROL CIRCUIT OF BRUSH-LESS MOTOR, CONTROL CIRCUIT OF SENSOR-LESS BRUSH-LESS MOTOR, BRUSH-LESS MOTOR APPARATUS, SENSOR-LESS BRUSH-LESS MOTOR APPARATUS AND VACUUM PUMP APPARATUS

(75) Inventor: Toshiaki Kawashima, Chiba (JP)

(73) Assignee: BOC Edwards Japan Limited, Tokyo (JP)

( * ) Notice: Subject to any disclaimer, the term of this patent is extended or adjusted under 35 U.S.C. 154(b) by 0 days.

(21) Appl. No.: 09/955,389

(22) Filed: Sep. 18, 2001

(65) Prior Publication Data

US 2002/0047683 A1 Apr. 25, 2002

(30) Foreign Application Priority Data

Sep. 18, 2000 (JP) ........................................ 2000-281277
Sep. 28, 2000 (JP) ........................................ 2000-295981
Aug. 8, 2001 (JP) ........................................ 2001-240133

(51) Int. Cl.$^7$ ............................................... H02P 7/00
(52) U.S. Cl. .................................... 318/727; 318/439
(58) Field of Search ................................ 318/138, 254, 318/439, 720–724

(56) References Cited

U.S. PATENT DOCUMENTS

| 4,641,066 | A | * | 2/1987 | Nagata et al. | 318/254 |
| 4,709,199 | A | * | 11/1987 | Wang et al. | 318/696 |
| 4,983,894 | A | * | 1/1991 | Oku et al. | 318/138 |
| 5,134,349 | A | * | 7/1992 | Kruse | 318/254 |
| 5,367,234 | A | * | 11/1994 | DiTucci | 318/254 |
| 5,635,810 | A | * | 6/1997 | Goel | 318/719 |
| 5,969,491 | A | * | 10/1999 | Viti et al. | 318/254 |
| 6,064,175 | A | * | 5/2000 | Lee | 318/809 |
| 6,066,929 | A | * | 5/2000 | Kang | 318/254 |
| 6,111,333 | A | * | 8/2000 | Takahashi et al. | 310/90.5 |

* cited by examiner

*Primary Examiner*—Robert Nappi
(74) *Attorney, Agent, or Firm*—Adams & Wilks

(57) ABSTRACT

To provide a control circuit or the like of a brush-less motor capable of properly controlling current of motor windings by detecting positions of magnetic poles of a rotor at a rotational frequency of the rotor from low rotation which cannot lock a PLL circuit to steady-state rotation for rotating at high speed. Positions of magnetic poles are detected by a change in a magnetic flux (magnetic flux signal) of motor windings caused by rotating a rotor having the magnetic poles, thereby, a synchronizing signal (ROT signal) in synchronism with rotation of the rotor is generated. When the rotor is rotated at a low rotational frequency which cannot lock a PLL circuit, the rotor is driven by using predetermined two driving voltage vectors among outputable driving voltage vectors and when a rotational frequency capable of locking the PLL circuit is reached, the rotor is driven by successively outputting the outputable driving voltage vectors in synchronism with the positions of the magnetic poles detecting the outputable driving voltage vectors. Further, the magnetic flux signal is provided by using voltage between two phases at which phases and magnitudes of voltage drop caused by inductances of motor windings are equal to each other.

20 Claims, 32 Drawing Sheets

FIG. 7

| Y | DRIVING VOLTAGE VECTOR | PHASE LAG AMOUNT D |
|---|---|---|
| Y<1/12 OR Y≦11/12 | 5 | 1/12-Y OR 12/12-Y |
| 1/12≦Y<3/12 | 6 | 3/12-Y |
| 3/12≦Y<5/12 | 1 | 5/12-Y |
| 5/12≦Y<7/12 | 2 | 7/12-Y |
| 7/12≦Y<9/12 | 3 | 9/12-Y |
| 9/12≦Y<11/12 | 4 | 11/12-Y |

Prior Art

FIG. 23

| DRIVING VOLTAGE VECTOR | DIRECTION OF CURRENT | TRANSISTOR MADE ON |
|---|---|---|
| 1 | U→V | 21a, 21d |
| 2 | U→W | 21a, 21f |
| 3 | V→W | 21c, 21f |
| 4 | V→U | 21c, 21b |
| 5 | W→U | 21e, 21b |
| 6 | W→V | 21e, 21d |

FIG. 24A
FIG. 24B
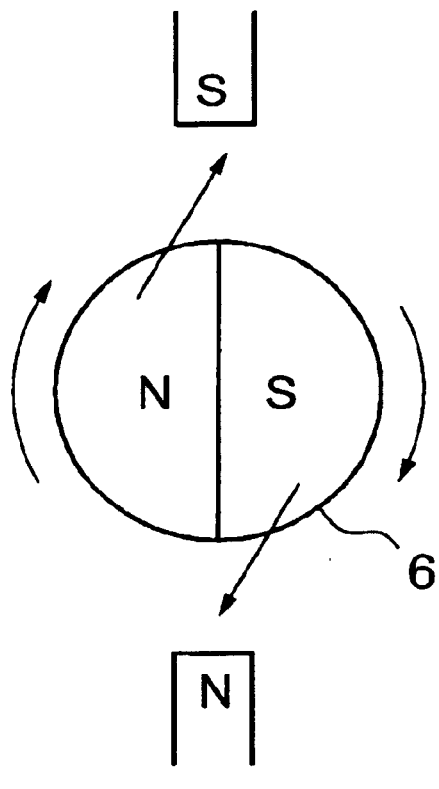
ACCELERATION
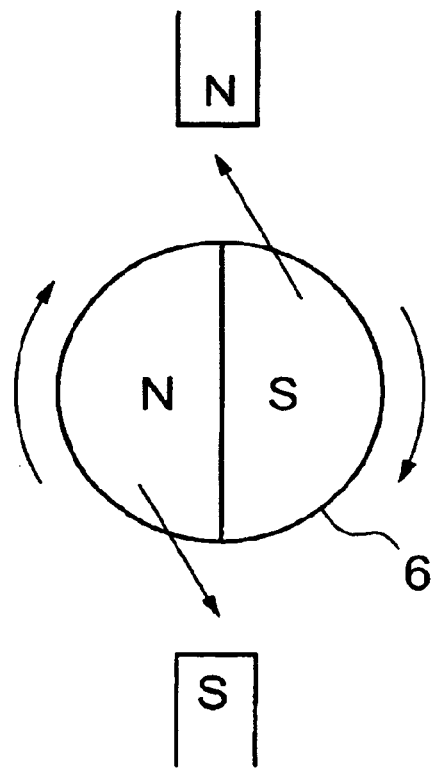
DECELERATION

FIG.26A
OUTPUT OF DIFFERENTIAL
AMPLIFIER 8
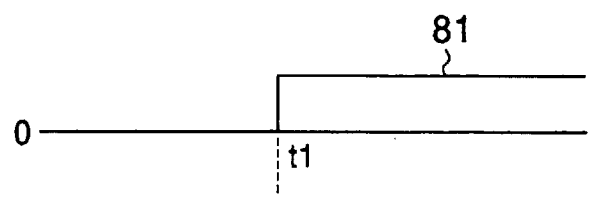
FIG.26B
OUTPUT OF DIRECT
CURRENT CUT FILTER 2
(WHEN Rp IS NULLIFIED)
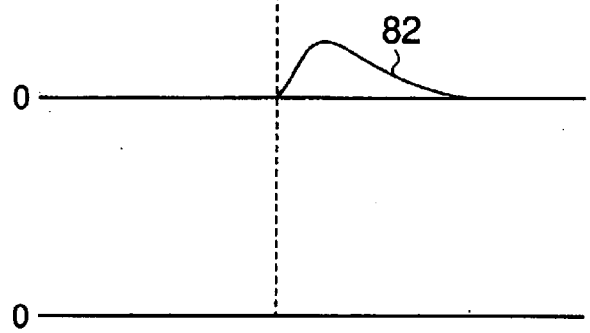
FIG.26C
OUTPUT OF DIRECT
CURRENT CUT FILTER 2
(WHEN Rp IS OUTPUTTED)

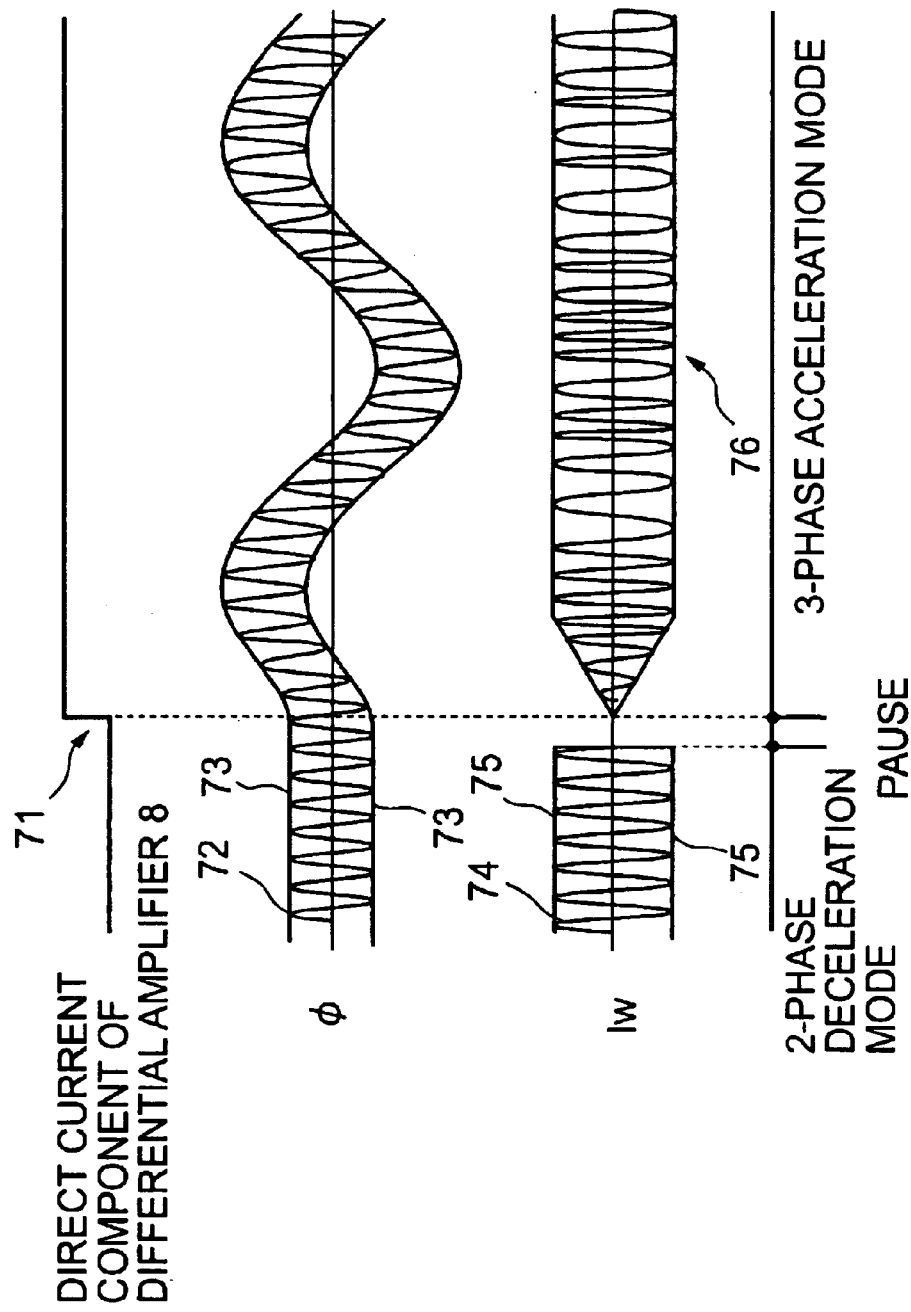

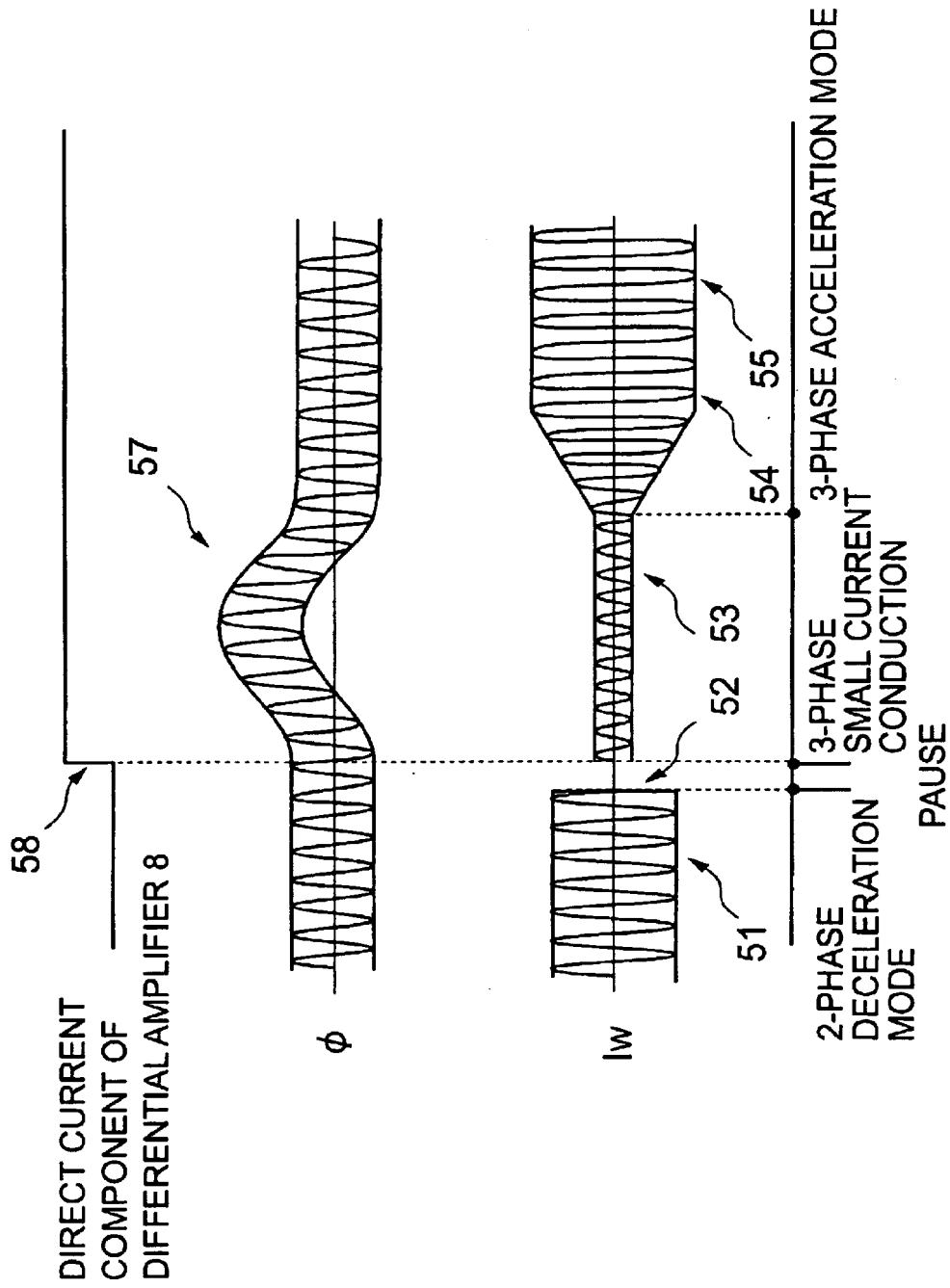

CONTROL CIRCUIT OF BRUSH-LESS MOTOR, CONTROL CIRCUIT OF SENSOR-LESS BRUSH-LESS MOTOR, BRUSH-LESS MOTOR APPARATUS, SENSOR-LESS BRUSH-LESS MOTOR APPARATUS AND VACUUM PUMP APPARATUS

BACKGROUND OF THE INVENTION

1. Field of the Invention

The present invention relates to a brush-less motor, a control circuit thereof and the like, relates to a constitution used in a vacuum pump of, for example, a vacuum pump of a magnetic bearing type turbo-molecular pump or the like or a magnetic bearing spindle or the like.

2. Description of the Related Art

Conventionally, starting a brush-less motor is carried out as follows.

There is a brush-less motor having a rotor having a permanent magnet of two poles and three motor phase windings for generating a magnetic field for rotating the rotor at its surrounding.

In such a brush-less motor, there is a constitution in which as a sensor-less brush-less motor control circuit which is not provided with a sensor for detecting positions of magnetic poles, current for driving the motor is made to flow to two motor windings in three motor windings to thereby rotate a rotor, by rotating the rotor, positions of magnetic poles of the rotor are detected from induced electromotive force produced in a remaining one of the motor windings and based on the positions of the magnetic poles, the current of the motor winding is successively switched.

An explanation will be given of an example of the above-described conventional brush-less motor control circuit in reference to FIG. 8 and FIG. 9.

FIG. 8 is a conceptual view representing a brush-less motor of a three-phase all wave system. A rotor 150 is provided with a permanent magnet of two poles. There are arranged U-phase, V-phase and W-phase motor windings 151U, 151V and 151W around the rotor. Current is made to flow to excite two of the motor windings and the rotor 150 is rotated by attractive force of magnetic force thereof. Excited ones of the motor windings 151U, 151V and 151W are successively switched in accordance with positions of the magnetic poles of the rotor 150 to thereby continue rotating the rotor 150. The positions of the magnetic poles are detected by detecting voltage induced in a remaining one of the motor windings which is not excited.

As shown by FIG. 9, there are six kinds of driving voltage vectors outputted to the motor windings 151U, 15V and 151W of the brush-less motor of the three-phase all wave system.

The driving voltage vector when current is made to flow from the U-phase motor winding to the V-phase motor winding is defined as driving voltage vector 1, the driving voltage vector when current is made to flow from the U-phase motor winding to the W-phase motor winding is defined as driving voltage vector 2, the driving voltage vector when current is made to flow from the V-phase motor winding to the W-phase motor winding is defined as driving voltage vector 3, the driving voltage vector when current is made to flow from the V phase motor winding to the U-phase motor winding is defined as driving voltage vector 4, the driving voltage vector when current is made to flow from the W-phase motor winding to the U-phase motor winding is defined as driving voltage vector 5, the driving voltage vector when current is made to flow from the W-phase motor winding to the V-phase motor winding is defined as driving voltage vector 6 and hereinafter, the driving voltage vectors will be distinguished from each other by the numerals.

The numerals of the driving voltage vectors are indicated by circling the numerals in FIG. 9.

Further, current which is made to flow from the V-phase motor winding to the W-phase motor winding is described as current in V→W direction and the like.

The control circuit of the motor generates one pulse per rotation of the rotor 150 in synchronism with the rotation of the rotor 150 from detected positions of magnetic poles. The pulse is inputted to a PLL (Phase Lock Loop) circuit, not illustrated, and the PLL circuit generates six pulses each having a period six times as much as rotation of the rotor 150. In synchronism with the six pulses, the above-described six driving voltage vectors are successively switched to thereby continue rotating the rotor 150. That is, the positions of the magnetic poles of the rotor 150 are detected from voltage of the motor winding constituting conductless phase and the voltage vectors outputted to the motor windings 151U, 151V and 151W are switched while carrying out a feedback by the detected values.

Meanwhile, in order to lock (operate) the PLL circuit, at least about 20 Hertz is needed for a frequency of an input signal. That is, unless the rotor 150 is rotated by about 20 times per second, the PLL circuit cannot be operated.

Conventionally, until the motor is started and a rotational number of the rotor 150 is increased to a rotational number capable of locking the PLL circuit, the respective driving voltage vectors are switched by an open loop. That is, the voltage vectors applied to the motor windings 151U, 151V and 151W are initially switched successively at a low speed near to DC (direct current) without carrying out a feedback operation at all, the switching speed is gradually accelerated and the rotor is made to attract and follow thereto to thereby accelerate the rotor to the rotational number capable of locking the PLL circuit.

As a control circuit of a brush-less motor for switching driving voltage vectors by generating pulses synchronized with a multiplied value of a rotational number of a rotor by using a PLL circuit in this way, there is invention of Japanese Patent Laid-Open No. 47285/1996. According to the invention, positions of magnetic poles are detected by Hall sensors and driving voltage vectors are controlled by a feedback control.

Three Hall sensors are arranged at a surrounding of magnetic poles of a rotor at angular intervals of 120°, when the rotor is rotated at a low speed by which a PLL circuit cannot be locked in starting a motor, driving voltage vectors are controlled by detected signals by the three Hall sensors, when a rotational number of the rotor reaches a rotational number capable of locking the PLL circuit, the PLL circuit generates multiplied synchronized pulses each having a period three times as much as the rotational number of the rotor from the detected signals of one of the Hall sensors and the driving voltage vectors are switched by the multiplied synchronized pulses.

Further, the technology is applicable also by detecting counter electromotive voltage generated at the motor windings and produced by rotating the rotor without using the Hall sensors. That is, the technology is applicable to a motor drive circuit free of Hall sensors using a PLL circuit.

A conventional sensor-less brush-less motor is controlled by a control circuit operated as follows.

The control circuit of the sensor-less brush-less motor controls currents flowing in motor windings by a feedback control while detecting positions of magnetic poles of a rotor. The positions of the magnetic poles of the rotor are detected by detecting voltage induced in the motor windings by rotating the rotor, that is, induced electromotive force. For example, in the case of a three phase brush-less motor, voltage is applied to the two motor windings and voltage induced in the remaining conduct less phase is detected. Further, based on the positions of the magnetic poles detected by the voltage, the two motor windings to be applied with voltage are determined and voltage is applied thereto. At the occasion, the induced electromotive force of the motor winding constituting the conductless phase is detected and the positions of the magnetic poles are detected thereby. The motor is driven by continuously carrying out the process.

FIG. 20 illustrates diagrams indicating timings of detecting the positions of the magnetic poles of the control circuit in the conventional sensor-less brush-less motor. Waveforms 201a, 201b and 201c are waveform diagrams of voltage induced in a certain motor winding. As mentioned later, FIG. 20(a) shows a case in which a phase of a rotating field produced by current of the motor winding is more advanced than a phase of rotating the rotor, FIG. 20(b) shows a case in which the phases of both coincide with each other and FIG. 20(c) shows a case in which the phase of the rotating field is more advanced than the phase of the rotor.

The positions of the magnetic poles are detected by sampling intersections 203a, 203b and 203c of imaginary neutral point potentials 202a, 202b and 202c and the waveforms 201a, 201b and 201c.

The control circuit is provided with a driving mode of outputting voltage to the motor winding and a sampling mode of not outputting voltage thereto. As shown by FIG. 20, during a time period of ⅔ of a period of rotating the rotor, voltage is outputted to the motor winding in the driving mode and during a remaining time period of ⅓ of the period, voltage is not outputted thereto in the sampling mode. This is for preventing the waveforms 201a, 201b and 201c from being superposed with noise in detecting the positions of the magnetic poles.

The intersections 203a, 203b and 203c are detected in the time period of the sampling mode.

FIG. 20(a) shows the case in which the phase of the rotating field is more advanced than the phase of rotating the rotor and an area surrounded by the waveform 201a and the imaginary neutral potential 202a on the left side of the intersection 201a, becomes smaller than an area surrounded by the waveform 201a and the imaginary neutral potential 202a on the right side of the intersection 201a. FIG. 20(b) shows the case in which the phases of both coincide with each other and the above-described left and right areas become equal to each other. FIG. 20(c) shows the case in which the phase of the rotating field lags behind the phase of the rotor and the area on the left side of the intersection 203c becomes larger than the area on the right side.

The conventional control circuit controls the voltage outputted to the motor winding by a feedback control such that the areas on the left side and the right side of the intersection become always equal to each other as in the intersection 203b.

Further, when the conventional sensor-less brush-less motor is applied to a vacuum pump of a turbo-molecular pump or the like, the following problem is posed.

There is a case that a motor portion of a turbo-molecular pump is constituted by a DC brush-less motor constituted by a rotor shaft having a permanent magnet and a plurality of pieces of electromagnets arranged at a surrounding of the permanent magnet at predetermined intervals.

However, according to the conventional starting method, when the switching speed of the driving voltage vectors of the motor windings 151U, 151V and 151W is rapidly increased or the load of the rotor 150 is rapidly changed, there is a case in which the rotor 150 cannot follow the magnetic field produced by the motor windings 151U, 151V and 151W and is brought out of phase and fails in staring. Further, when the switching speed of the voltage vectors is increased gradually by taking a long period of time, a long period of time is required of the rotor 150 to reach a rotational number (or speed) capable of locking the PLL circuit. Further, when interruption or the like is caused and restarting is needed before the rotor 150 reaches the rotational number capable of locking the PLL circuit after starting the motor, since the positions of the magnetic poles cannot be detected by the control circuit of the conventional sensor-less brush-less motor, it is necessary to stop the rotor 150 once by direct current braking and thereafter start the rotor 150. Particularly, in the case of a turbo-molecular pump, about one minute is required for accelerating the rotational number of the rotor 150 to reach about 20 rotations per second capable of locking the PLL circuit and therefore, loss of time by the above-described cause is enormous.

Meanwhile, according to the control circuit of the conventional sensor-less brush-less motor, the intersections 203a, 203b and 203c must be brought into the sampling mode, for example, when a variation of load is caused in the rotor and the intersections 203a, 203b and 203c are deviated from the sampling mode, there is a case in which the positions of the magnetic poles are disturbed and an out-of-phase state is brought about. Further, there is a case in which noise is superposed on voltage of the motor windings in detecting the magnetic pole of the rotor and the positions of the magnetic poles cannot accurately be detected.

Further, in the case in which the rotor of the brush-less motor is axially supported by a magnetic bearing, for example, when the rotor is subjected to direct current braking in starting to thereby set the magnetic poles to predetermined positions, since there is no friction in the magnetic bearing, there poses a problem that the rotor is vibrated centering on the predetermined position and the vibration is not attenuated swiftly. Further, the magnetic field is rotated slowly by an open loop until the rotational number of the rotor shaft reaches a rotational frequency capable of locking the PLL circuit (rotational number of rotor per unit time, about 20 [Hz] in this case) and therefore, time is taken in starting, further, when the rotational number of the rotor shaft is significantly changed in steady-state operation, there is a case in which the positions of the magnetic poles cannot be detected and out-of-phase is brought about.

SUMMARY OF THE INVENTION

It is a first object of the invention to provide a control circuit of a motor detecting the positions of the magnetic poles of the rotor 150 without using sensors even in low speed rotation of 20 rotations per second or lower which has been operated by an open loop conventionally and controlling to switch voltage vectors applied to the motor windings by a feedback control by using the detected value.

It is a second object of the invention to provide a control apparatus of a sensor-less brush-less motor capable of properly controlling current of motor windings by accurately detecting positions of magnetic poles of a rotor even when rotational speed of the rotor is significantly changed by a variation of load or the like or noise is superposed on voltage of the motor windings.

It is a third object of the invention to provide a control circuit of a sensor-less brush-less motor, a sensor-less brush-less motor apparatus and a vacuum pump apparatus using the motor capable of controlling to switch a magnetic field by a feedback control by detecting magnetic poles of a rotor even at, low speed rotation of 20 rotations per second or lower and capable of carrying out a feedback control by accurately detecting positions of the magnetic poles even when rotational speed of the rotor is significantly changed or noise is superposed on voltage of motor windings.

In order to achieve the first object, according to an aspect of the invention, there is provided a control circuit of a brush-less motor wherein comprising a rotor having magnetic poles, a first motor winding comprising at least two motor windings for rotating the rotor, a second motor winding comprising at least one motor winding for detecting a position of the rotor, rotor rotating means for rotating the rotor by making a current flow to the first motor winding, voltage acquiring means for acquiring a voltage induced in the second motor winding, magnetic pole position acquiring means for acquiring magnetic pole positions of the magnetic poles from the voltage acquired by the voltage acquiring means, and current switching means for switching the current such that a direction of a magnetic field by the first motor winding is changed in accordance with the magnetic pole positions acquired by the magnetic pole position acquiring means (first constitution).

According to the first constitution, the positions of the magnetic poles are acquired by detecting the voltage induced in the second motor winding in which current for rotating the rotor is not made to flow and therefore, the magnetic field operated to the rotor can be controlled by a feedback control without using sensors for detecting the positions of the magnetic poles.

Further, according to another aspect of the invention, in order to achieve the first object, there is provided a control circuit of a brush-less motor comprising a rotor having magnetic poles, a plurality of motor windings for rotating the rotor, rotor rotating means for rotating the rotor by making currents flow to at least two of the plurality of motor windings in which phases and magnitudes of voltage drop caused by inductances of the motor windings are equal to each other, voltage difference acquiring means for acquiring a difference between voltages supplied to the two motor windings having the equal phases and magnitudes of voltage drop, magnetic pole position acquiring means for acquiring positions of the magnetic poles based on the difference between the voltages acquired by the voltage difference acquiring means, and winding current switching means for switching the currents in accordance with the positions of the magnetic poles acquired by the magnetic pole position acquiring means (second constitution).

According to the second constitution, the positions of the magnetic poles are acquired by monitoring the voltages of the motor windings outputting driving voltage vectors. When the driving voltage vectors are selected pertinently, the voltage drop by the inductances appearing in the motor windings can be equalized between the two motor windings. By taking the difference therebetween, the voltage drop can be eliminated and the positions of the magnetic poles can be acquired from a signal thereof. Further, the driving voltage vectors can be controlled by a feedback control from the positions of the magnetic poles.

Further, according to other aspects of the invention, in order to achieve the first object, there are provided the control circuit of a brush-less motor further comprising an integrator for removing electric noise superposed on the voltage acquired by the voltage acquiring means of the first constitution (third constitution) and the control circuit of a brush-less motor further comprising an integrator and a direct current cut filter for removing electric noise superposed on the difference between the voltages acquired by the voltage difference acquiring means of the second constitution (fourth constitution).

By weakening the noise by integrating the voltage of the voltage acquiring means in the third constitution and the voltage difference by the voltage difference acquiring means in the fourth constitution by the integrators, signals embedded in the noise can be detected. Further, the direct current cut filter is connected in series with an input side of the integrator for cutting a direct current component of a signal inputted to the integrator and preventing the direct current component of the signal inputted to the integrator from being integrated.

Further, according to another aspect of the invention, in order to achieve the first object, there is provided the control circuit of a brush-less motor according to any one of the first constitution through the fourth constitution, wherein further comprising a sensor for detecting the magnetic pole positions of the rotor, rotational number detecting means for detecting a rotational number of the rotor from the magnetic pole positions detected by the sensor, and rotational number determining means for determining whether the rotational number detected by the rotational number detecting means is equal to or larger than a predetermined rotational number, wherein when the rotational number is equal to or larger than the predetermined rotational number, the currents of the plurality of motor windings are switched in accordance with the magnetic pole positions detected by the sensor, and when the rotational number detected by the rotational number detecting means is less than the predetermined rotational number, the currents of the motor windings are switched in accordance with the magnetic pole positions acquired by the magnetic pole position acquiring means.

According to the control circuit, by the control circuits of constitutions of the first constitution through the fourth constitution, when the rotor is started and the rotational number reaches the predetermined value, the motor can smoothly shift to steady-state operation. Further, when the rotational number is equal to or larger than the predetermined rotational number, the sensor for detecting the positions of the magnetic poles is used and therefore, the circuit constitution becomes simpler than that in the case of operating the motor without a sensor.

Further, according to the invention, when the rotor is axially supported by a magnetic bearing, in sampling a displacement signal of a position of a shaft of the magnetic bearing, noise superposed on a sampling signal can be reduced by cutting the currents of the motor windings or preventing the currents from being switched.

Thereby, an error of a detected position of the shaft of the magnetic bearing can be reduced and abnormal sound or vibration from the magnetic bearing can be restrained from occurring.

Further, when the rotational number of the rotor exceeds the predetermined value, by switching the motor to a motor drive system for generating motor drive pulses by utilizing a PLL circuit, the operation can be switched to the normal operation.

According to another aspect of the invention, in order to achieve the second object, there is provided a control circuit of a sensor-less brush-less motor wherein comprising a rotor having magnetic poles, a plurality of motor windings for rotating the rotor, current supplying means for supplying currents to the plurality of motor windings, magnetic flux acquiring means for acquiring an interlinking magnetic flux of at least one of the motor windings by the magnetic poles, and magnetic pole position acquiring means for acquiring positions of the magnetic poles from a change in the interlinking magnetic flux acquired by the magnetic flux acquiring means, wherein the current supplying means switches the currents of the motor windings based on the positions of the magnetic poles acquired by the magnetic pole position acquiring means (fifth constitution).

Further, as a variation of the fifth constitution, the magnetic flux acquiring means may be constituted to acquire a difference between interlinking magnetic fluxes of two of the motor windings by the magnetic poles.

According to the control circuit of the sensor-less brush-less motor or the aspect or the invention, rotational positions of the magnetic poles of the rotor can be acquired at arbitrary time in operating the motor and therefore, even when the rotational number of the motor is significantly changed by a variation in load of the motor, the currents of the motor windings can properly be controlled.

Further, the magnetic flux acquiring means according to the fifth constitution may comprise first acquiring means for acquiring an inter-cable voltage of predetermined two of the motor windings, second acquiring means for acquiring voltage drop by a synthesized resistance of resistances of the predetermined two motor windings and resistances of cables connecting a power supply apparatus constituting the current supplying means and the motor windings, third acquiring means for acquiring a difference between the currents of the two predetermined motor windings multiplied by values of inductances of the two predetermined motor windings, integrated value acquiring means for subtracting a value acquired by the second acquiring means from a value acquired by the first acquiring means and integrating it, and subtracting means for subtracting a value acquired by the third acquiring means from a value acquired by the integrated value acquiring means (sixth constitution).

Further, as a variation of the sixth constitution, the magnetic flux acquiring means according to the fifth constitution may comprise first integrated value acquiring means for acquiring a value produced by integrating an inter-cable voltage of the predetermined two motor windings overtime, second integrated value acquiring means for acquiring a value produced by integrating over time, voltage drop by a synthetic resistance of the resistances of the predetermined two motor windings and the resistances of cables connecting a power source apparatus constituting the current supplying means to the motor windings, third integrated value acquiring means for acquiring a value produced by integrating over time, voltage drop by inductances of the predetermined two motor windings, and subtracting means for subtracting the value acquired by the second integrated value acquiring means and the value acquired by the third integrated value acquiring means from the value acquired by the first integrated value acquiring means.

According to the sixth constitution and the variation of the sixth constitution, when the integrated values are acquired, the signal is integrated by using the integrators and therefore, noises superposed on the signal are canceled and the signal having small noise can be provided. Therefore, rotation of the motor can be monitored while operating the motor.

Further, a value of the synthesized resistance used in the sixth constitution can be acquired by synthesized resistance value acquiring means including direct current supplying means for supplying a direct current to the two predetermined motor windings; and first calculating means for calculating the value of the synthesized resistance by dividing a value of the inter-cable voltage by a current value of the direct current.

The method is carried out by conducting the direct current to the predetermined two motor windings, for example, before starting the motor.

Further, the inductance used in the sixth constitution can be acquired by inductance acquiring means including high frequency current supplying means for supplying high frequency currents to the two predetermined motor windings, inter-cable voltage value acquiring means for acquiring the value of the inter-cable voltage of the two motor windings when the high frequency currents are supplied thereto, and second calculating means for acquiring a value of the inter-cable voltage value divided by the current values of the high frequency currents, frequencies of the high frequency currents and a predetermined constant.

The method can be carried out by conducting the high frequency current to a degree to which the rotor cannot follow, to the predetermined two motor windings, for example, before starting the motor. The above-described predetermined value is $2\pi$.

Further, the inductance used in the sixth constitution can be acquired by inductance acquiring means, the inductance acquiring means comprising rotor rotating means for rotating the rotor by switching the currents of the motor windings by an open loop, sampling means for sampling integrated values acquired by the first integrated value acquiring means before and after switching the currents of the motor windings, current peak value acquiring means for acquiring peak values of the values of the currents supplied to the predetermined two motor windings, and third calculating means for dividing an absolute value of a difference between the first integrated values before and after switching the currents acquired by the sampling means by the current peak values acquired by the current peak value acquiring means.

According to the method, the rotor is rotated by the open loop to some degree of rotational number and at that occasion, the inductances are calculated by a magnitude of a stepped difference appearing in a waveform produced by the first integrating means in switching the motor drive current.

Further, the synthesized resistance and the inductances used in the fifth constitution or the sixth constitution can be acquired by providing assumed magnetic flux acquiring means for acquiring interlinking magnetic fluxes of the two predetermined motor windings by using assumed values of the resistance values and assumed values of the inductances and correcting means for correcting the assumed values of the resistance values and the assumed values of the inductances from inter-cable voltage values of the two predetermined motor windings when the rotor is rotated by a predetermined angular speed by the rotor rotating means, inter-cable voltages of the two predetermined motor windings when supply of the currents of motor windings is stopped and the rotor is run freely by the predetermined angular speed, a signal provided by the assumed magnetic flux acquiring means when supply of the currents is stopped, and a phase difference of the signal provided by the assumed magnetic flux acquiring means when the supply of the currents is restarted.

First, the interlinking magnetic fluxes generated in the motor windings are calculated by assumed synthetic resistance value and inductances, thereby, the assumed synthetic resistance value and inductances are corrected. By repeating the process several times, successively corrected synthetic resistance value and inductances approach true values.

Further, according to another aspect of the invention, in order to achieve the third object, there is provided a control circuit of a sensor-less brush-less motor wherein comprising magnetic flux signal acquiring means for acquiring a magnetic flux signal by integrating a voltage difference between predetermined two phases in a plurality of motor windings for rotating a rotor having magnetic poles in which phases and magnitudes of voltage drop by inductances of the motor windings are equal to each other, first drive timing acquiring means for acquiring a drive timing of a driving voltage vector constituting a portion of outputable driving voltage vectors from the magnetic flux signal acquired by the magnetic flux signal acquiring means, first driving voltage vector outputting means for outputting the portion of the driving voltage vector in synchronism with the drive timing acquired by the first drive timing, second drive timing acquiring means for acquiring output timings of the outputable driving voltage vectors by multiplying the timing provided from the magnetic flux signal acquired by the magnetic flux signal acquiring means, second driving voltage vector outputting means for outputting the outputable driving voltage vectors in synchronism with the drive timing acquired by the second drive timing acquiring means, and selecting means for selecting the first driving voltage vector outputting means and the second driving voltage vector outputting means (seventh constitution).

Further, according to another aspect of the invention, in order to achieve the third object, there is provided a control circuit of a sensor-less brush-less motor comprising current supplying means for supplying currents to a plurality of motor windings for rotating a rotor having magnetic poles, inter-cable voltage acquiring means for acquiring an inter-cable voltage of predetermined two motor windings in the plurality of motor windings in which phases and magnitudes of voltage drop by inductances of the motor windings are equal to each other, resistance amount correcting means for correcting a change of a voltage by a synthesized resistance of resistances of the predetermined two motor windings and resistances of connection cables for connecting a power supply apparatus constituting the current supplying means and the motor windings from the inter-cable voltage acquired by the inter-cable voltage acquiring means, magnetic flux signal acquiring means for acquiring a magnetic flux signal by integrating the inter-cable voltage corrected by the resistance amount correcting means, reactance amount correcting means for correcting a change amount by reactances of the predetermined two motor windings among the magnetic flux signal acquired by the magnetic flux signal acquiring means, magnetic pole position acquiring means for acquiring positions of the magnetic poles from the magnetic flux signal corrected by the reactance amount correcting means, and correction nullifying means for nullifying at least the reactance amount correcting means in the resistance amount correcting means and the reactance amount correcting means to be prevented from correcting the magnetic flux signal, wherein when a rotational number of the rotor is equal to or smaller than a predetermined rotation, at least the reactance amount correcting means is nullified by the correction nullifying means and the current supplying means supplies the currents to the predetermined two motor windings by a first mode switching the currents flowing in the predetermined two motor windings based on the positions of the magnetic poles acquired by the magnetic pole position acquiring mean, and wherein when the rotational number of the rotor is larger than the predetermined rotation, the currents are supplied to the motor windings by a second mode of switching the currents of the motor windings based on the positions of the magnetic poles acquired by the magnetic pole position detecting means without using the correction nullifying means (eighth constitution).

In the eighth constitution, there can be constructed a constitution in which the current supplying means makes small currents flow in the plurality of motor windings in accordance with a predetermined order during a predetermined time period when a mode is switched from the first mode to the second mode (ninth constitution).

The seventh constitution or the eighth constitution can be constituted to further comprise direct current cutting means capable of switching a first cutoff frequency and a second cutoff frequency of a frequency larger than the first cutoff frequency for removing a direct current component superposed on the magnetic flux signal, and switching means for switching the first cutoff frequency and the second cutoff frequency of the direct current cutting means (tenth constitution).

In the tenth constitution, there can be constructed a constitution in which the switching means sets the cutoff frequency of the direct current cutting means to the first cutoff frequency during a predetermined time period from when the rotor is started and switches the cutoff frequency of the direct current cutting means to the second frequency when the predetermined time period has elapsed.

Further, according to another aspect of the invention, in order to achieve the third object, there is provided a brushless motor apparatus characterized by being constructed of a control portion comprising a motor portion comprising a rotor having magnetic poles, a first motor winding comprising at least two motor windings for rotating the rotor, and a second motor winding comprising at least one motor winding for detecting a position of the rotor, rotor rotating means for rotating the rotor by making a current flow in the first motor winding, voltage acquiring means for acquiring a voltage induced in the second motor winding, magnetic pole position acquiring means for acquiring magnetic pole positions of the magnetic poles from the voltage acquired by the voltage acquiring means, and current switching means for switching the current such that a direction of a magnetic field by the first motor winding is changed in accordance with the magnetic pole positions acquired by the magnetic pole position acquiring means (eleventh constitution).

Further, according to another aspect of the invention, in order to achieve the third object, there is provided a brushless motor apparatus characterized by being constructed by a control portion comprising a motor portion comprising a rotor having magnetic poles, and a plurality of motor windings for rotating the rotor, rotor rotating means for rotating the rotor by making currents flow to at least two motor windings in the plurality of motor windings in which phases and magnitudes of voltage drop by inductances of the motor windings are equal to each other, voltage difference acquiring means for acquiring a difference between voltages operated to the two motor windings having the equal phases and equal magnitudes of the voltage drop, magnetic pole position acquiring means for acquiring positions of the magnetic poles from the difference between the voltages acquired by the voltage difference acquiring means, and winding current switching means for switching the currents in accordance with the positions of the magnetic poles acquired by the magnetic pole position acquiring means (twelfth constitution).

Further, according to another aspect of the invention, in order to achieve the third object, there is provided a sensor-less brush-less motor apparatus characterized by a control portion comprising a motor portion comprising a rotor having magnetic poles, and a plurality of motor windings for rotating the rotor, current supplying means for supplying currents to the plurality of motor windings, magnetic flux acquiring means for acquiring an interlinking magnetic flux of at least one of the motor windings by the magnetic poles, and magnetic pole position acquiring means for acquiring positions of the magnetic poles from a change in the interlinking magnetic flux acquired by the magnetic flux acquiring means, wherein the current supplying means switches the currents of the motor windings based on the positions of the magnetic poles acquired by the magnetic pole position acquiring means (thirteenth constitution).

Further, according to another aspect of the invention, in order to achieve the third object, there is provided a sensor-less brush-less motor apparatus wherein comprising a rotor having magnetic poles, a plurality of motor windings for rotating the rotor, magnetic flux signal acquiring means for acquiring a magnetic flux signal by integrating a voltage difference between predetermined two phases in the plurality of motor windings in which phases and magnitudes of voltage drop by inductances of the motor windings are equal to each other, first drive timing acquiring means for acquiring a drive timing of a driving voltage vector constituting a portion of outputable driving voltage vectors from the magnetic flux signal acquired by the magnetic flux signal acquiring means, first driving voltage vector outputting means for outputting the portion of the driving voltage vector in synchronism with the drive timing acquired by the first drive timing acquiring means, second drive timing acquiring means for acquiring output timings of the outputable driving voltage vectors by multiplying the timing provided from the magnetic flux signal acquired by the magnetic flux signal acquiring means, second driving voltage vector outputting means for outputting the outputable driving voltage vectors in synchronism with the drive timings acquired by the second drive timing acquiring means, and selecting means for selecting the first driving voltage vector outputting means and the second driving voltage vector outputting means (fourteenth constitution).

Further, according to another aspect of the invention, in order to achieve the third object, there is provided a vacuum pump apparatus wherein comprising an exterior member one end of which is formed with an intake port and other end of which is formed with an exhaust port, a rotor axially supported rotatably by a magnetic bearing or a mechanical type bearing at inside of the exterior member, a motor for rotating the rotor, and a stator arranged at the inside of the exterior member, wherein the motor is constituted by the brush-less motor apparatus according to the eleventh constitution or the twelfth constitution or the sensor-less brush-less motor apparatus according to the thirteenth constitution or the fourteenth constitution.

BRIEF DESCRIPTION OF THE DRAWINGS

FIG. 7 is a table showing a relationship among a phase difference Y, driving voltage vectors and a phase lag amount D.

FIG. 23 is a diagram showing a relationship among numerals of driving voltage vectors, directions of current flowing in motor windings and transistors made ON.

FIG. 24A is a view showing a case of accelerating the rotor by a magnetic field and FIG. 24B is a view showing a case of decelerating the rotor by a magnetic field.

FIG. 26A is a diagram showing a direct current component outputted from a differential amplifier 8, FIG. 26B is a diagram showing the direct current component outputted from a direct current cut filter 2 when a no output of a multiplier 10 is nullified and FIG. 26C is a diagram showing the direct current component outputted from the direct current cut filter 2 when a predetermined signal is outputted from the multiplier 10.

FIG. 27 is a diagram showing changes of a direct current component of a signal of a differential amplifier, a magnetic flux predicting signal and current of W-phase when a mode is switched from a 2-phase deceleration mode to a 3-phase acceleration mode via a pause time period.

FIG. 28 is a diagram showing changes of the differential amplifier, the magnetic flux predicting signal and the current of the W-phase when small current is conducted to a motor winding 7 in switching the mode from a 2-phase mode to a 3-phase mode.

FIG. 2B is a diagram showing a frequency characteristic of an integrator and FIG. 29C is a diagram showing a frequency characteristic of a circuit combined with a direct current cut filter and the integrator.

DESCRIPTION OF THE PREFERRED EMBODIMENTS (First Embodiment)

Figure 1:
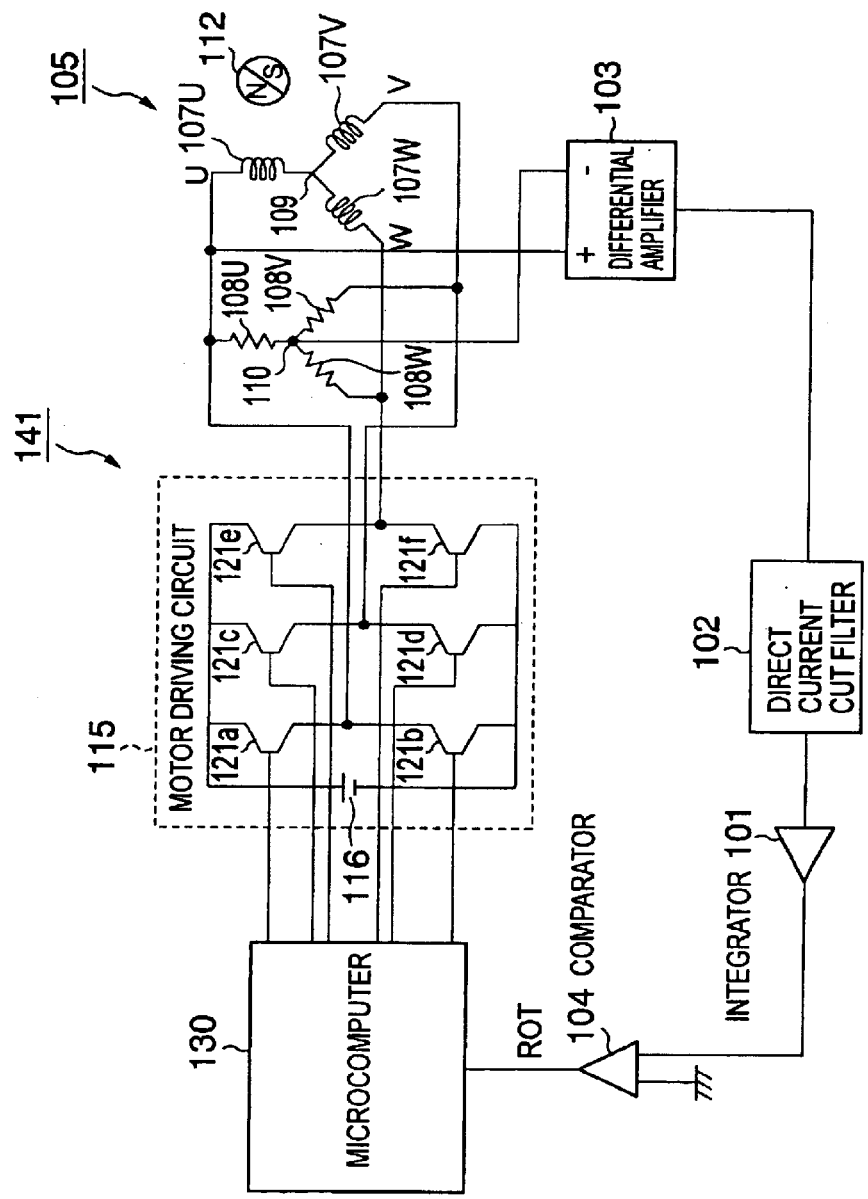
FIG. 1 is a block diagram showing a control circuit of a brush-less motor according to a first embodiment of the invention.

An explanation will be given of a first embodiment of a control circuit of a brush-less motor according to the invention in reference to FIG. 1 and FIG. 2. FIG. 1 is a diagram showing a principal constitution of a control circuit of a brush-less motor according to a first embodiment.

A control circuit 141 according to the embodiment is provided with a motor 105 comprising a rotor 112 having a permanent magnet of two poles and motor windings 107U, 107V and 107W in star connection for rotating the rotor 112, a motor driving control circuit 15 for supplying current to the motor windings 107U, 107V and 107W, a microcomputer 130 for controlling the motor driving control circuit and resistors 108u, 108V and 108W in star connection respectively having equal resistance values.

Although in FIG. 1, the respective motor windings 107U, 107V and 107W and the rotor 112 are illustrated separately for convenience, actually, the motor windings 7 are arranged at an outer peripheral portion of the rotor 112.

The motor driving circuit 115 is provided with direct current power source 116 and six transistors 121a, 121b, 121c, 121d, 121e and 121f constituting a three-phase bridge. Bases of the respective transistors 121a, 121b, 121c, 121d, 121e and 121f are respectively connected to the microcomputer 130. The respective transistors 121a, 121b, 121c, 121d, 121e and 121f are made ON/OFF by gate drive pulses from the microcomputer 130 and supply predetermined current to the motor windings 107U, 107V and 107W.

The motor driving circuit 115 supplies predetermined current to the motor windings 107U, 107V and 107W while being controlled by the microcomputer 130.

The resistors 108U, 108V and 108W are respectively connected to the motor windings 107U, 107V and 107W. As shown by FIG. 1, the resistors 108U, 108V and 108W and the motor windings 107U, 107V and 107W are wired in symmetrical shapes and potential of a neutral point 110 of the resistors 108U, 108V and 108W is equal to that of a neutral point 109 of the motor windings 7.

The control circuit 141 is further provided with a differential amplifier 103, a direct current cut filter 102, an integrator 101 and a comparator 104.

The differential amplifier 103 is connected to the neutral point 110 of the resistors 108U, 10EV and 108W and the resistor 108U and outputs potential difference across both ends of the resistor 108U, that is, voltage appearing at the resistor 108U. In this case, the potentials of the neutral point 109 and the neutral point 110 are the same, further, as described later, current for driving the rotor 112 is not made to flow to the motor winding 107U and therefore, voltage outputted from the differential amplifier 103 becomes equal to voltage induced in the motor winding 107U by rotating the rotor 112. Hereinafter, potential of V-phase with the neutral point 109 as a reference is designated by notation Vu-n. Suffix u designates a U-phase terminal and suffix n designates the neutral point 109.

According to the embodiment, the rotor 112 is rotated by alternately outputting driving voltage vectors 3 and 6. That is, current is made to flow alternately to the motor windings 107V and 107W in V→W direction and W→V direction and the motor winding 107U is made conductless phase. When the rotor 112 is rotated, at the motor winding 107U, induced electromotive force is produced by rotating the rotor 112. The voltage draws a sign curve in accordance with rotation of the rotor 112 and there is a corresponding relationship between the phase of the sine curve and a position of the magnetic pole of the rotor 112. Further, as mentioned above, voltage generated at the motor winding 107U and voltage generated at the resistor 108U are the same and therefore, the voltage generated at the resistor 108U is detected by the differential amplifier 103 and by pertinently processing the signal, position of the rotor 112 can be detected.

Although the voltage generated at the motor winding 107U can be detected by connecting a minus terminal of the differential amplifier 103 not to the neutral point 110 but to the neutral point 109 of the motor 105 directly, in view of the structure of the motor, the terminal of the differential amplifier 103 cannot be connected to the neutral point 109 and therefore, there is adopted a method of detecting induced electromotive force indirectly by the resistor 108.

The direct current cut filter 102 cuts a direct current component of the induced electromotive force induced in the motor winding 107U from the differential amplifier 103. This is because when the direct current component is included in the output of the differential amplifier 103, the integrator 101 integrates the direct current component and therefore, the direct current component is previously removed by the direct current cut filter 102. The direct current cut filter 102 can also be realized by using a high pass filter.

The integrator 101 integrates the output of the differential amplifier 103 removed of the direct current component and removes electric noise superposed on the output of the differential amplifier 103. When the motor is operated, various electric noises are generated. The signal provided by the differential amplifier 103 is superposed with the noises and the signal cannot be used as it is. When the signal embedded in the noises is integrated by the integrator 101, the noises are averaged and only the signal embedded in the noises can be provided.

This is because the noises superposed on the signal are randomly generated by substantially equal rates positively and negatively with respect to the signal and accordingly, when the signal is integrated, the noises are averaged and canceled by each other.

The signal outputted from the integrator 101 is referred to as a magnetic flux predicting signal. This is because when the voltage generated at the motor winding is integrated, interlinking magnetic flux of the motor winding 107U is brought about.

Input terminals of the comparator 104 are connected to the integrator 101 and the ground and an output terminal thereof is connected to the microcomputer 130. The comparator 104 outputs a binary value signal (signal in correspondence with two kinds of high and low voltages and signal having high voltage is designated by notation Hi and signal having low voltage is designated by notation Lo).

The comparator 104 compares the magnetic flux predicting signal and the ground level, outputs Hi when the magnetic flux predicted signal is larger than the ground level and outputs Lo when the magnetic flux predicting signal is smaller than the ground level. The output of the comparator 104 is referred to as an ROT (rotational pulse) signal. In this way, the comparator 104 generates a pulse signal in synchronism with the rotor 112.

The microcomputer 130 receives the ROT signal from the comparator 104, switches the transistors 121$c$, 121$d$, 121$e$ and 121$f$ of the motor driving circuit 115 in synchronism with the ROT signal and outputs predetermined driving voltage vectors to the motor windings 107V and 107W. When the ROT signal is Lo, the transistors 121$f$ and 121$c$ are made ON, the driving voltage vector 3 is outputted and when the ROT signal is Hi, the transistors 121$e$ and 121$d$ are made ON and the driving voltage vector 6 is outputted.

The control circuit 141 of the brush-less motor according to the embodiment rotates the rotor 112 by alternately outputting the driving voltage vectors 3 and 6 to the motor windings 107V and 107W in the motor windings 107U, 107V and 107W. Further, by rotating the rotor 112, from the voltage induced in the motor winding 107U, positions of the magnetic poles of the rotor 112 are detected and the driving voltage vectors 3 and 6 are controlled to switch by a feedback control from a detected result.

Figure 2:
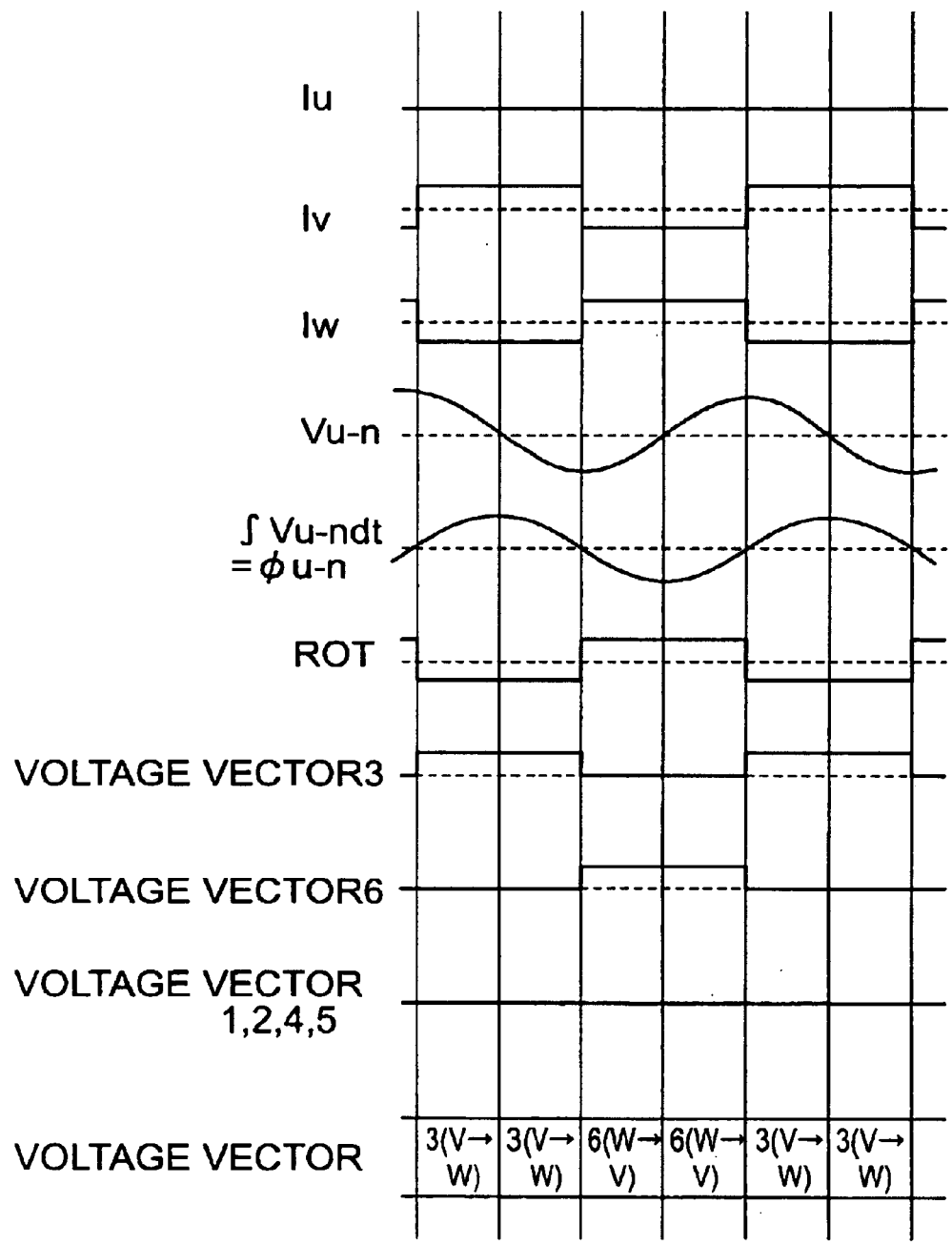
FIG. 2 is a waveform diagram of a control circuit of the brush-less motor according to the first embodiment of the invention.

FIG. 2 shows a relationship among current Iu, Iv and Iw flowing in the motor windings 107U, 107V and 107W, the output Vu-n of the differential amplifier 103, the magnetic flux predicting signal φu-n outputted from the integrator 101, the ROT signal outputted from the comparator 104 and the driving voltage vectors 3 and 6.

An explanation will be given of operation of the control circuit 141 of the brush-less motor in reference to waveform diagrams of FIG. 2 as follows.

In starting the motor, there are alternately repeated the driving voltage vector 3, that is, a case of making current flow in V→W direction and the driving voltage vector 6, that is, a case of making current flow in W→V direction at a frequency near to DC and the magnetic poles of the rotor 112 are made to attract and follow a magnetic field produced by the motor winding 107V and the motor winding 107W. When the rotor 112 is rotated about one rotation per second, the voltage induced in the motor winding 107U can be detected.

During a time period of outputting the driving voltage vector 3, current is made to flow in V→W direction, during a time period of outputting the driving voltage vector 6, current is made to flow in W→V direction, current is not made to flow in the motor winding 107U and therefore, waveforms of current Iu, Iv and Iw are respectively as shown by FIG. 2. Iu is 0.

When the driving voltage vectors 3 and 6 are alternately outputted and the rotor 112 is rotated, the induced electromotive force Vu-n shown by FIG. 2 is generated in the motor winding 107U. As mentioned above, the voltage becomes the sine curve in synchronism with rotation of the rotor 112. The voltage is detected by the differential amplifier 103 connected to the both ends of the resistor 108U.

Vu-n outputted from the differential amplifier 103 is removed of the direct current component by the direct current cut filter 102 and is inputted to the integrator 101.

Next, Vu-n is integrated by the integrator 101 and is converted into the magnetic flux predicting signal φu-n. By integrating the signal, noises superposed on Vu-n are removed and the signal embedded in the noises can be detected.

The magnetic flux predicting signal φu-n is constituted by integrating Vu-n and therefore, its phase lags by 90° as shown by FIG. 2.

The comparator 104 compares the ground level and the magnetic flux predicting signal φu-n and generates the ROT signal. When the magnetic flux predicting signal φu-n is equal to or larger than the ground level, Lo signal is outputted and when the signal is equal to or smaller than the ground level, Hi signal is outputted. The ROT signal is constituted by a waveform as shown by FIG. 2. The ROT signal is synchronized with rotation of the rotor 112 and alternately repeats Hi and Lo at every half rotation of the rotor 112.

Next, the microcomputer 130 receives the signal from the comparator and switches predetermined transistors of the motor driving circuit 115 based on the signal.

The microcomputer 130 makes ON the transistors 121$f$ and 121$c$ of the motor driving circuit 115 when the ROT signal is Lo and makes ON the transistors 121$e$ and 121$d$ when the ROT signal is Hi.

The motor driving circuit 115 outputs the driving voltage vector 3 to the motor 105 during the time period in which the transistors 121$f$ and 121$c$ are ON and outputs driving voltage vector 6 to the motor 105 during the time period in which the transistors 121$e$ and 121$d$ are ON.

Further, currents made to flow in the motor windings 107V and 107W by the driving voltage vectors 3 and 6 are controlled by a PWM (pulse width modulation) control by the microcomputer 130.

The other driving voltage vectors 1, 2, 4 and 5 are not outputted.

As mentioned above, according to the embodiment, tie rotor 112 is driven by alternately outputting the driving voltage vectors 3 and 6 and the positions of the magnetic poles of the rotor 112 are detected from voltage induced in the motor winding 107U which is not utilized in driving the rotor 112. Further, the driving voltage vectors 3 and 6 are switched in accordance with the detected positions of the magnetic poles. Although the voltage induced at the motor winding 107U is superposed with noises, by integrating the voltage, the noises are removed and therefore, the positions of the magnetic poles can be detected even in low speed rotation in which rotation of the rotor 112 is about one rotation per second. Therefore, even in the low speed rotation of the rotor 112 in which a PLL circuit cannot be locked, the driving voltage vectors 3 and 6 can be controlled by the feedback control by the positions of the magnetic poles.

As mentioned above, conventionally, the driving voltage vectors are switched by an open loop in starting the motor and time periods of switching the driving voltage vectors are set to be long such that the rotor can follow the change of the magnetic field. Meanwhile, according to the embodiment, the driving voltage vectors can be switched swiftly in accordance with the increase of the rotational number of the rotor and therefore, a time period for starting the motor can be shortened.

Further, even in the low speed rotation of the rotor, the position of the rotor can be detected and therefore, even when the rotational number of the rotor is rapidly changed by varying load of the rotor, switching of the driving voltage vectors can be made to follow the change of the rotational number of the rotor. Further, even when interruption is caused in starting the motor, at a time point of recovering supply of power, starting can be restarted without stopping to rotate the rotor.

Although according to the embodiment, the driving voltage vectors 3 and 6 are used and the positions of the magnetic poles are detected by the motor winding 107U, there may be constructed a constitution in which the driving voltage vectors 1 and 4 are used and the positions of the magnetic poles are detected by the motor winding 107W or there may be constructed a constitution in which driving voltage vectors 2 and 5 are used and the positions of the magnetic poles are detected by, using the motor winding 107V.

Further, when motor drive is used in a magnetic bearing, there is a case in which switching noise of a motor driver is propagated to a sensor such as a displacement sensor or a temperature sensor of the magnetic bearing by way of a bearing main body or a circuit. Particularly, when the magnetic bearing is digitally controlled by using a digital signal processor or the like, a displacement signal is detected by sampling and detecting the signal by an A/D (analog/digital) converter and therefore, there is a case in which when the displacement signal of the magnetic bearing is sampled at an instance of being superposed with noise, the displacement signal including error is detected, as a result, noise or vibration is caused from the magnetic bearing. Therefore, when the motor driver used in the magnetic bearing is constituted such that the switch of the motor is cut or prevented from switching at an instance of sampling the signal of the displacement sensor (for example, 2 microseconds), noise or vibration can be restrained to cause from the magnetic bearing.

(Second Embodiment)

An explanation will be given of a second embodiment of a control circuit of a brush-less motor according to the invention in reference to FIG. 3 and FIG. 4.

According to the embodiment, the driving voltage vector 3 and the driving voltage vector 5 are alternately outputted to thereby generate a magnetic field alternately in the motor windings 107V and 107W and the motor windings 107W and 107U and the rotor 112 is attracted to the magnetic field and rotated. Further, the ROT signal is generated by a difference between voltages of the U-phase terminal and the V-phase terminal and the driving voltage vectors 3 and 5 are controlled by a feedback control by using the ROT signal.

Figure 3:
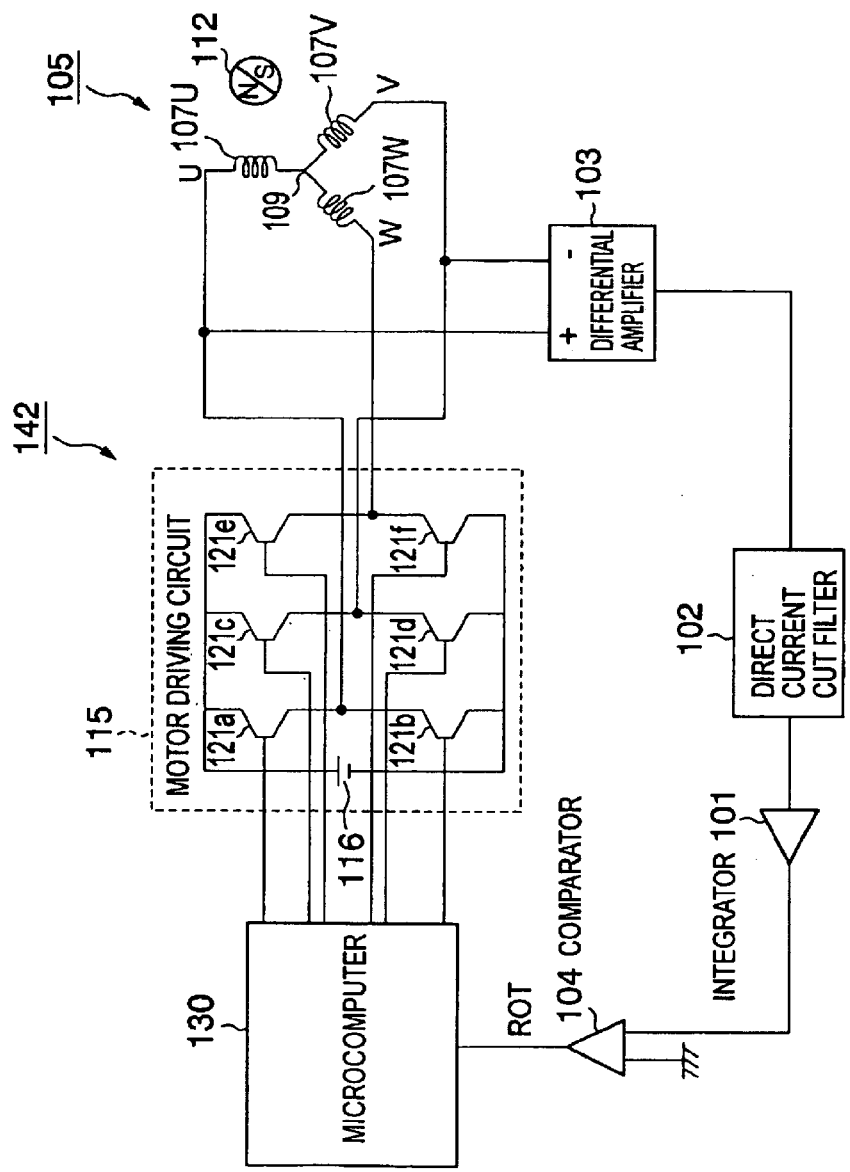
FIG. 3 is a block diagram showing a control circuit of a brush-less motor according to a second embodiment of the invention.

FIG. 3 is a diagram showing a control circuit 142 according to the embodiment. Portions having functions the same as those of the control circuit 141 according to the first embodiment are attached with the same numerals.

A difference of constitution between the control circuit 141 and the control circuit 142 resides in that the control circuit 142 is not provided with the resistors 108U, 108V and 108W in star connection and that the differential amplifier 103 detects a difference between voltages of the U-phase terminal and the V-phase terminal. Constitutions of other portions of the control circuit 141 and the control circuit 142 are the same.

Figure 4:
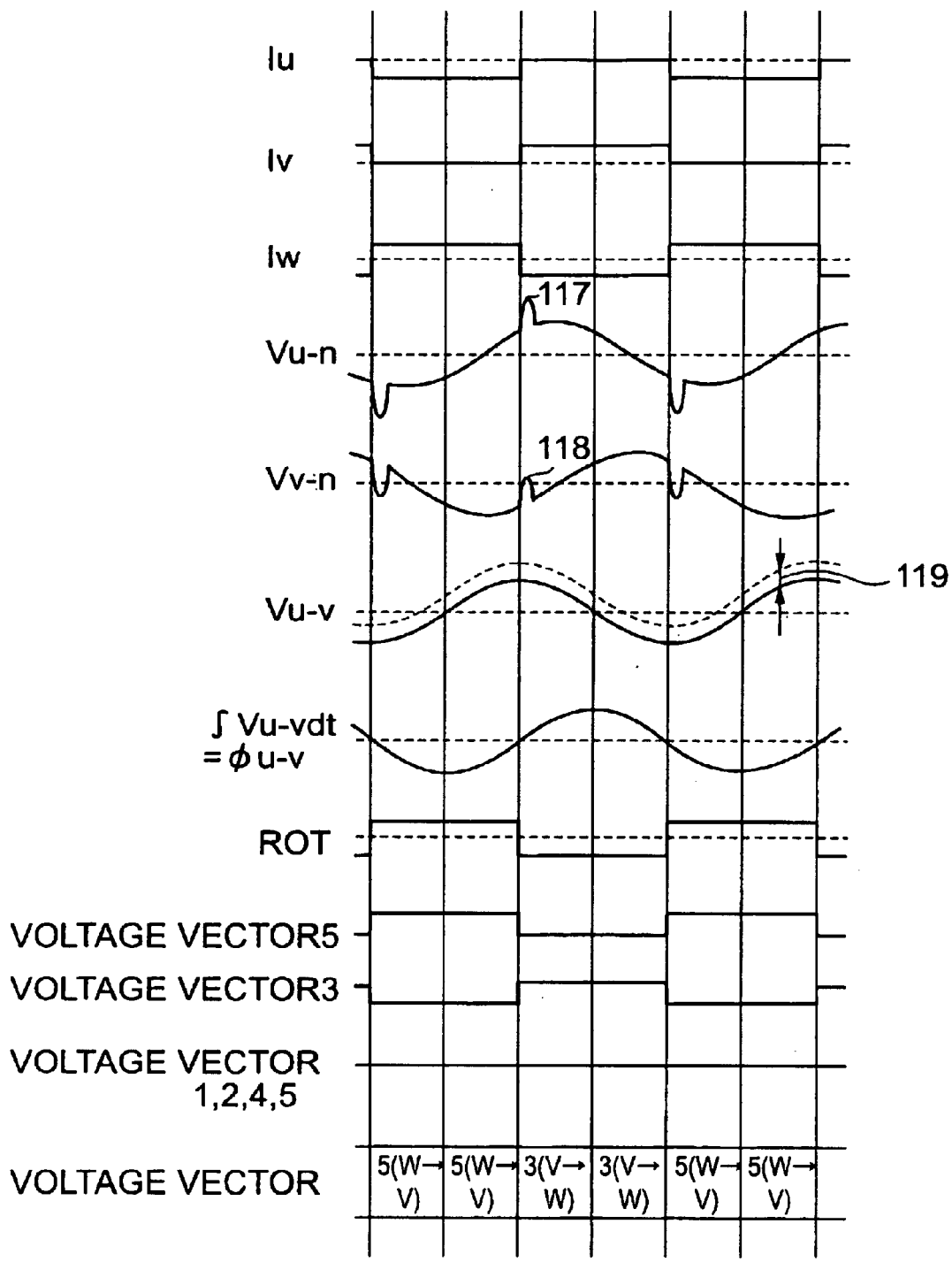
FIG. 4 is a waveform diagram of the control circuit of the brush-less motor according to the second embodiment of the invention.

According to the first embodiment, motor driving current is not made to flow in the motor winding 107U and therefore, Vu–n constitutes a regular sine curve, however, according to the embodiment, there are monitored voltages Vv–n and Vu–n generated in the motor windings 107V and 107U in which the motor driving current flows and therefore, there appear voltages 117 and 118 in a spike like shape caused by inductances of the motor windings 107U, 107V and 107W in these voltages as shown by FIG. 4. In order to eliminate the voltages 117 and 118 in the spike-like shape, a difference therebetween is taken by the differential amplifier 103. The voltages 117 and 118 in the spike-like shape having the same magnitude appear in the voltages Vv–n and Vu–n at the same phase and therefore, these can be eliminated by taking the difference.

An explanation will be given of the constitution of the control circuit 142 of the brush-less motor as follows, The motor 105 is constituted by the motor windings 107U, 107V and 107W in star connection and the rotor 112 having two magnetic poles of N-pole and S-pole.

By alternately outputting the driving voltage vectors 3 and 5, the motor windings 107V and 107W and the motor windings 107V and 107U alternately produce the magnetic field and the magnetic poles of the rotor 112 are attracted thereto and rotated. According to the first embodiment, the rotor 112 is rotated by alternately outputting the driving voltage vectors 3 and 6 and therefore, there is a case in which the rotor 112 cannot be started depending on the positions of the magnetic poles of the rotor 112 (since magnetic fields generated by the driving voltage vectors 3 and 6 are in parallel with each other and therefore, in the case in which a direction of the magnetic field and a direction of the magnetic poles are in parallel with each other when the rotor 112 is stopped, torque is not generated and the rotor 112 cannot be started), however, according to the embodiment, the rotor 112 can be started even when the rotor 112 is disposed at any position in starting.

Further, also in the first embodiment, the motor can be started by generating a magnetic field other than those of the driving voltage vectors 3 and 6 for a short period of time in starting.

The input terminals of the differential amplifier 103 are connected to the motor windings 107U and 107V and a difference of voltages Vu–v between the two terminals is outputted.

As shown by FIG. 4, the voltages 117 and 118 in the spike-like shape caused by the inductances of the motor windings 107u, 107V and 107W appear in Vu–n and Vv–n. The magnitudes and the phases of generating these are the same and therefore, these can be eliminated by taking the difference by the differential amplifier 103. A waveform indicated by a dotted line of Vu–v of FIG. 4 shows the output from the differential amplifier 103. Although the voltages 117 and 118 in the spike-like shape are eliminated in the waveform, the waveform still includes a direct current component 119. The direct current component 119 is caused by resistance values of the motor windings 107U, 107V and 107W.

The direct current cut filter 102 cuts the direct current component 119 and a waveform indicated by a bold line of Vu–v of FIG. 4 is provided from the direct current cut filter 102.

The integrator 101 integrates Vu–v and outputs the magnetic flux predicting signal φu–v. The phase of the magnetic flux predicting signal φu–v lags by 90° behind Vu–v by integration. Further, noises superposed on vu–v are eliminated by the integration.

The comparator 114 compares the magnetic flux predicting signal φu–v with the ground level and outputs the ROT signal. Similar to the first embodiment, the ROT signal becomes high when the magnetic flux predicting signal is larger than the ground level and becomes signal Lo when the magnetic flux predicting signal φ is smaller than the ground level.

The microcomputer 130 makes ON.OFF the transistors 121b, 121c, 121e and 121f of the motor driving circuit 115 in synchronism with the ROT signal.

The motor driving circuit 115 outputs the driving voltage vector 3 to the motor windings 107V and 107W when the transistors 121c and 121f are made ON and outputs the driving voltage vector 5 to the motor windings 107W and 107U when the transistors 121e and 121b are made ON.

Next, an explanation will be given of operation of the control circuit 142 constituted in this way.

In starting the motor, the driving voltage vector 3, that is, in the case of making current flow in V→W direction and the driving voltage vector 5, that is, in the case of making current flow in W→U direction are repeatedly applied alternately by a frequency near to DC (direct current). The rotor 112 is attracted to a magnetic field produced by the motor windings 107V and 107W when the driving voltage vector 3 is outputted and to a magnetic field produced by the motor windings 107W and 107U when the driving voltage vector 5 is outputted and starts rotating. When the rotational number of the rotor 112 becomes about 1 rotation per second, the positions of the magnetic poles can be detected.

Currents indicated by notations Iu, Iv and Iw of FIG. 4 are made to flow respectively to the motor winding 107U, the motor winding 107V and the motor winding 107W. During a time period in which the driving voltage vector 3 is outputted, current is made to flow from the motor winding 107V to the motor winding 107W and during a time period in which the driving voltage vector 5 is outputted, current is made to flow from the motor winding 107W to the motor winding 107U.

The waveform Vu–n of FIG. 4 represents voltage of the U-phase terminal with the neutral point 109 as a reference. As mentioned above, the voltage 117 in the spike-like shape appearing at portions in the waveform is caused by influence of voltage drop by the inductance of the motor winding 7.

The waveform Vv–n of FIG. 4 shows voltage of the V-phase terminal with the neutral point 109 as a reference. The voltage 118 in the spike-like shape appears at portions of the waveform by reason the same as that of Vu–n.

According to the voltages 117 and 118 in the spike-like shape appearing in the two waveforms, phases of generating the voltages are the same and the magnitudes are equal to each other.

The waveforms Vu–n and Vv–n are inputted to the differential amplifier 103 and a difference therebetween is outputted.

The waveform Vu–v of FIG. 4 indicated by the dotted line shows the output signal of the differential amplifier 103. As mentioned above, locations or generating the voltages 117 and 118 in the spike-like shape appearing in Vv–n and Vu–n and magnitudes thereof are equal to each other and therefore, these can be canceled by each other by taking a difference therebetween by the differential amplifier 103.

The direct current component 119 is superposed on the output signal of the differential amplifier 103 and the direct current component 119 is cut by the direct current cut filter 102. This is for preventing the direct current component from being integrated by the integrator 101. The waveform of Vu–v indicated by the bold line of FIG. 4 is provided from the direct current cut filter 102.

Vu–v removed of the direct current component by the direct current cut filter 102 is integrated by the integrator 101 and is converted into the magnetic flux predicting signal φu–v shown by FIG. 4. Noises superposed on Vu–v by the integration are removed and only a desired signal is provided. The magnetic flux predicting signal φu–v is changed in synchronism with the rotor 112.

The magnetic flux predicting signal φu–v outputted from the integrator 101 is compared with the ground level by the comparator 104 and the ROT signal (rotational pulse signal) shown in FIG. 4 is outputted. The ROT signal becomes Lo when the magnetic flux predicting signal φu–v is larger than the ground level and becomes Hi when the signal is smaller than the ground level.

The microcomputer 130 receives the ROT signal from the comparator and makes ON the transistors 121f and 121c of the motor driving circuit 115 during a time period in which the ROT signal is Lo, and makes ON the transistors 121e and 121b during a time period in which the ROT signal is Hi.

As shown by FIG. 4, when the ROT signal is Lo, the driving voltage vector 5 is outputted to the motor windings 107V and 107W and when the ROT signal is Hi, the driving voltage vector 3 is outputted to the motor windings 107W and 107U.

Further, current flowing in motor windings by the driving voltage vectors 3 and 5 is controlled by the microcomputer 130 by a PWM control. The driving voltage vectors 1, 2, 4 and 6 are not outputted.

According to the embodiment, the rotor 112 can necessarily be started regardless of positions of stopping the magnetic poles of the rotor 112. This is because torque is generated in the rotor even when the magnetic poles are stopped at any positions since magnetic fields generated by the driving voltage vectors 3 and 5 are not in parallel with each other.

Further, according to the control circuit 141 of the embodiment, it is not necessary to install resistors for detecting voltages of the motor windings and the driving voltage vectors can be controlled to switch by a feedback control by detecting the position of the rotor 112 even when the rotor 112 is rotated at low speed and the PLL circuit cannot be locked, by a simple circuit constitution.

Further, a time period of starting the motor can be shortened and even when supply of power is recovered after varying load of the rotor 112 or electricity is interrupted, the motor 105 can be controlled without being brought into out of phase similar to the first embodiment.

Although according to the embodiment, the motor is driven by using the driving voltage vectors 3 and 5, a way of selecting the driving voltage vectors is not limited thereto but, for example, the driving voltage vectors 5 and 1 and the driving voltage vectors 1 and 3 may be used. That is, the magnetic flux predicting signal can be provided by selecting the driving voltage vectors such that the voltages in the spike-like shape which appear by the inductances of the motor windings 7 can be canceled by each other by the differential amplifier 103.

(Third Embodiment)

According to the embodiment, an explanation will be given of a case in which after the rotational number of the rotor of the motor started by means of the second embodiment reaches a rotational number capable of locking a PLL circuit (about 20 rotations per second), the motor is switched to steady-state operation using the PLL circuit.

In the steady-state operation of the motor, while detecting the positions of the magnetic poles, 6 pulses are generated in the PLL circuit at every rotation of the rotor and the driving voltage vectors are successively switched in an order of 1→2→3→4→5→6→1→ . . . in synchronism with the pulses to thereby rotate the rotor.

Meanwhile, the rotor 112 according to the second embodiment is rotated by alternately switching the voltage driving vectors 3 and 5.

Therefore, when operation as the means of the second embodiment is switched to normal operation using the PLL circuit, it is necessary to pertinently calculate the driving voltage vector outputted initially and a timing of outputting the driving voltage vector. When an impertinent driving voltage vector is outputted or a timing of outputting the driving voltage vector is mistaken in switching to normal operation, the motor is brought into out of phase or abnormal sound is emitted.

Figure 5:
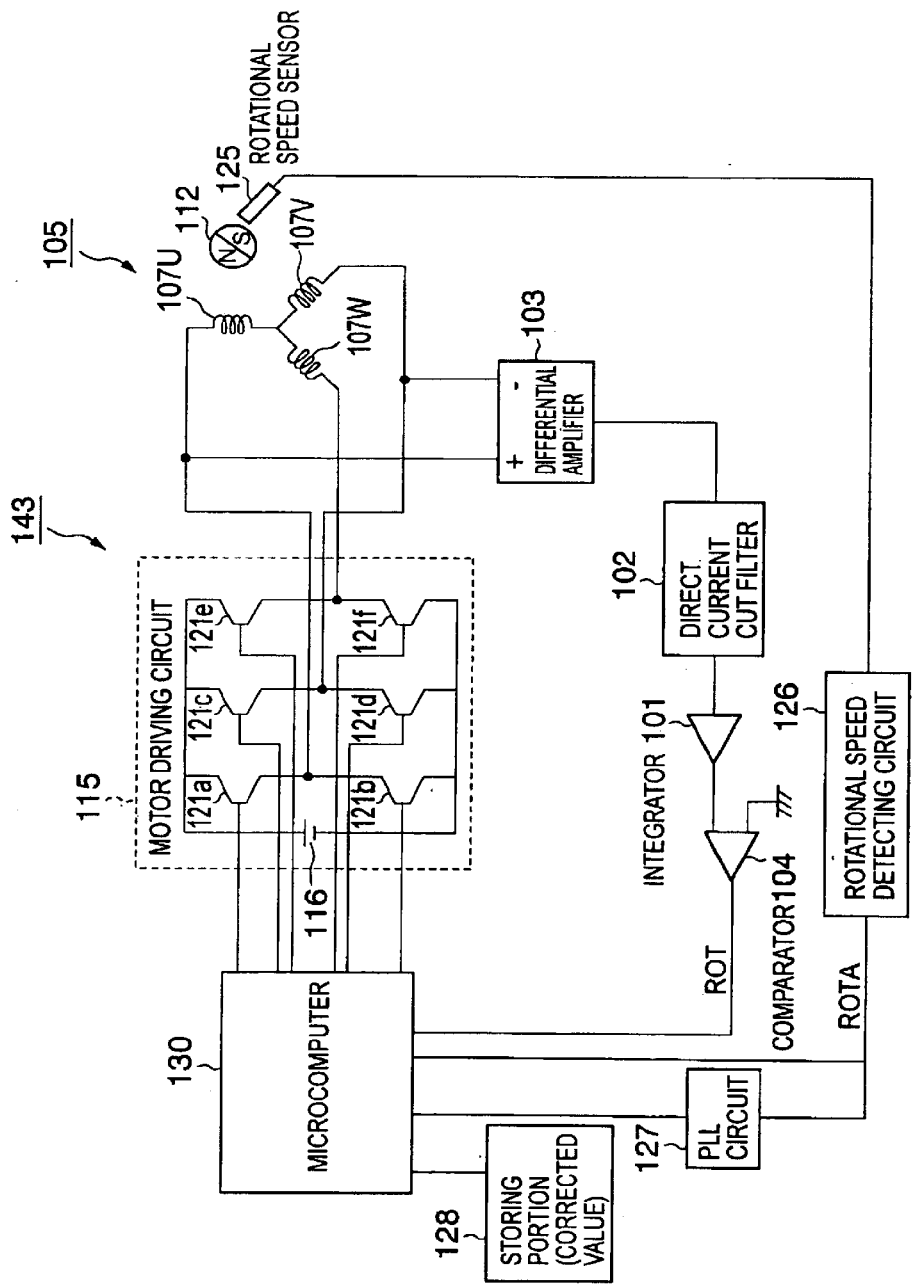
FIG. 5 is a block diagram showing a control circuit of a brush-less motor according to a third embodiment of the invention.

FIG. 5 is a diagram showing a control circuit 143 of a brush-less motor according to the embodiment. According to the control circuit 143, the control circuit 142 of the brush-less motor according to the second embodiment is further provided with a rotational speed sensor 125, a rotational seed detecting circuit 126, a PLL circuit 127 and a storing portion 128. Portions having functions the same as those of the control circuit 142 of the brush-less motor according to the second embodiment are attached with the same numerals.

The rotational speed sensor 125 is attached outside of the motor 105, detects a target attached to a rotor shaft and generates a signal in synchronism with rotation of the rotor 112. For example, the rotational speed sensor 125 is formed by a Hall element or the like and the target is constituted by a magnet or the like. The rotational speed detector may be constructed by a constitution in which the rotational speed detector is installed at inside of the motor 105 for directly detecting the magnetic poles of the rotor 112. A regular waveform which is not superposed with electric noise can be provided from the rotational speed sensor 125.

The rotational speed sensor 125 is connected to the rotational speed detecting circuit 126. The rotational speed detecting circuit 126 calculates the rotational number of the rotor 112 from an output signal of the rotational speed sensor 125 and outputs an ROTA signal (second rotational pulse signal) in a pulse-like shape. The ROTA signal is constituted by signals of binary values (signals in correspondence with two kinds of high and low voltages and the signal having high voltage is designated by notation Hi and the signal having low voltage is designated by notation Lo).

The ROTA signal becomes Hi during a time period in which the rotor 112 is rotated by a half rotation and becomes Lo at a successive half rotation.

The microcomputer 130 and the PLL circuit 127 are connected to the rotational number detecting circuit 126 and receive the ROTA signal from the rotational speed detecting circuit 126.

The PLL circuit 127 generates a 6×f ROTA signal, or a synchronized signal in a pulse-like shape in synchronism with a frequency six times as much as a frequency of the ROTA signal. The synchronizing signal is used in switching the six driving voltage vectors.

The microcomputer 130 calculates the driving voltage vector to be outputted initially and a timing of outputting the synchronizing signal generated by the PLL circuit 127 in switching to normal operation from the ROT signal and the ROTA signal.

Further, the microcomputer 130 is connected with the storing portion 128. This is because when the rotational number of the rotor 1 is increased, there is a case in which the output signal of the rotational speed sensor 125 lags behind a timing at which the target reaches a detected position and a value correcting this is previously stored in the storing portion 128. The microcomputer 130 corrects the rise time and fall time of the ROTA signal by using the correcting value in accordance with the rotational number of the rotor 112.

The microcomputer 130 carries out predetermined calculation from these values and pulses for driving the gates of the transistors 121a, 121b, 121c, 121d, 121e and 121f of the motor driving circuit 115 are switched from those of starting operation according to the second embodiment to those of normal operation.

An explanation will be given of operation of the control circuit 143 of the brush-less motor constituted as described above.

The motor 105 is driven by the method explained in the second embodiment until the motor 105 is started and the rotational number of the rotor 112 reaches a rotational number capable of locking the PLL circuit (for example, 20 rotations per second) That is, the driving voltage vectors 3 and 5 are alternately outputted, the ROT signal is generated by integrating the difference between the voltages of the V-phase terminal and the U-phase terminal and the driving voltage vectors 3 and 5 are switched in synchronism with the ROT signal.

When the rotational number of the rotor 112 reaches a minimum rotational number capable of locking the PLL circuit, the microcomputer 130 calculates the driving voltage vector initially outputted in switching to normal operation and the timing of outputting the driving voltage vector and switches operation of the motor 105 to normal operation.

The driving voltage vector initially outputted in switching operation is calculated as follows.

The microcomputer 130 detects and stores a period T of the ROT signal. Further, the microcomputer 130 detects and stores a time difference Ta of the ROT signal and the ROTA signal.

Figure 6:
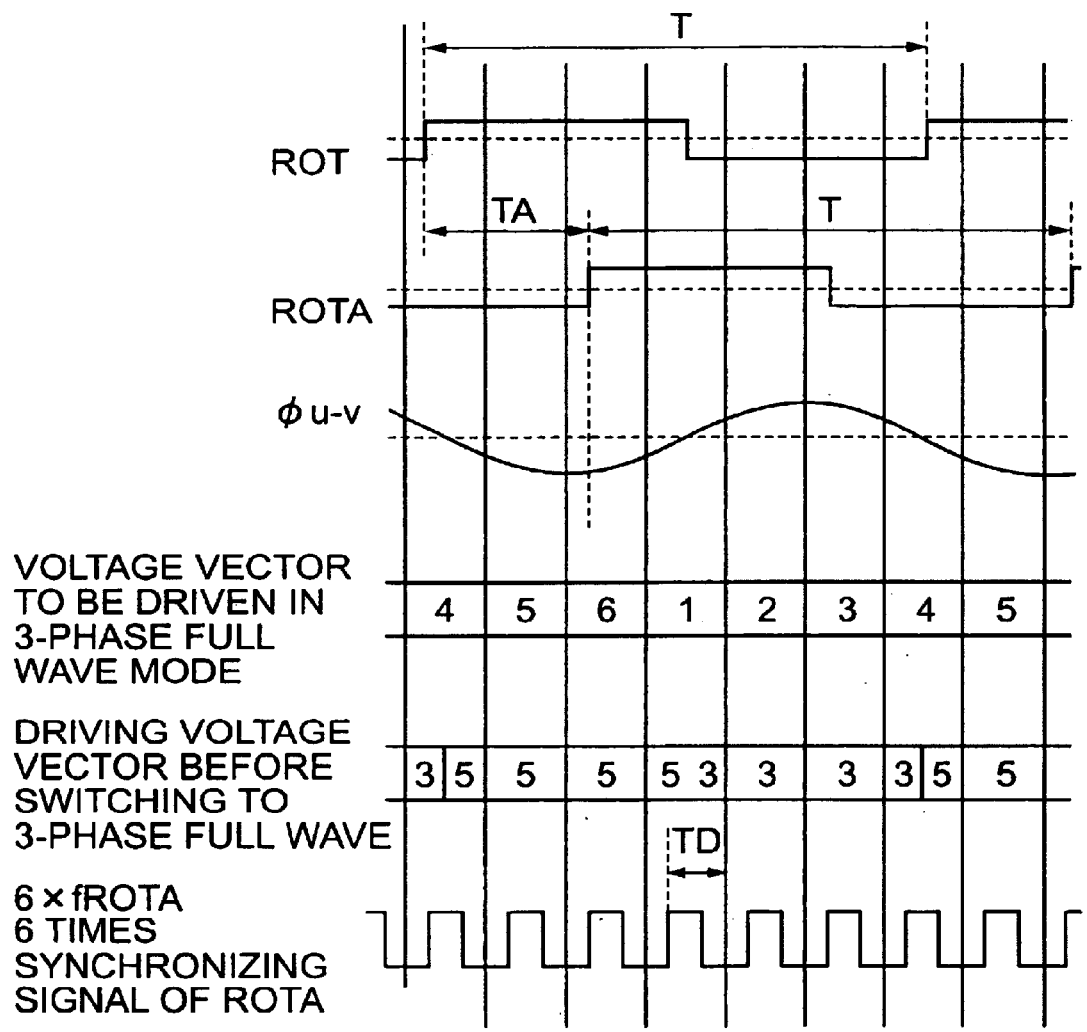
FIG. 6 is a waveform diagram of the control circuit of the brush-less motor according to the third embodiment of the invention.
Figure 8:
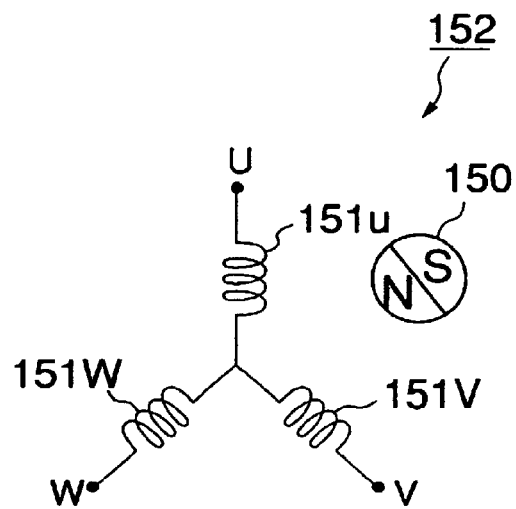
FIG. 8 is a diagram showing a structure of a brush-less motor.
Figure 9:
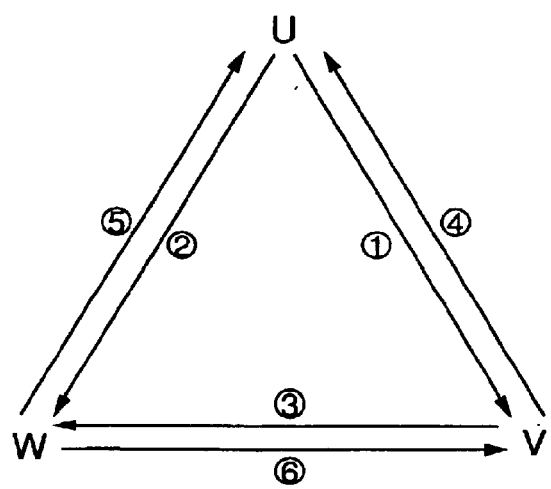
FIG. 9 is a diagram showing driving voltage vectors.

Notation ROT of FIG. 6 designates the ROT signal and notation ROTA designates the ROTA signal. Further, notation φu–v designates the magnetic flux predicting signal φu–v outputted from the integrator 101.

Next, a phase difference Y between the ROT signal and the ROTA signal is calculated by the following formula.

$$Y = Ta/T \qquad (1)$$

FIG. 7 shows the value of Y and numerals of the driving voltage vectors initially outputted in switching to normal operation.

For example, when $3/12 \leq Y < 5/12$, the switching is started from the driving voltage vector 1. When the driving voltage vectors are outputted in accordance with the table of FIG. 7, the positions of the magnetic poles of the rotor 112 and the magnetic field generated by the driving voltage vectors are brought into a pertinent positional relationship.

The driving voltage vector numerals in a column of "voltage vector to be driven in 3 phase full wave mode" of FIG. 6 and the waveform of the magnetic flux predicting signal φu–v show a corresponding relationship of both.

Further, φu–v and the ROT signal are synchronized with each other and therefore, a corresponding relationship between the ROT signal and the driving voltage vectors is also known from the waveform diagram. For example, rise of the ROT signal is disposed at a middle of a time period of outputting the driving voltage vector 4.

The driving voltage vectors may be outputted in an order of 1→2→3→ . . . in synchronism with the ROT signal by dividing one period of the ROT signal in 6.

The waveform of the ROTA signal is constituted by parallelly moving the waveform of the ROT signal and therefore, by Y in Formula (1), as shown by FIG. 7, the ROTA signal and numerals of the driving voltage vectors can be made to correspond to each other.

Next, the microcomputer 130 calculates how much the 6×f ROTA signal which is the 6 times synchronized signal of the ROTA signal is retarded from the ROT signal and outputted. By Formula (1), the numeral of the driving voltage vector to be outputted in correspondence with the ROTA signal is calculated and therefore, successively, the timing of outputting the 6×f ROTA signal is finely adjusted to thereby align timings of rise and fall of the 6×f ROTA signal to timings of rise and fall of the ROTA signal.

A column of "phase lag amount D" of FIG. 7 shows a phase lag amount in correspondence with respective value of Y. The microcomputer 130 calculates phase lag time period Td from the period T of the ROTA signal and the phase lag amount D by the following formula.

$$Td = T \times D \quad (2)$$

Further, the microcomputer 130 retards the 6×f ROTA signal generated by the PLL circuit 127 by Td and outputs a gate drive pulse in correspondence with the numeral of the vector to be driven to the motor driving circuit 115. The gate drive pulse updates the driving voltage vector in an order of 1→2→3→4→ . . . at every rise of the 6×f ROTA signal to thereby carry out steady-state operation of the motor 105.

Further, when the rotational speed of the rotor 112 is increased, there is a case in which a detected signal of the rotational speed detecting sensor 125 is retarded from time at which the target reaches the detected position of the rotational speed detecting sensor 125. In this case, the ROTA signal is outputted by being delayed from the value to be provided originally. When there is previously known a relationship between the delay amount and the rotational speed of the rotor 112, the relationship is stored to the corrected value storing portion 128 as the corrected value and the ROTA signal is corrected at inside of the microcomputer 130.

By the above-described means, the motor 105 started by means of the second embodiment can swiftly be shifted to the steady state by the 6×f ROTA signal of the PLL circuit 127.

Although it is normally necessary for controlling a sensor-less brush-less motor to measure impedance of motor wiring and monitoring and correcting current of the motor, according to the control circuit 143 of the brush-less motor of the embodiment, these operations are not needed and therefore, the circuit is simplified and the cost is reduced.

Further, also when the motor 105 started by the control circuit 141 of the brush-less motor according to the first embodiment is switched to a steady-state operation, the switching can be carried out similar to the embodiment.

(Fourth Embodiment)

According to the embodiment, the positions of the magnetic poles of the rotor are detected by a change in magnetic flux caused in the motor wirings.

First, there are derived theoretical formulas constituting the basis in executing the embodiment.

Figure 10:
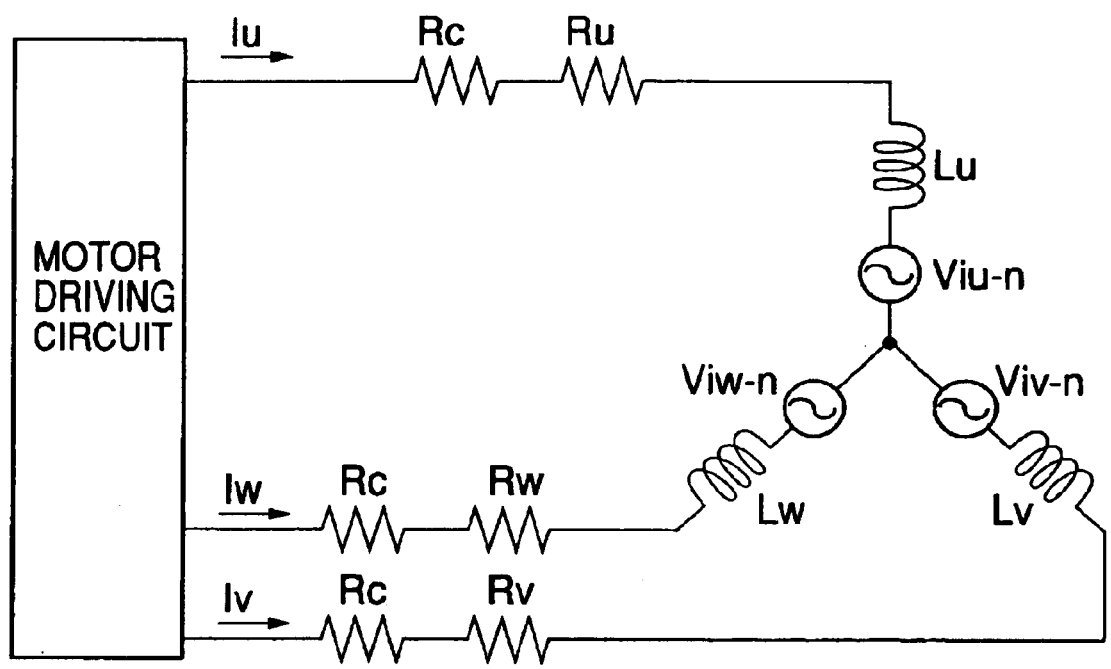
FIG. 10 is a diagram showing resistance values and inductances of motor windings and resistance values of connection cables.

FIG. 10 is a diagram showing resistance values and inductances of cables connecting the motor and the motor windings. The motor windings of U-phase, V-phase and W-phase are connected by star connection.

Viu-n is a voltage generated in the U-phase motor winding by rotating the rotor. The U-phase motor winding is provided with an impedance Lu and a resistance value Ru. Further, the cable is provided with a wiring resistance value Rc. V-phase and W-phase are structurally symmetrical with U-phase and therefore, by changing the suffix u respectively to v and w, there are provided values respectively in correspondence with V-phase and W-phase. Further, currents flowing in U-phase, V-phase and W-phase are respectively designated by notations Iu, Iv and Iw.

Here, Rp, Lp and Viu–v are put as follows.

$$Rc+Ru=Rc+Rw=Rc+Rv=Rp$$

$$Lu=Lw=Lv=Lp$$

$$(Viu-n)-(Viv-n)=Viu-v$$

The following formula is derived from above formulas.

$$Vu\text{-}v = Viu\text{-}v + Rp(Iu\text{-}Iv) + Lp \times d(Iu\text{-}Iv)/dt$$

Here, Vu–v is constituted by subtracting voltage of V-phase motor winding from voltage of U-phase motor winding. When the above formula is integrated, Formula (3) is provided as follows.

$$\int Vu\text{-}vdt = \int (Viu\text{-}v + Rp \times (Iu\text{-}Iv))dt + Lp \times (Iu\text{-}Iv) \quad (3)$$

Here, the magnetic flux predicting signal φu–v indicating magnetic flux in U-phase motor winding and V-phase motor winding is represented by Formula (4) as follows.

$$\phi u\text{-}v = \int Viu\text{-}vdt \quad (4)$$

Here, consider various amounts represented by Formulas (5), (6), (7) as follows.

$$\int Vu\text{-}vdt \quad (5)$$

$$\int Rp \times (Iu\text{-}Iv)dt \quad (6)$$

$$Lp \times (Iu\text{-}Iv) \quad (7)$$

It is known that by Formula (3), when Formulas (6) and (7) are subtracted from Formula (5), the magnetic flux φu–v is calculated.

According to the embodiment, the relationships are realized by using an electric circuit, the magnetic flux prediction φu–v is calculated and based on the magnetic flux predicting signal φu–v, currents of the motor windings are switched.

Figure 11:
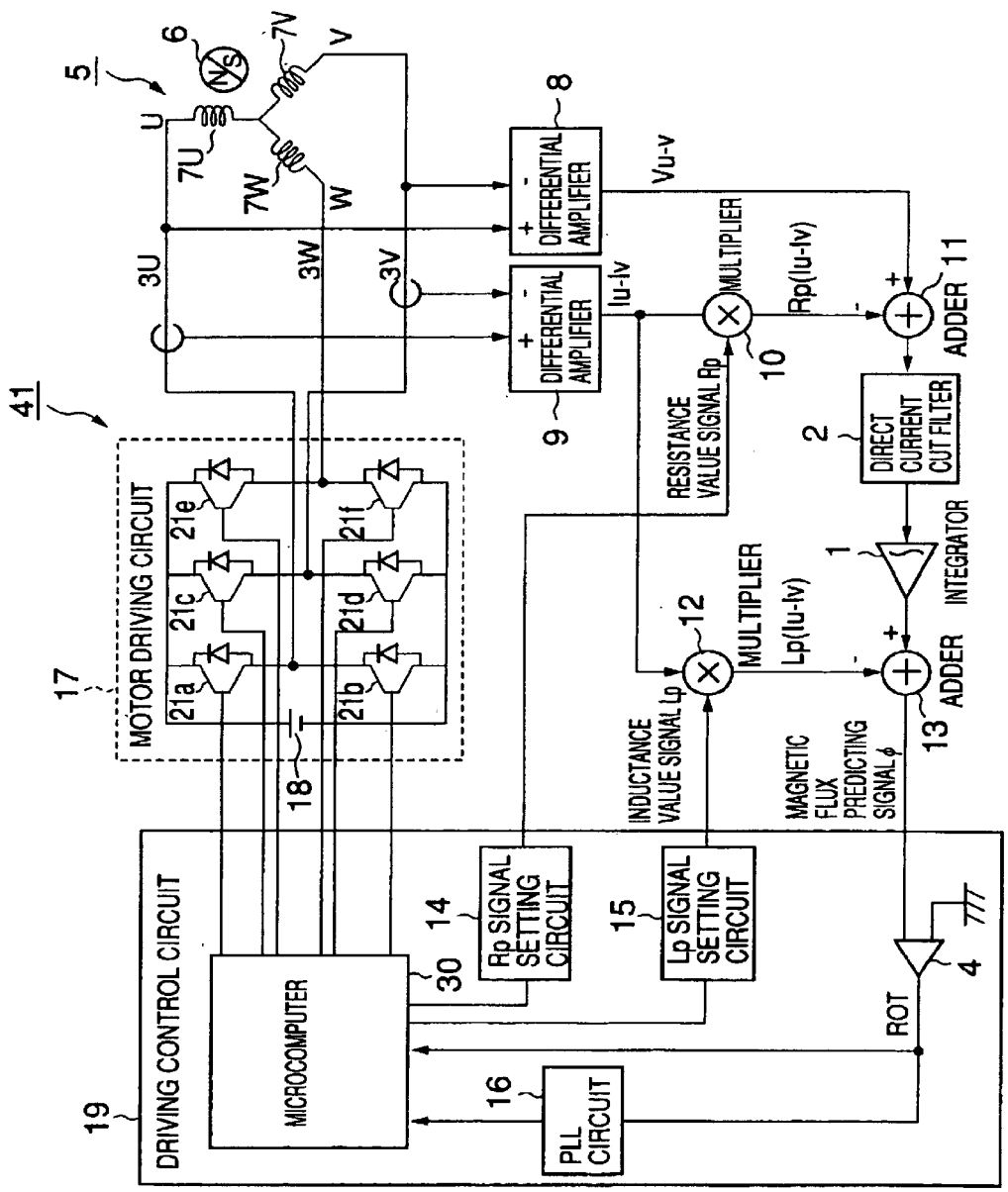
FIG. 11 is a block diagram showing a control circuit according to a fourth embodiment.

FIG. 11 is a block diagram showing a constitution of a control circuit 41 of a sensor-less brush-less motor according to the fourth embodiment.

The control circuit 41 is provided with a motor 5, a motor driving circuit 17 and a driving control circuit 19.

A motor 5 is constituted by motor windings 7U, 7V and 7W and a rotor 6 having a pair of magnetic poles of N-pole and S-pole. Although the motor windings 7U, 7V and 7W and the rotor 6 are separately shown for convenience of illustration, actually, the motor windings 7U, 7V and 7W are arranged at the surrounding of the rotor 6. In driving the motor, current is made to flow to two of the motor windings, for example, current is made flow to the motor windings 7U and 7V in U→V direction, the magnetic poles of the rotor 6 are attracted to a magnetic field produced by the motor windings by the current and rotated. By successively switching the motor windings for making current flow and directions of current based on the positions of the magnetic poles of the rotor 6, the rotor 6 continues rotating.

The motor driving circuit 17 is constituted by a direct current power source 18 and six transistors 21a, 21b, 21c, 21d, 21e and 21f forming a three-phase bridge. Bases of the transistors are respectively connected to a microcomputer 30 in the driving control circuit 19 and made ON/OFF by gate signals from the microcomputer 30 for supplying predetermined current to the motor windings 7U, 7V and 7W.

Further, the control circuit 41 includes circuit elements for calculating the magnetic flux predicting signal φu–v by carrying out calculation from Formula (4) to Formula (7), mentioned above. The circuit elements are constituted by differential amplifiers 8 and 9, multipliers 10 and 12, adders 11 and 13, an integrator 1 and a direct current cut filter 2.

The differential amplifier 8 is connected to the motor windings 7U and 7V and outputs a value Vu–v produced by subtracting voltage of the motor winding 7V from voltage of the motor winding 7U.

The differential amplifier 9 detects currents Iu and Iv flowing in the motor windings 7U and 7V and outputs a difference therebetween Iu–Iv.

The multiplier 10 is connected to the differential amplifier 9 and an Rp signal setting circuit 14 in the driving control circuit 19. The Rp signal setting circuit 14 outputs a synthesized resistance value of a resistance value of any of the motor windings 7U, 7V and 7W (three of them are provided with the same resistance value) and a resistance value of any of the cables 3U, 3V and 3W for connecting the motor windings and the motor driving circuit 17 (three of them are provided with the same resistance value). The multiplier 10 receives Iu-Iv from the differential amplifier 9 and Rp from the Rp signal setting circuit 14 and outputs Rp×(Iu–Iv) which is a product of both.

The adder 11 is connected to the differential amplifier 8 and the multiplier 10 and the adder 11 receives Vu–v from the differential amplifier 8 and Rp×(Iu–Iv) from the multiplier 10 and outputs a difference produced by subtracting Rp×(Iu–Iv) from Vu–v, that is, (Vu–v)–Rp×(Iu–Iv). This is the value to be integrated in Formula (6).

The output of the adder 11 is inputted to the integrator 1 via the direct current cut filter 2. This is for preventing a direct current component included in the output of the adder 11 from being integrated by the integrator 1.

The integrator 1 integrates the output of the adder 11 removed of the direct current component and outputs $\int ((Vu-v)-Rp\times(Iu-Iv))dt$. The output of the integrator 1 corresponds to the case of subtracting Formula (6) from Formula (5). Further, by the integration, electric noise superposed on the input signal of the integrator 1, that is, (Vu–v)–Rp×(Iu–Iv) is removed. This is because noises are randomly generated positively and negatively with the signal value as reference and therefore, when these are integrated and added together, these are canceled by each other.

The multiplier 12 is connected to the differential amplifier 9 and an Lp signal setting circuit 15, receives Iu–Iv from the differential amplifier 9 and Lp from the Lp signal setting circuit 15 and outputs a product of both, that is, Lp×(Iu–Iv). The value corresponds to Formula (7).

The adder 13 outputs a value produced by subtracting the output of the adder 12, that is, Lp×(Iu–Iv) from output of the integrator 1, that is, $\int ((Vu-v)-Rp\times(Iu-Iv))dt$. The output of the adder 13 corresponds to the value produced by subtracting Formula (6) and Formula (7) from Formula (5) and is equal to the magnetic flux predicting signal φu–v. The waveform of the magnetic flux predicting signal φu–v becomes a sine curve in synchronism with rotation of the rotor 6.

The driving control circuit 19 is constituted by a comparator 4, a PLL (Phase Lock Loop) circuit 16, the Lp signal setting circuit 15, the Rp signal setting circuit 14 and the microcomputer 30. The comparator 4 is provided with two input terminals and one of them is connected to the magnetic flux predicting signal φu–v and other thereof is connected to the ground. The comparator 4 outputs binary value signals (signals in correspondence with two kinds of high and low voltages and the signal having high voltage is designated by notation Hi and the signal having low voltage is designated by notation Lo).

Further, the comparator 4 compares the magnetic flux predicting signal φu–v and the ground level and outputs Lo when the magnetic flux predicting signal φu–v is smaller than the ground level and outputs Hi when the magnetic flux predicting signal φu–v is larger than the ground level.

The magnetic flux predicting signal φu–v becomes a sine wave in synchronism with the rotor 6 and therefore, the comparator 4 outputs Hi during a time period of rotating the rotor by a half rotation and outputs Lo during a time period of a successive half rotation. The signal is referred to as ROT signal (rotational pulse signal). The output terminal of the comparator 4 is connected to the microcomputer 30 and the PLL circuit 16.

The PLL circuit 16 receives the ROT signal, generates a 12×f ROT signal which a multiplied synchronized signal in synchronism with a frequency 12 times as much as the rotational number of the rotor 6 and outputs the signal to the microcomputer 30.

The Rp signal setting circuit outputs the value of the resistance value Rp stored in the microcomputer 30 to the multiplier 10.

The Lp signal setting circuit outputs the inductance value Lp stored in the microcomputer 30 to the multiplier 12.

The synthesized resistance value Rp of the resistance value of the motor windings 7U, 7V and 7W and the resistance value of the cables 3U, 3V and 3W connecting the motor windings and the motor driving circuit 17, and the inductance Lp of the motor windings are previously measured by a measuring instrument and stored to the microcomputer 30.

The microcomputer 30 supplies predetermined gate signals to the transistors 21a, 21b, 21c, 21d, 21e and 21f based on the 12×f ROT signal of the PLL circuit 16 and successively switches currents of the motor windings 7U, 7V and 7W.

An explanation will be given of operation of the control circuit 41 of the sensor-less brush-less motor constituted as described above in reference to a waveform diagram of FIG. 12.

A frequency capable of locking (operating) the PLL circuit 16 is about 20 [Hz] and therefore, currents of the motor windings 7U, 7V and 7W are switched by an open loop after starting the motor 5 until the rotational speed of the rotor 6 reaches about 20 rotations per second.

When the rotational speed of the rotor 6 reaches about 20 rotations per second, the ROT signal is produced from the magnetic flux predicting signal φu–v, thereby, currents of the motor windings 7U, 7V and 7W can be controlled to switch by a feedback control.

Figure 12:
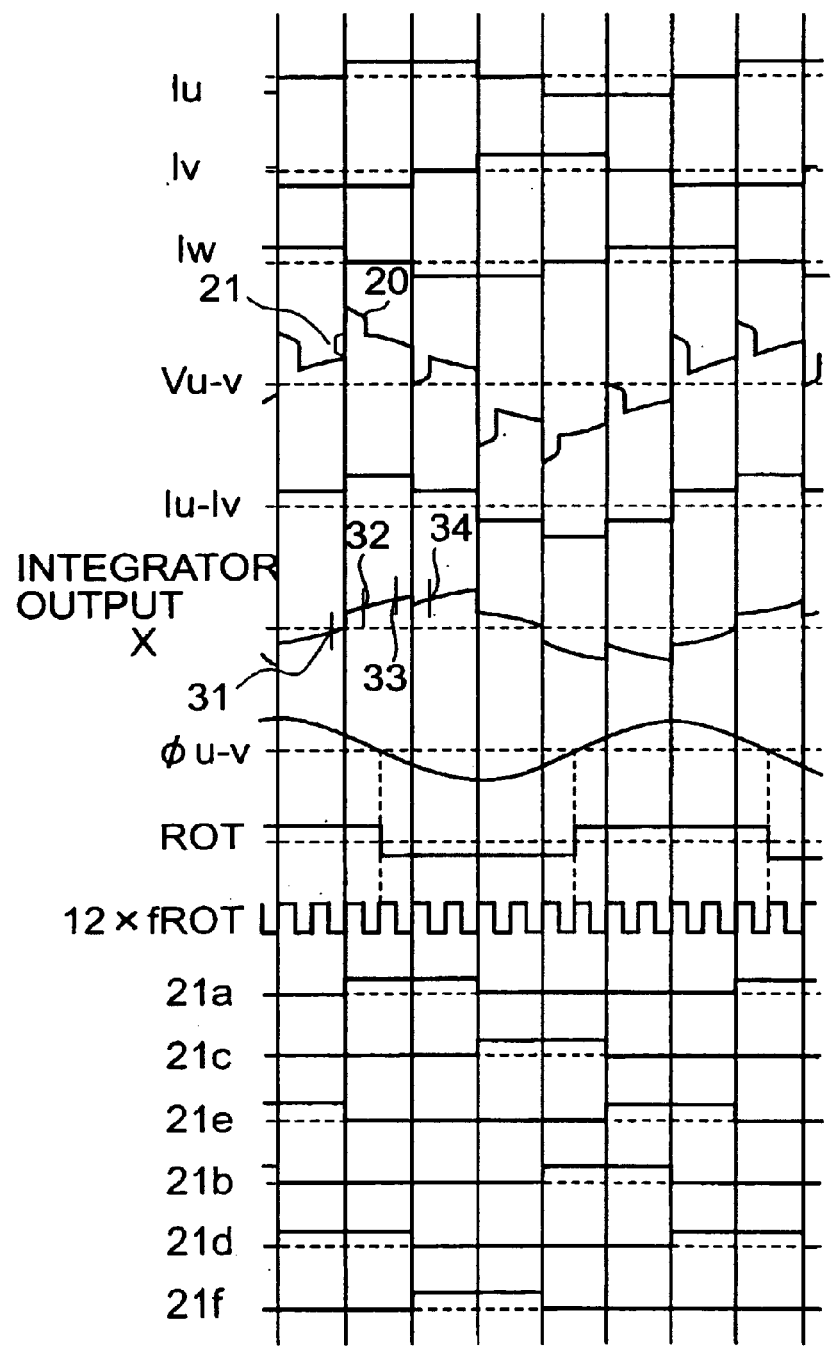
FIG. 12 is a waveform diagram showing waveforms of current and voltage of motor windings, a magnetic flux predicting signal $\phi u\text{-}v$, an ROT signal and so on when a rotor is rotated by using the circuit.

The currents of the motor windings 7U, 7V and 7W are respectively formed in waveforms of Iu, Iv and Iw of FIG. 12. The microcomputer 30 controls voltages supplied to the motor windings 7U, 7V and 7W by PWM (Pulse Width Modulation) such that the currents become rectangular waves.

The differential amplifier 8 receives the difference between the voltages of the motor windings 7U and 7V and outputs a waveform shown by Vu–v of FIG. 12. Voltage 20 in a spike-like shape which appears in switching currents of the motor windings 7U, 7V and 7W is caused by the inductances Lp provided to the motor windings 7U, 7V and 7W and a stepped difference 21 between contiguous waveform indicates voltage drop caused by the synthesized resistance value Rp of the resistance value of the motor windings 7U, 7V and 7W and the resistance value of the cables 3U, 3V and 3W connecting these and the motor driving circuit 17.

The differential amplifier 9 outputs a difference between Iu and Iv and a waveform thereof becomes a waveform shown by Iu–Iv of FIG. 12.

The multiplier 10 multiplies Iu–Iv by Rp.

The adder 11 outputs (Vu–v)–Rp×(Iu–Iv). The signal is inputted to the integrator 1 after having been removed of the superposed direct current component by the direct current cut filter 2.

The integrator 1 outputs ∫((Vu–v)–Rp×(Iu–Iv))dt, which becomes a waveform indicated by notation X of FIG. 12. A stepped difference seen in the waveform X is caused by the inductance of the motor windings 7U, 7V and 7W.

The output of the integrator 1 is subtracted by Lp×(Iu–Iv) by the adder 13. The magnetic flux predicting signal φu–v indicated by a waveform of φu–v of FIG. 12 is outputted from the adder 13. As is known from the waveform, the magnetic flux predicting signal φu–v becomes a sine wave constituting one period by one rotation of the rotor 6.

The comparator 4 compares the magnetic flux predicting signal φu–v and the ground level and outputs the ROT signal. As mentioned above, the ROT signal becomes Hi when the magnetic flux predicting signal φu–v is smaller than the ground level and the signal Lo when the magnetic flux predicting signal φu–v is larger than the ground level. The ROT signal becomes Hi during a time period of half rotation of the rotor 6 and Lo during a time period of half rotation thereafter as shown by the waveform of ROT in FIG. 12.

The PLL circuit 16 receives the ROT signal from the comparator 4 and generates the multiplied synchronized signal 12×f ROT signal having a frequency 12 times as much as that of the ROT signal.

There are a total of six kinds in the way of switching currents of the motor windings 7U, 7V and 7W, for example, W→V direction or U→V direction and accordingly, basically, when the multiplied synchronized signal 6×f ROT signal having the frequency 6 times as much as that of the ROT signal is generated, in synchronism with the signal, the above-described six currents can be switched. Here, 12×f ROT signal having the frequency 12 times as much as that of the ROT signal is generated for correcting a shift of a phase of φu–v by the integration.

A further detailed explanation will be given as follows.

The microcomputer 30 switches the currents of the motor windings 7U, 7V and 7W every time of rotating the rotor 6 by 60°. Vertical lines of FIG. 12 designate timing of switching the currents and an interval therebetween is 60° in rotation of the rotor 6. Meanwhile, the phase of φu–v is advanced by 90° from the phase of the original signal by integration. Therefore, the phase of the ROT signal generated from φu–v is also advanced by 90° and rise and fall of the ROT signal and timings of switching the currents are deviated from each other by 30°. Hence, when the 12×f ROT signal having the period 12 times as much as that of the ROT signal is generated, the timings of switching the currents and rise of the 12×f ROT signal can be made to coincide with each other.

When the timings of switching the currents of the motor windings 7U, 7V and 7W and the rise of the 12×f ROT signal are made to coincide with each other in this way and the currents of the motor windings 7U, 7V and 7W are switched at every twice rise of the 12×f ROT signal, the motor 5 can be operated.

The microcomputer 30 is stored with a program of supplying predetermined gate signals to the bases of the transistors 21a, 21b, 21c, 21d, 21e and 21f by the ROT signal and 12×f ROT and switches on the transistors in correspondence with the respective numerals as shown by 21a, 21h, 21c, 21d, 21e and 21f of FIG. 12. For example, when the transistors 21d and 21e are made ON, current is made to flow in the motor windings 7V and 7W in W→V direction. Further, as mentioned above, the currents flowing in the motor windings 7U, 7V and 7W are controlled by the PWM control to predetermined values by the microcomputer 30.

According to the embodiment, Rp and Lp are previously measured and therefore, in place of the multiplier 10, an amplifier having gain of Rp can be used, further, in place of the multiplier 12, an amplifier having gain of Lp can be used.

Further, although according to the embodiment, the current and the voltage of the motor windings 7U and 7V are monitored, the embodiment is not limited thereto but voltage and current of the arbitrary motor windings may be monitored.

According to the control circuit 41 of the sensor-less brush-less motor of the embodiment, the positions of the magnetic poles of the rotor 6 can always be monitored and therefore, even when the rotational number of the rotor 6 is significantly changed by a variation in load, the motor 5 can pertinently be controlled without being brought into out of phase. Further, the signal for detecting the positions of the magnetic poles of the rotor 6 is integrated and therefore, the positions of the magnetic poles can accurately be detected without being influenced by electric noises superposed on the signal.

(Fifth Embodiment)

Although according to the fourth embodiment, the synthesized resistance value Rp of the resistance value of the motor windings 7U, 7V and 7W and the resistance value of the cables 3U, 3V and 3W connecting these and the motor driving circuit 17, is previously measured by a measuring instrument and the values are stored to the microcomputer 30, according to the embodiment, a description will be given of a case in which Rp is automatically measured and stored to the microcomputer 30.

Figure 13:
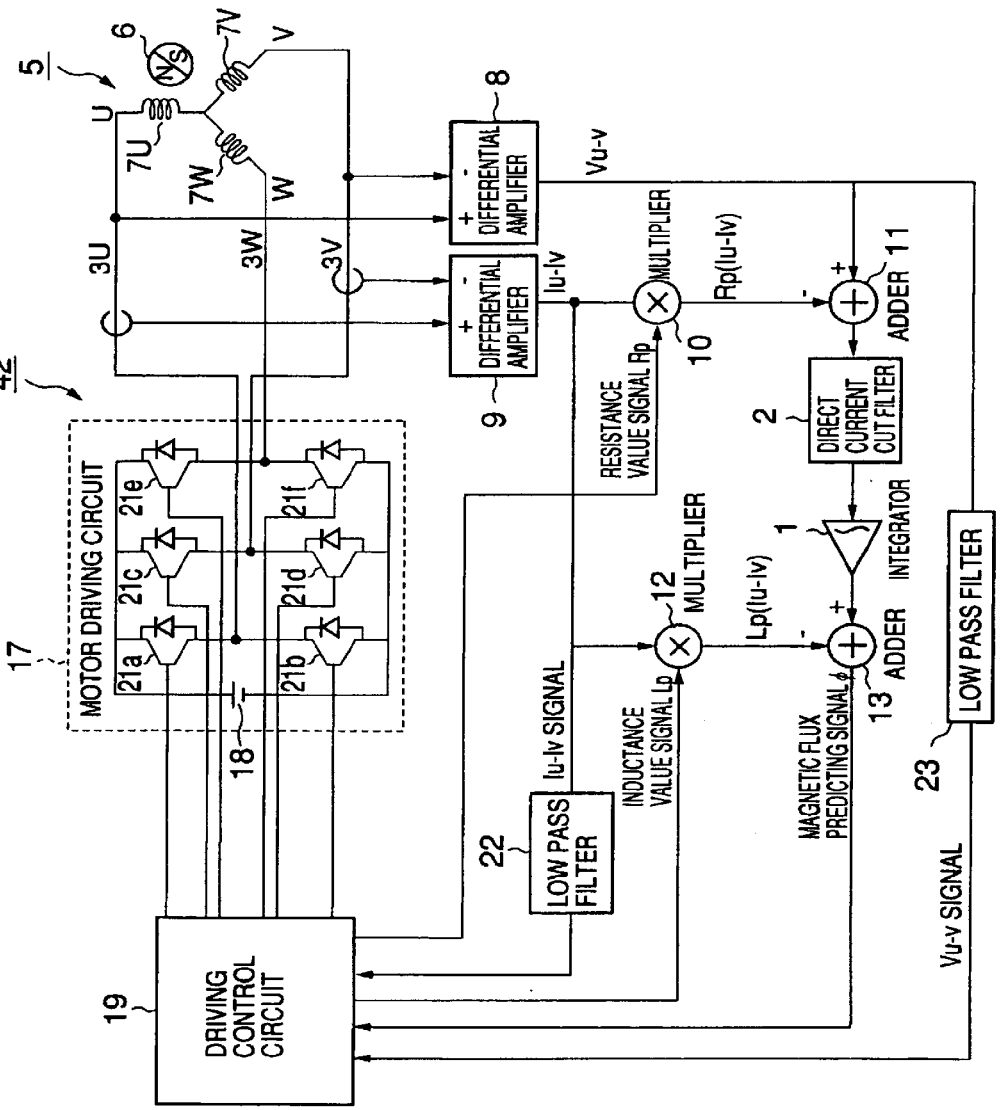
FIG. 13 is a block diagram showing a constitution of a control circuit according to a fifth embodiment.

FIG. 13 is a block diagram showing a constitution of a control circuit 42 of a sensor-less brush-less motor according to the fifth embodiment of the invention.

The control circuit 42 according to the embodiment is constituted by newly adding low pass filters 22 and 23 to the control circuit 41 of the fourth embodiment. The other constitution is the same as that of the control circuit 41 and therefore, numerals the same as those of the control circuit 41 are attached to the constituent elements.

The low pass filter 22 is connected to the differential amplifier 9 and the microcomputer 30, not illustrated, in the driving control circuit 19.

The low pass filter 22 receives Iu–Iv from the differential amplifier 9, removes high frequency noise superposed thereon and thereafter outputs the signal to the microcomputer 30.

The Low pass filter 23 is connected to the differential amplifier 8 and the microcomputer 30, not illustrated, in the driving control circuit 19. The low pass filter 23 receives the inter-cable voltage Vu–v of cables 3U and 3V from the differential amplifier 8, removes high frequency noise superposed thereon and outputs the signal to the microcomputer 30.

Since the signal Iu–Iv outputted from the differential amplifier 9 and the signal Vu–v outputted from the differential amplifier 9, are superposed with high frequency noise caused by switching the currents of the motor windings 7U, 7V and 7W and the PWM control of these, the low pass filters 22 and 23 are used in this way to remove the high frequency noise and promote measurement accuracy.

An explanation will be given of operation of the control apparatus 42 of the sensor-less brush-less motor constituted as described above.

Further, an explanation will be given here only of a procedure of automatically measuring Rp. The other operation of the control circuit 42 is the same as that of the control circuit 41 according to the fourth embodiment.

In starting the motor 5, direct current is made to flow in the motor windings 7U and 7V in U→V direction and inter-cable voltage of the cables 3U and 3V is measured by the differential amplifier 8.

Noise is removed from the voltage by the low pass filter 23 and the value is stored to the microcomputer 30.

Next, a value of current flowing in the cables 3U and 3V is measured by the differential amplifier 9, high frequency noise superposed on the value is removed by the low pass filter 22 and the value is stored to the microcomputer 30.

The microcomputer 30 calculates Rp by the following formula.

$$Rp=(Vu-v)/(Iu-Iv) \quad (8)$$

The microcomputer 30 stores Rp calculated by Formula (8) and outputs Rp to the Rp signal setting circuit 14 when the motor 5 is operated. Further, the Rp is multiplied by Iu–Iv by the multiplier 10 and is used for calculating the magnetic flux predicting signal φu–v.

Further, in measuring Rp, the measurement accuracy can be promoted by making the transistor 21d stay to be switched on and controlling only the transistor 21a by PWM control.

Further, although Iu–Iv is calculated here by the differential amplifier 9, there may be constructed a constitution in which Iu and Iv are respectively detected and a difference therebetween is calculated by the microcomputer 30.

Further, when there is installed a safety apparatus in which an alarm is outputted when the value of Rp provided as a result of the calculation exceeds a normal value range (for example, from 0.5 [Ω] to 10 [Ω]) such that the motor 5 is not driven, the safety can be promoted.

According to the embodiment, the synthesized resistance value of the resistance values of the motor windings 7U, 7V and 7W and the resistance values of the cables 3U, 3V and 3W, is automatically measured in starting the motor 5, the value is outputted to the multiplier 10 as Rp and therefore, it is not necessary to previously measure Rp by using a measuring instrument as in the control circuit of the conventional sensor-less brush-less motor.

Therefore, although conventionally, when the cables 3U, 3V and 3W are extended or the motor 5 is interchanged by other motor at a site of using the sensor-less brush-less motor, it is necessary to measure again Rp by using a measuring instrument, according to the control circuit 42 of the embodiment, such an operation is dispensed with.

(Sixth Embodiment)

Although according to the fourth embodiment, the impedance Lp of the motor windings 7U, 7V and 7W is previously measured by a measuring instrument and stored to the microcomputer 30, according to the embodiment, a description will be given of a case of automatically measuring Lp and storing the Lp to the microcomputer 30.

Figure 14:
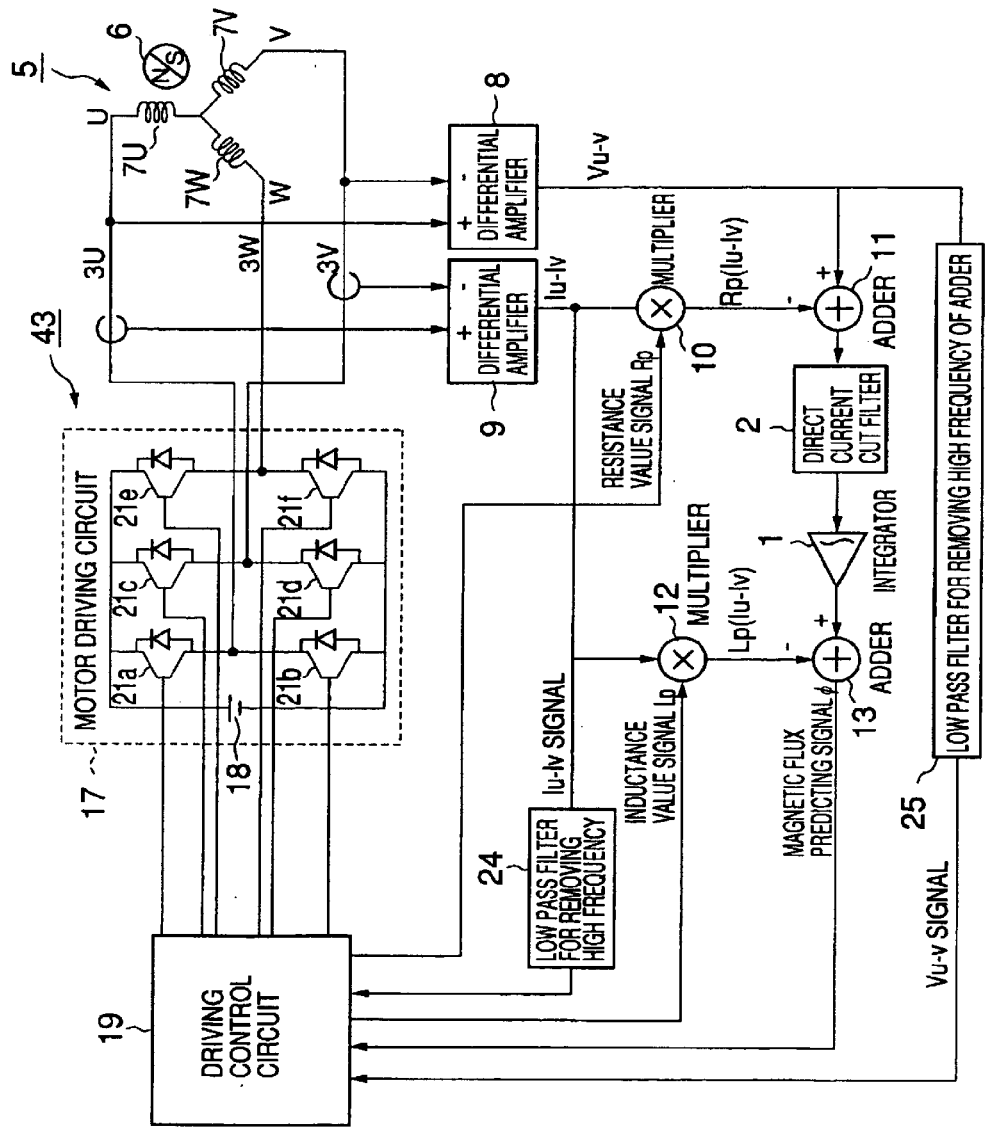
FIG. 14 is a block diagram showing a constitution of a control circuit according to a sixth embodiment.

FIG. 14 is a block diagram showing a constitution of a control circuit 43 of a sensor-less brush-less motor according to the sixth embodiment of the invention.

According to the control circuit 43 of the embodiment, the low pass filters 22 and 23 of the control circuit 42 according to the fifth embodiment are replaced by low pass filters 24 and 25 particularly for removing high frequency. The other constitution is the same as that of the control circuit 42 and numerals the same as those of the control circuit 42 are attached to the same constituent elements.

According to the embodiment, in order to calculate the impedance of the motor windings 7U, 7V and 7W, there is used alternating current voltage of high frequency of, for example, about 1 [kHz]. Further, the alternating current voltage is controlled by a PWM control by the microcomputer 30, not illustrated, in the driving control circuit 19 and therefore, the alternating current voltage is superposed with noise of a PWM frequency, for example, 50 [kHz] Hence, for example, by using the low pass filter having a cutoff frequency of 5 [kHz], noise caused by the PWM control can be removed from a desired signal and measurement accuracy can be promoted.

An explanation will be given of operation of the control circuit 43 of the sensor-less brush-less motor constituted as described above.

In the state in which the rotor 6 is stopped, the motor windings 7U and 7V are applied with alternating current voltage Vu–v having high frequency which the rotor 6 cannot rotationally respond (for example, ft.=1 [kHz]) in U→V direction. The rotor 6 cannot follow an inverting magnetic field produced by the motor windings 7U and 7V and does not rotate.

Next, the differential amplifier 9 detects alternating current Iu–Iv at this occasion. The value is removed of high frequency noise by the low pass filter 25 and is stored to the microcomputer 30, not illustrated, in the driving control circuit.

Meanwhile, the differential amplifier 8 detects inter-cable voltage of the cables 3U and 3V. The value is removed of high frequency noise by the low pass filter 24 and is stored to the microcomputer 30.

The microcomputer 30 calculates Lp by Formula (9) as follows from the stored alternating current voltage Vu–v and the stored alternating current Iu–Iv.

$$Lp=(Vu-v)/(2\times\pi\times ft.\times(Iu-Iv)) \quad (9)$$

The microcomputer 30 stores a value provided from Formula (9) as Lp. Further, when the motor 5 is operated, the value is outputted to the Lp signal setting circuit 15. The Lp is multiplied by Iu–Iv by the multiplier 12 and is used in calculating the magnetic flux predicting signal φu–v. The other operation of the control circuit 43 is the same as that of the fourth embodiment.

Further, when there is installed a safety apparatus in which an alarm is outputted when a value of Lp provided as a result of the calculation exceeds a normal value range (for example, from 0 [mH] to 1 [mH]) such that the motor 5 is not driven, the safety can be promoted.

According to the embodiment, the impedance of the motor windings 7U, 7V and 7W is automatically measured in stopping the motor 5, the value is outputted to the Lp signal setting circuit 15 as Lp and therefore, it is not necessary to previously measure Lp by using a measuring instrument as in the control circuit of the conventional sensor-less brush-less motor.

Therefore, although conventionally, when the motor 5 is interchanged by other motor, it is necessary to measure again Lp by using a measuring instrument at a site of using the sensor-less brush-less motor, according to the control circuit 43 of the embodiment, such an operation is dispensed with.

Further, Rp can also be measured similar to the fifth embodiment by the constitution of the control circuit 43 and both of Rp and Lp can automatically be measured.

Further, since Lp of a sensor-less brush-less motor used in a magnetic bearing type turbo molecular pump rotating normally at high speed equal to or faster than 300 rotations per second is small, the motor 5 can be operated by omitting to detect Lp and setting Lp previously to a predetermined value (for example, several hundreds [$\mu$H]) and using the Lp.

(Seventh Embodiment)

According to the embodiment, an explanation will be given of a case of automatically measuring the inductance Lp of the motor windings 7U, 7V and 7W by means different from that of the sixth embodiment.

Figure 15:
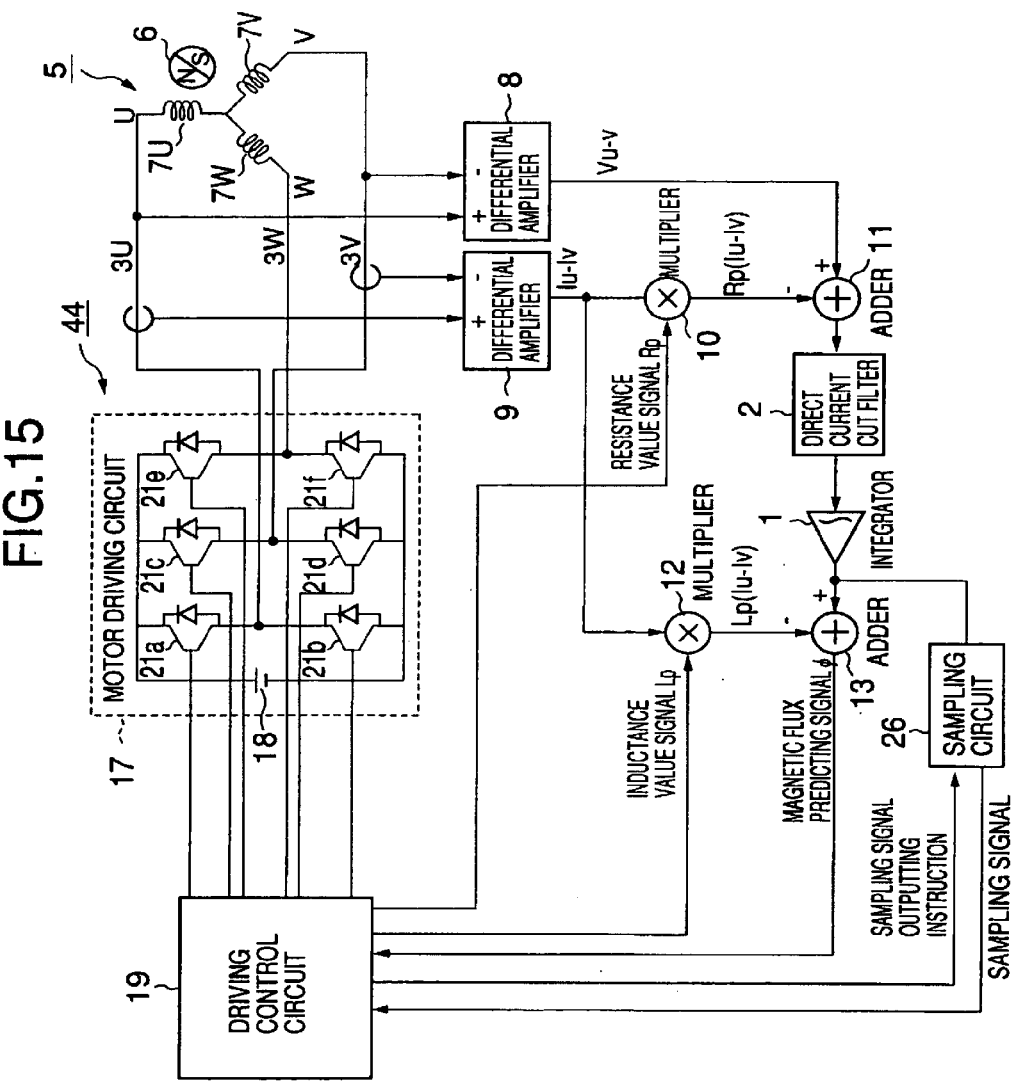
FIG. 15 is a block diagram showing a constitution of a control circuit according to a seventh embodiment.

FIG. 15 is a block diagram showing a control circuit 44 of a sensor-less brush-less motor according to a seventh embodiment of the invention. The control circuit 44 is constituted by further adding a sampling circuit 26 to the control circuit 41 of the fourth embodiment. The sampling circuit 26 is connected to the integrator 1 and the microcomputer 30, not illustrated, in the driving control circuit. When the sampling circuit 26 receives a sampling signal outputting instruction from the microcomputer 30, the sampling circuit 26 samples a value of the output X of the integrator and transmits the sampling signal to the microcomputer 30.

The other (or remaining) constitution is the same as that of the control circuit 41 and therefore, the same numerals are attached to constituent elements the same as those of the control circuit 41.

Next, an explanation will be given of theoretical formulas constituting the basis in carrying out the embodiment.

The output X of the integrator 1 sampled by the sampling circuit 26 is expressed by Formula (10) as follows.

$$X = Lp \times (Iu - Iv) + \int Viu - vdt \quad (10)$$

Here, when currents of the motor windings 7U, 7V and 7W are switched, the first term of Lp×(Iu–Iv) of Formula (10) is significantly changed, however, change of the second term $\int$ Viu–vdt is small. Further, the currents Iu, Iv, and Iw supplied to the motor 5 are controlled by PWM control by the driving control circuit 19 such that the currents become the constant value Ip and therefore, in consideration of Formula (10), X (point 32)–X (point 31) which is a difference between two points represented by point 31 and point 32 on the waveform diagram of X of FIG. 12, is expressed by Formula (11) as follows.

$$X(\text{point } 32) - X(\text{point } 31) = Lp \times Ip \quad (11)$$

Here, the control circuit 44 is constituted by only adding the sampling circuit 26 to the controlling circuit 41 and therefore, a waveform diagram of the control circuit 44 becomes the same as that of the control circuit 41.

Lp is expressed by Formula (12) from Formula (11)

$$Lp = (X(\text{point } 32) - X(\text{point } 31))/Ip \quad (12)$$

Further, when a difference between two points expressed by point 33 and point 34 on the waveform of X of FIG. 12 (12) and an average thereof is calculated, measurement accuracy can be promoted. According to the embodiment, Lp is calculated by calculating the average value expressed by Formula (13) by the microcomputer 30.

$$Lp = (X(\text{point } 32) - X(\text{point } 31) + X(\text{point } 33) - X(\text{point } 34))/2(2 \times Ip) \quad (13)$$

An explanation will be given of operation of the control circuit 44 of the sensor-less brush-less motor constituted as described above in reference to the waveform diagram of FIG. 12. Further, portions of explanation duplicated with those of the fourth embodiment will be omitted.

At a timing of point 31, that is, immediately before switching current of the motor windings 7U and 7V in U→V direction, the microcomputer 30 outputs the sampling signal outputting instruction to the sampling circuit 26 and the sampling circuit 26 samples the output X (point 31) of the integrator 1. Further, the microcomputer 30 receives X (point 30) from the sampling circuit 26 and stores X (point 30).

Next, similarly, the microcomputer 30 receives output X (point 32) of the integrator 1 via the sampling circuit 26 at a timing of point 32, that is, immediately after switching current of the motor windings 7U and 7V in U→V direction and stores X (point 32).

Incidentally, noise appears in the output X of the integrator 1 immediately after switching current of the motor windings 7U, 7V and 7W and therefore, a short time period until the noise vanishes (for example, 50$\mu$ second) is counted by an inner timer of the microcomputer 30 and thereafter, X (point 32) is sampled.

Similarly, X (point 33) and X (point 34) are sampled and values of these are stored to the microcomputer 30.

Further, the set value of Ip is stored to the microcomputer 30.

Next, the microcomputer 30 calculates Lp by substituting the stored output X (point 31), X (point 32), X (point 33) and X (point 34) of the integrator I for Formula (13). The microcomputer 30 stores the Lp. Further, when the motor 5 is operated, the Lp is outputted to the Lp signal setting circuit 15. The Lp is multiplied by Iu–Iv by the multiplier 12 and used for calculating the magnetic flux predicting signal φu–v The other operation of the control circuit 43 is the same as that of the fourth embodiment.

Further, according to the control circuit 44, Iu and Iv are monitored by the differential amplifier 9 and therefore, the monitored value may also be used as Ip.

When there is installed a safety apparatus outputting an alarm when the value of Lp provided as a result of calculation exceeds a normal value range (for example, 0 [mH] to 1 [mH]) such that the motor 5 is not driven, the safety can be promoted.

According to the embodiment, it is not necessary to previously measure the impedance of the motor windings 7U, 7V and 7W, further, even when the motor 5 is interchanged by other motor, it is not necessary to measure the impedance of the motor windings again, which is the same as that in the sixth embodiment.

(Eighth Embodiment)

According to the embodiment, an explanation will be given of a case of automatically measuring the synthesized resistance value Rp of the resistance values of the motor windings 7U, 7V and 7W and the resistance values of the cables 3U, 3V and 3W and the inductance Lp of the motor windings 7U, 7V and 7W by still other means.

According to the embodiment, Rp and Lp are measured from a shift between the ROT signal when the rotor is freely run at a certain rotational number and the ROT signal immediately after supplying drive voltage thereto, voltage induced in the motor winding when the rotor is freely run and the drive voltage.

Figure 16:
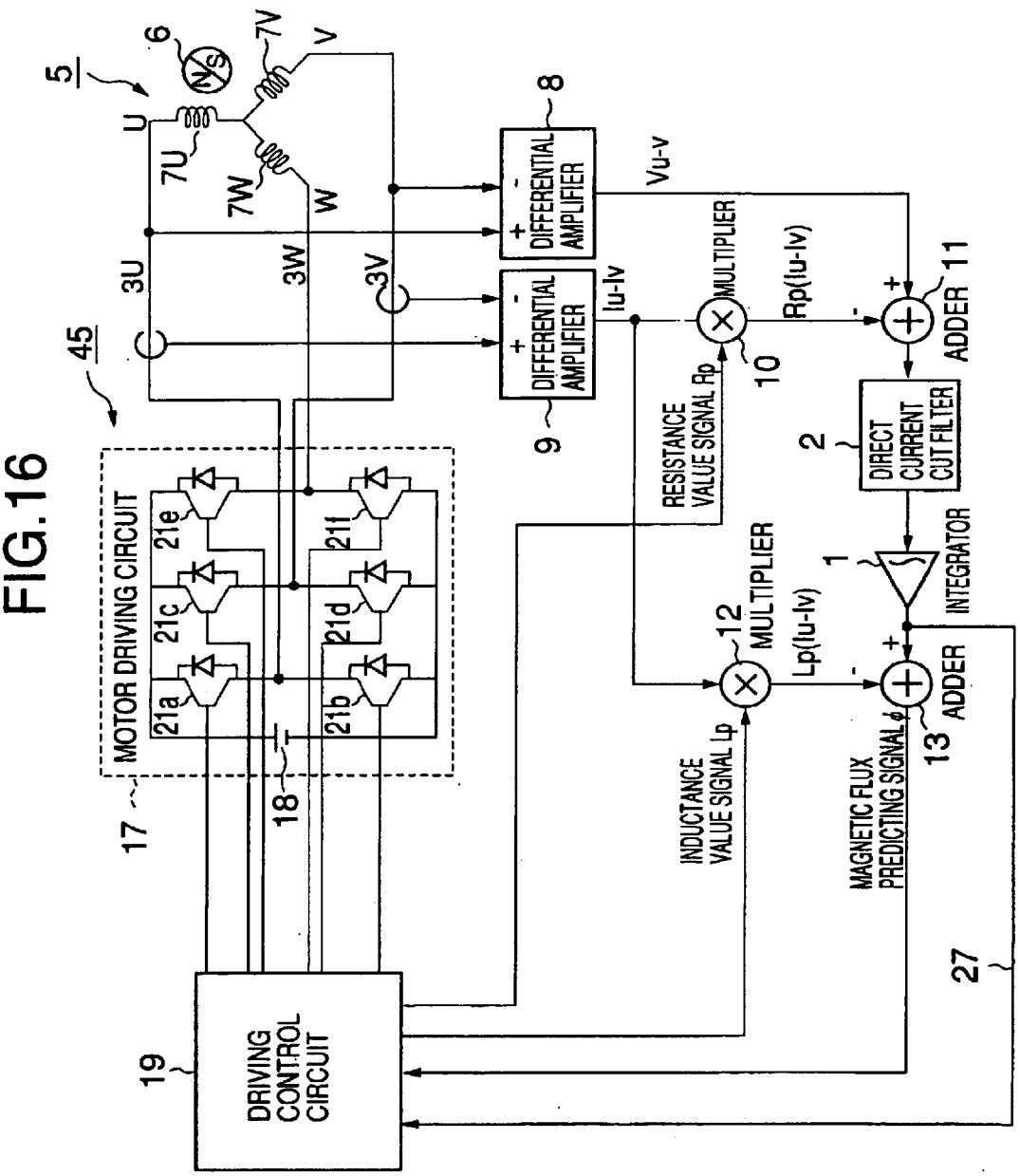
FIG. 16 is a block diagram showing a constitution of a control circuit according to an eighth embodiment.

FIG. 16 is a block diagram showing a constitution of a control circuit 45 of a sensor-less brush-less motor according to the eighth embodiment of the invention. The control circuit 45 is constituted by further adding a cable 27 to the control circuit 41 of the fourth embodiment. The cable 27 transmits the output X of the integrator 1 to the microcomputer 30, not illustrated, in the driving control circuit.

The other constitution is the same as that of the control circuit 41 and therefore, the same numerals are attached to constituent, elements the same as those of the control circuit 41.

Next, an explanation will be given of theoretical formulas constituting the basis of the embodiment.

angular frequency of rotor=$\omega$ output of differential amplifier 9 Iu−Iv=I difference of voltage between motor windings 7U and 7V in driving motor 5 Vu−v=Vd actual value of induced electromotive force of motor winding in running rotor 6 freely Viu−v=Vir estimated value of induced electromotive force of motor winding in running rotor 6 freely Viu−v=Vie actual value of Rp=Rpr estimated value of Rp=Rpe actual value of Lp=Lpr estimated value of Lp=Lpe phase difference of Vir and Vd=$\theta1$ phase difference of Vir and Vie=$\theta2$ Here, estimated value Rpe of Rp and estimated value Lpe of Lp are assumed values stored to the microcomputer 30. As initial values, Rpe=Lpe=0 and Rpr and Lpr are measured repeatedly by several times and are successively updated by an actual value of Rpr and an actual value of Lpr calculated at respective times.

Figure 17:
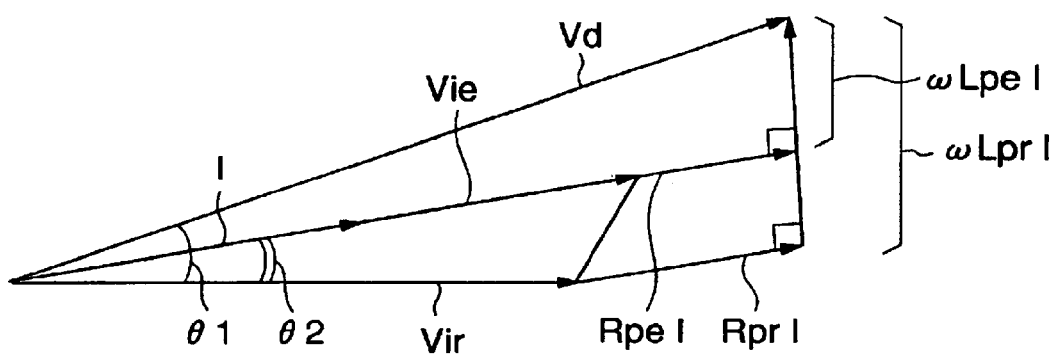
FIG. 17 is a vector diagram showing a relationship of motor voltage and the like of the eighth embodiment.

These relationships are represented by a voltage vector diagram as shown by FIG. 17.

A detected value of voltage is superposed with a number of high frequency noises and therefore, when Rpr and Lpr are calculated from values produced by integrating the various amounts of FIG. 17, calculation accuracy is promoted.

Figure 18:
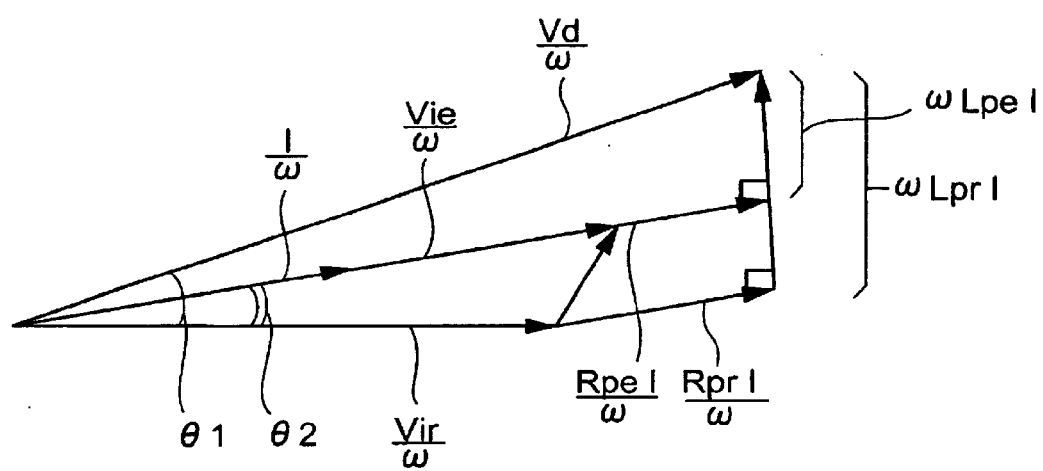
FIG. 18 is a vector diagram showing a relationship among vectors provided by integrating respective vectors of FIG. 17.

FIG. 18 is constituted by integrating various amounts of FIG. 17. Although when the various amounts of FIG. 17 are integrated, the respective vectors are rotated by 90° in the counterclockwise direction, that is, the phases are retarded by 90° relative to the vector of voltage, FIG. 1 illustrates these by rotating these by 90° in the clockwise direction for making these easy to see.

The following relationships are established from the vector diagram of FIG. 18.

$\theta2=\theta1-$arcsin $(\omega\times Lpe\times I/Vd)$

Vie/$\omega$=Vd$\times$cos $(\theta1-\theta2)/\omega-$RpeI/$\omega$

I$\times$(Rpr−Rpe)/$\omega$=(Vie−Vir*cos $\theta2$)/$\omega$

I$\times$Lpr−I$\times$Lpe=Vir$\times$sin $\theta2/\omega$

From the relationships, Formula (14) and Formula (15) are calculated as follows.

$$Rpr=(Vie-Vir\times\cos \theta2)/I+Rpe \quad (14)$$

$$Lpr=Vir\times\sin \theta2/((\omega\times I)+Lpe \quad (15)$$

That is, when Vd/$\omega$, Vir/$\omega$ and $\theta1$ are measured, Rpr can be calculated by Formula (14) and Lpr can be calculated by Formula (15).

An explanation will be given of operation of the control circuit 45 of the sensor-less brush-less motor as follows.

As mentioned above, Rpe and Lpe stored to the microcomputer 30 are initialized such Rpe=Lpe=0.

The rotor 6 is started from a stationary state by an open loop and accelerated to predetermined rotational speed $\omega$ (for example, 20 rotations per second).

When the rotational number of the rotor reaches predetermined value $\omega$, current supplied to the motor 5 is instantaneously stopped and the rotor 6 is run freely. At this occasion, the actual value Vir of the induced electromotive power of the motor winding is calculated from the differential amplifier 8. The output of the integrator 1 is stored to the microcomputer 30 via the cable 27.

Next, immediately after measuring Vir, current is successively supplied to the motor windings 7U, 7V and 7W. The difference Vd of voltage between the motor windings 7U and 7V at that occasion is measured by the differential amplifier 8. The output of the integrator 1 is stored to the microcomputer 30 via the cable 27. Further, $\theta1$ is acquired simultaneously with the above-described operation of making ON/OFF current by a method explained later.

Next, an explanation will be given of measurement of $\theta1$

Figure 19:
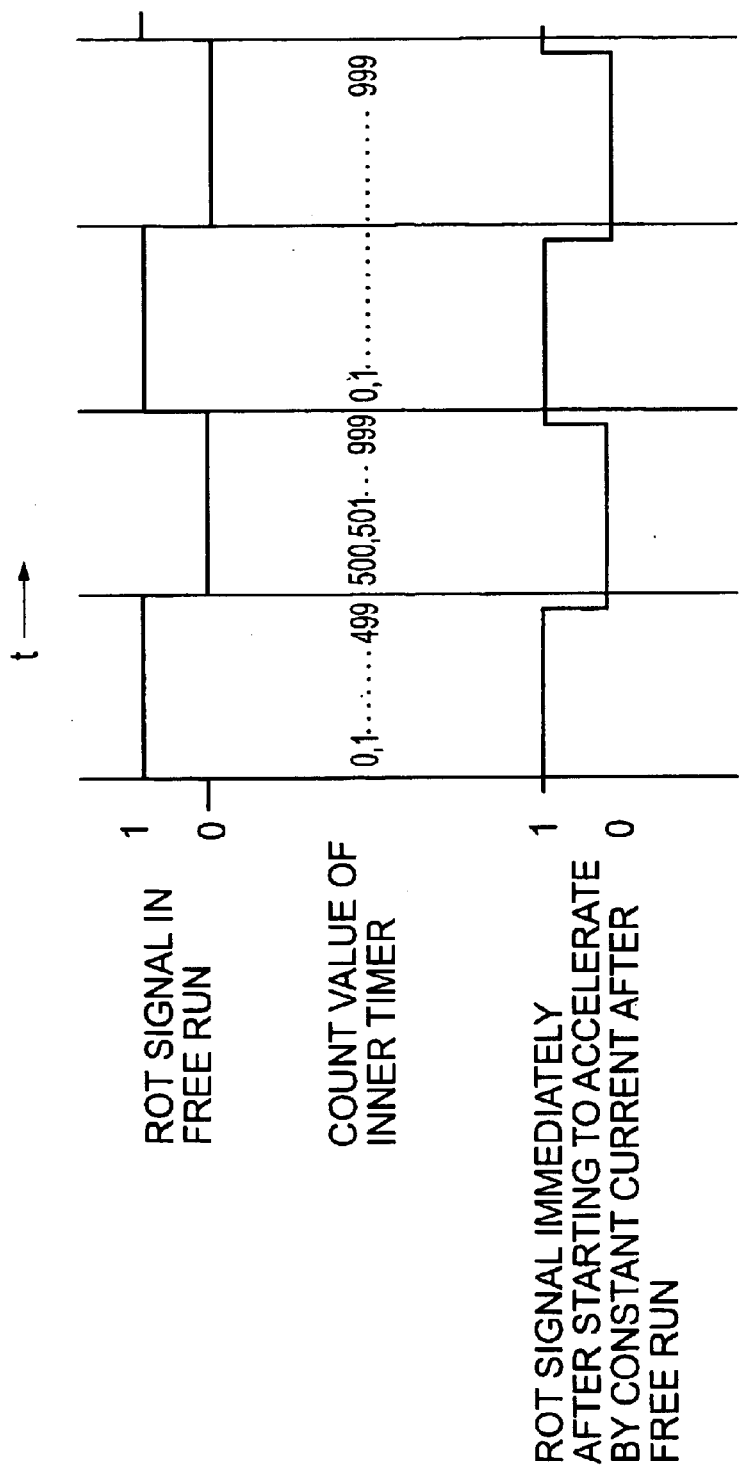
FIG. 19 is a diagram showing a shift of an ROT signal when a rotor is run freely and when the rotor is supplied with drive current according to the eighth embodiment.
Figure 20:
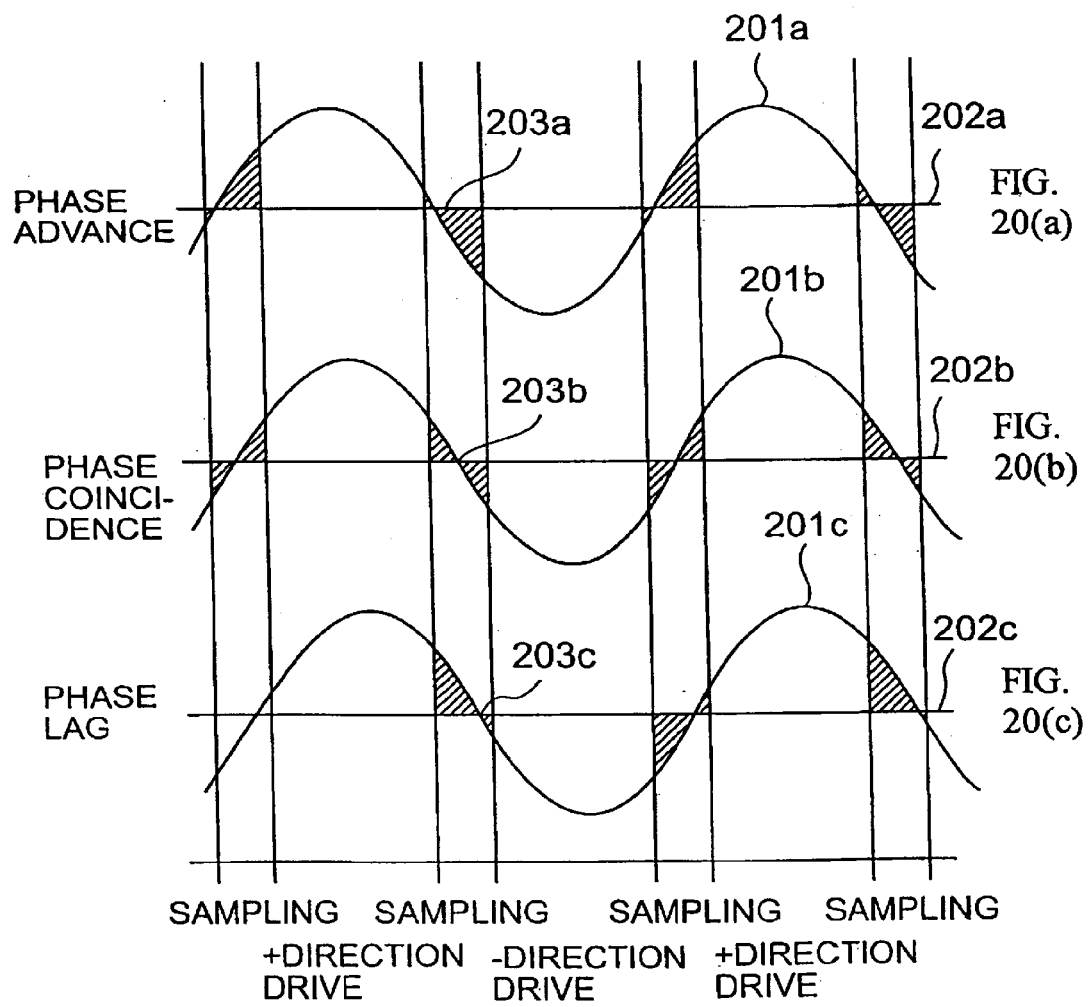
FIG. 20 is a diagram showing timings of detecting positions of magnetic poles of a rotor of a conventional sensor-less brush-less motor.

When the rotor 6 is run freely, the microcomputer 30 receives the ROT signal as shown by FIG. 19 from the comparator 4, not illustrated, in the driving control circuit 19.

The microcomputer 30 is provided with an inner timer (counting up, for example, at every 10$\mu$ second) and counts up pulses of the timer during a time period of rotating the rotor 6 by one rotation in synchronism with the ROT signal. For example, when the rotor 6 is rotated by one rotation for 0.1 second, a count number Nr of the timer becomes 1000.

Immediately thereafter, the microcomputer 30 restarts counting from 0 at every time at which the count number of the timer becomes 1000. The rotational number of the rotor 6 is substantially constant during the time period of free run and therefore, the ROT signal and the counting operation of the timer are synchronized with each other.

Next, the microcomputer 30 stores a count number Ne at a point of switching the ROT signal when current restarts supplying to the motor windings 7U, 7V and 7W. Although the period of the ROT signal is substantially the same as the period of the ROT signal in free run as shown by FIG. 19, the phase advances by $\theta1$.

The microcomputer 30 calculates $\theta1$ from values of Nr and Ne.

For example, when the count number Nr=1000 and the count number Ne=900, the shift $\theta1$ between the phases of Vir and Vd is calculated as follows.

$$\theta1=(Nr-Ne)/Nr\times360°=36°$$

As described above, Vd/$\omega$, Vir/$\omega$ and $\theta1$ are calculated and therefore, the microcomputer 30 calculates Rpr and Lpr in accordance with Formula (14) and Formula (15).

Next, the microcomputer 30 updates the values of Rpe and Lpe by the values of Rpr and Lpr.

By repeating the above-described procedure by several times in starting the motor 5, more accurate Rpr and Lpr can be calculated.

The control apparatus 45 calculates the magnetic flux predicting signal $\phi$u−v by Rpe and Lpe acquired by the above-described procedure and controls the motor 5 by the feedback control. The operation is the same as that of the fourth embodiment.

Further, when there is installed a safety apparatus in, which an alarm is outputted when values of Rpe and Lpe provided as a result of calculation exceeds a normal value range (for example, from 0.5 [$\Omega$] to 10 [$\Omega$] and from m0 [mH] to 1 [mH]) such that motor 5 is not driven, the safety can be promoted.

According to the embodiment, Rpr and Lpr are automatically measured in starting the motor 5, the magnetic flux predicting signal φu–v is calculated by the values and therefore, it is not necessary to previously measure Rpr and Lpr by using a measuring instrument as in the control circuit of the conventional sensor-less brush-less motor.

Therefore, conventionally, at a site of using the sensor-less brush-less motor, when the motor 5 is interchanged by other motor, it is necessary to measure again Rpr and Lpr by using a measuring instrument, however, such an operation is dispensed with according to the control circuit 45 of the embodiment.

Further, according to the embodiment, by only installing further the cable 27 from the integrator 1 to the microcomputer 30, Rpe and Lpe can be measured and therefore, the circuit constitution is more simplified than those of the control circuits of the sixth embodiment and the seventh embodiment.

Further, although according to the embodiment, Rpr and Lpr are calculated by using the motor windings 7U and 7V, the embodiment is not restricted thereto but Rpr and Lpr can be measured by arbitrary motor windings.

According to the embodiment, when starting time period is as long as about 3 through 10 minutes as in a magnetic levitation type turbo-molecular pump, θ1 can be measured with small acceleration of the rotor and with high accuracy.

(Ninth Embodiment)

According to the embodiment, by adding a function of temporarily nullifying the resistance value signal Rp and the inductance value signal Lp to the control circuit 41 according to the fourth embodiment (FIG. 11), or the like, a function the same as those of the control circuit 142 according to the second embodiment (FIG. 3) can be realized by using the control circuit 41. Thereby, the function of the control circuit 142 can also be used by the control circuit 41 added with the new function and the motor 5 can be operated from low speed rotation in which the PLL circuit 16 cannot be locked to steady-state rotation. Further, the steady-state rotation refers to rotating the rotor at a predetermined rotational frequency (for example, 30,000 rotations per minute) in steady state.

Figure 21:
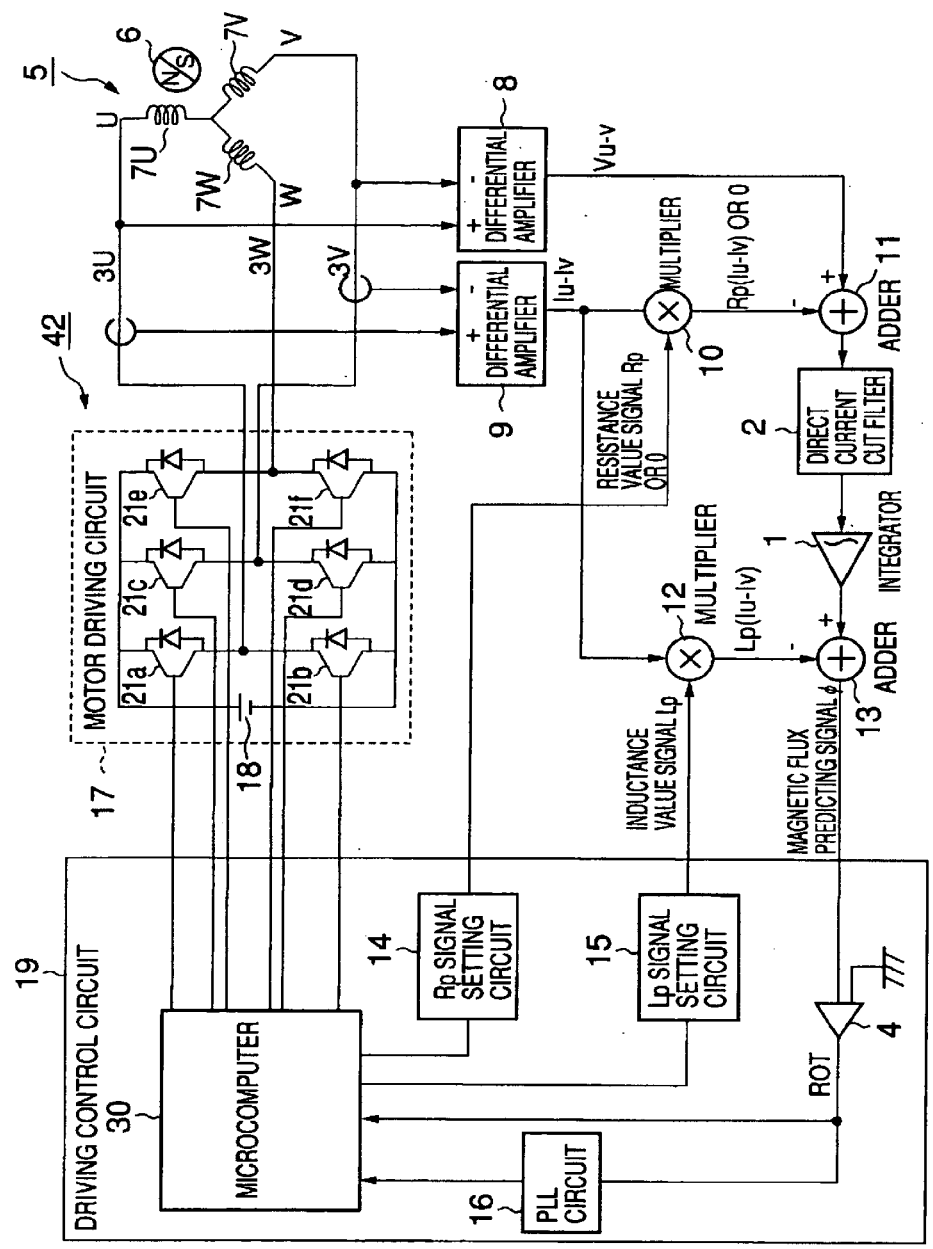
FIG. 21 is a diagram showing a constitution of a control circuit according to a ninth embodiment.

FIG. 21 is a diagram showing a constitution of a control circuit 47 according to the embodiment. The control circuit 47 is the same as the control circuit 41 according to the fourth embodiment (FIG. 11) except that the output of the Rp signal setting circuit 14 can be switched to either of the resistance value signal Rp or 0 and that the output of the Lp signal setting circuit 15 can be switched to either of the inductance value signal Lp and 0.

An explanation will be given of an outline of a constitution of the control circuit 47 as follows.

The motor driving circuit 17 constitutes current supplying means for supplying current to the motor 5.

The RP signal setting circuit 14, the differential amplifier 9, the multiplier 10 and the adder 11, constitute resistance amount correcting means for correcting the resistance amount by subtracting a corrected value of a change in voltage produced by the synthetic resistance of the wirings from the power source apparatus and the motor windings 7U, 7V and 7W from inter-cable voltage.

The differential amplifier 8 constitutes inter-cable voltage acquiring means for acquiring inter-cable voltage of the motor windings 7U and 7V. The integrator 1 constitutes magnetic flux signal acquiring means for acquiring a magnetic flux signal (which is a signal for predicting interlinking magnetic flux of the motor windings 7U and 7V and therefore, is described as a magnetic flux predicting signal φ hereinafter) by integrating the inter-cable voltage.

The Lp signal setting circuit 15, the differential amplifier 9, the multiplier 12 and the adder 13 constitute reactance amount correcting means for correcting the magnetic flux predicting signal φ by subtracting a change in voltage produced by reactance of the motor windings 7U and 7V of the multiplier from the output of the integrator 1.

The comparator 4 constitutes magnetic pole position acquiring means. The phase of the magnetic flux predicting signal φ is provided with a corresponding relationship with the positions of the magnetic poles of the rotor 6 and therefore, by detecting the phase of the magnetic flux signal φ, the positions of the magnetic poles can be detected. Hence, the comparator 4 can detect the positions of the magnetic poles by detecting a point at which the phase of the magnetic flux predicting signal φ becomes $2n\pi$ or $(2n-1)A$ by comparing the ground level and the magnetic flux signal φ. Incidentally, notation n designates an integer.

Meanwhile, the Rp signal setting circuit 14 selectively outputs two values of the resistance value signal Rp (=Rc+Ru=Rc+Rw=Rc+Rv) and null by the signal from the microcomputer 30.

Further, the Lp signal setting circuit 15 also outputs selectively two values of the inductance value signal Lp (=Lu=Lw=Lv) and null by the signal from the microcomputer 30.

When both of the outputs of the Rp signal setting circuit 14 and the Lp signal setting circuit 15 are set to null, both of the outputs of the multiplier 12 and the multiplier 10 become null and there can be realized a circuit having a constitution the same as that of the circuit constituted by the differential amplifier 103, the direct current cut filter 102, the integrator 101 and the comparator 104 of the control circuit 142 according to the second embodiment. For example, when a case in which the control circuit 47 operates similar to the control circuit 142 is defined as a first mode and a case in which the control circuit 47 operates similar to the control circuit 41, is defined as a second mode, the control circuit 47 operates by the second mode by outputting the resistance value signal Rp and the impedance value signal Lp and is operated by the first mode by nullifying the signals.

The microcomputer 30 monitors the rotational frequency of the rotor 6 by, for example, the ROT signal received from the comparator 4.

The ROT signal outputted by the comparator 4 repeats Hi and Lo at every rotation of the rotor 6 in synchronism with the rotation of the rotor 6 and therefore, by counting rise or fall of the ROT signal per unit time, the rotational frequency of the rotor 6 can be calculated.

The microcomputer 30 makes the Rp signal generating circuit 14 and the Lp signal generating circuit 15 output respectively the resistance value signal Rp and the inductance value signal Lp when the calculated rotational frequency of the rotor 6 is larger than a predetermined value (30 [Hz] in acceleration, 60 [Hz] in deceleration). In this case, since the resistance value signal Rp and the inductance value signal Lp are outputted, the circuit constitution is the same as that of the control circuit 41.

Further, the microcomputer 30 operates the motor 5 similar to the fourth embodiment. That is, the comparator 4 generates the ROT signal from the magnetic flux predicting signal φ and the PLL circuit 16 generates the 12×f ROT signal from the ROT signal. Further, the microcomputer 30 makes ON/OFF the transistors 21a, 21b, 21c, 21d, 21e, 21f of the motor driving circuit 17 in synchronism with the 12×f ROT signal and makes three-phase alternating current flow to the motor windings 7U, 7V and 7W to thereby rotate the rotor 6 (second mode).

The microcomputer 30 nullifies the outputs of the Rp signal generating circuit 14 and the Lp signal generating circuit 15 when the calculated rotational frequency of the rotor 6 is smaller than the predetermined value. In this case, the outputs of the multipliers 10 and 12 are nullified and therefore, the circuit constitution becomes the same as that of the control circuit 142.

Further, the microcomputer 30 operates the motor 5 similar to the second embodiment. That is, in synchronism with the ROT signal outputted from the comparator 4, the transistors 21b, 21c, 21e and 21f are made ON/OFF and current is made to flow alternately in V→W direction (when the driving voltage vector 3 is outputted) and in W→U direction (when the driving voltage vector 5 is outputted) to thereby rotate the rotor 6 (first mode).

In this way, the microcomputer 30 constitutes selecting means for selecting the first mode and the second mode in accordance with the rotational frequency of the rotor 6 and also constitutes correction nullifying means for nullifying correction by the adders 11 and 13 by nullifying the resistance value signal Rp and the inductance value signal Lp when the motor 5 is driven by the first mode.

Further, the microcomputer 30 constitutes also drive timing acquiring means of the driving voltage vectors, acquires a drive timing (first drive timing) of the driving voltage vectors from the ROT signal of the comparator 4 in the first mode and acquires a drive timing (second drive timing) from the 12×f ROT signal of the PLL circuit 16 in the second mode. Further, the microcomputer 30 constitutes first driving voltage vector outputting means for making the transistors 21b, 21c, 21e and 21f ON/OFF in accordance with the first mode by the first drive timing and the second driving voltage vector outputting means for making the transistors 21a, 21b, 21c, 21d, 21e and 21f ON/OFF in accordance with the second mode by the second drive timing.

Figure 22:
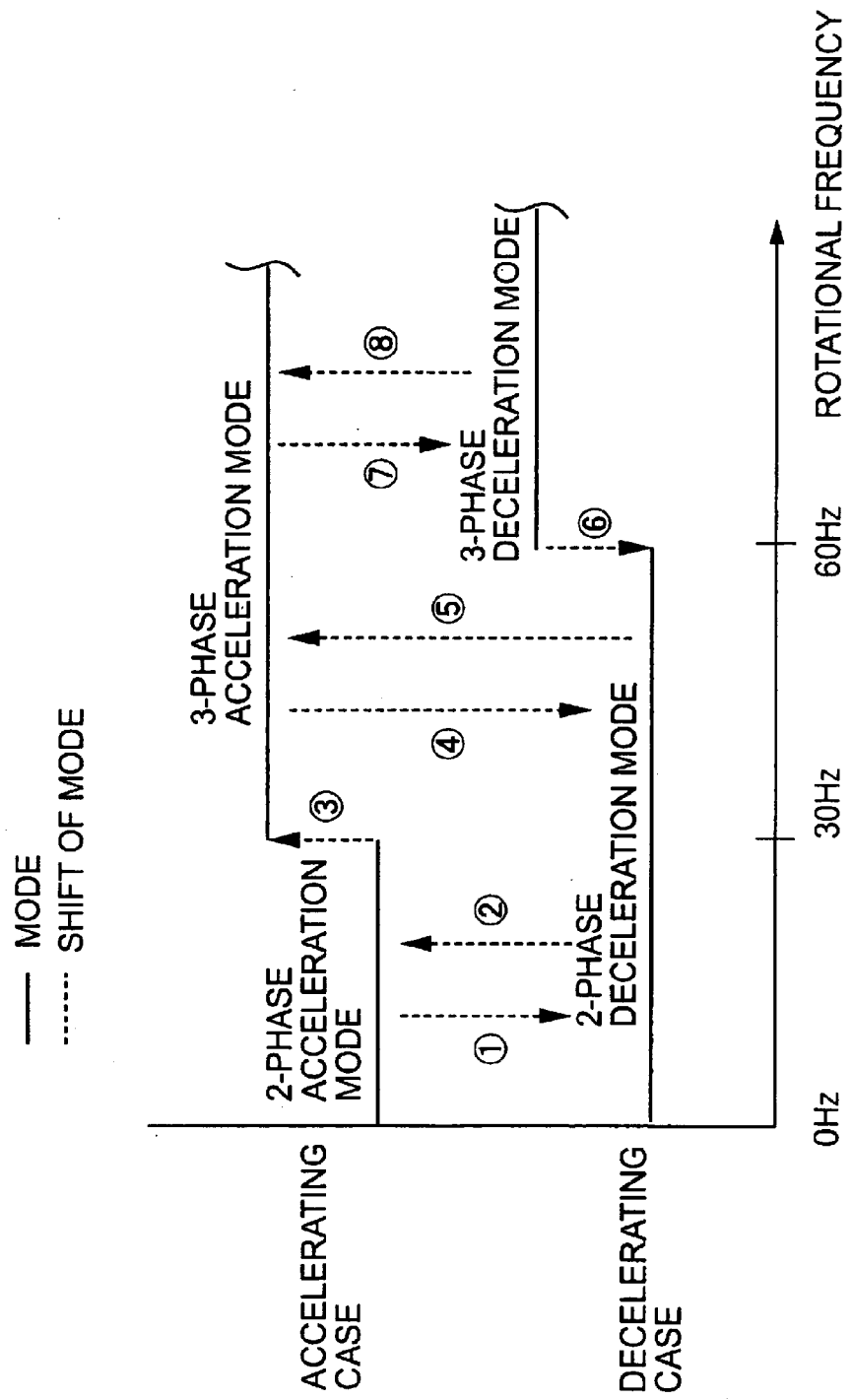
FIG. 22 is a diagram showing a relationship between operational modes of the control circuit according to the embodiment and a rotational frequency of a rotor.

FIG. 22 is a diagram showing a relationship between operation modes of the control circuit 47 and the rotational frequency of the rotor 6 according to the embodiment.

A case in which the control circuit 47 operates similar to the control circuit 142 and the rotor 6 is accelerated or rotated by steady-state rotation is referred to as 2-phase acceleration mode and a case in which the rotor 6 is conversely decelerated is referred to as 2-phase deceleration mode. Further, when the two cases are not discriminated from each other, the cases are simply referred to as 2-phase mode.

Further, a case in which the control circuit 47 operates similar to the control circuit 41 and the rotor 6 is accelerated or rotated by steady-state rotation, is referred to as 3-phase acceleration mode and a case in which the rotor 6 is conversely decelerated is referred to as 3-phase deceleration mode. Further, when the two cases are not discriminated from each other, the cases are simply referred to as 3-phase mode.

The 2-phase deceleration mode and the 3-phase deceleration mode are respectively constituted by reversing directions of field of the 2-phase acceleration mode and the 3-phase acceleration mode. That is, the phase of the field is shifted by 180 degree.

When polarity of field is reversed in this way, as explained later, the field generates torque in a reverse direction of the rotation of the rotor 6.

There are eight kinds of <1> through <8> shown in FIG. 22 in switching the modes.

The mode switching of <1> shows a case in which while the rotor 6 is being accelerated in the 2-phase acceleration mode, the mode is switched and the rotor 6 is decelerated in the 2-phase deceleration mode and stopped. For example, this is a case in which a user stops the motor 5 when the rotational frequency is smaller than 30 [Hz] after starting to rotate the rotor 6 or a case in which the motor 5 is stopped by operating a safety apparatus thereof.

Hereinafter, similarly, the mode switching of <2> is a case of switching from the 2-phase deceleration mode to the 2-phase acceleration mode. The mode switching of <3> is a case of switching from the 2-phase acceleration mode to the 3-phase acceleration mode. The mode switching of <4> is a case of switching from the 3-phase acceleration mode to the 2-phase deceleration mode. The mode switching of <5> is a case of switching from the 2-phase deceleration mode to the 3-phase acceleration mode. The mode switching of <6> is a case of switching from the 3-phase deceleration mode to the 2-phase deceleration mode. The mode switching of <7> is a case of switching from the 3-phase acceleration mode to the 3-phase deceleration mode. The mode switching of <8> is a case of switching from the 3-phase deceleration mode to the 3-phase acceleration mode.

The control circuit 47 according to the embodiment constitutes as described above operates as follows. Further, an explanation will be given here of a case in which the rotor 6 is rotated from a stationary state of steady-state rotation (for example, 30,000 rotations per minute) via the 2-phase acceleration mode and the 3-phase acceleration mode and thereafter decelerated by the 3-phase deceleration mode and the 2-phase deceleration mode and is stopped. That is, in acceleration, when the rotational frequency of the rotor is 30 [Hz], the mode switching of <3> is carried out and in deceleration, at 60 [Hz], the mode switching of <6> is carried out.

[Case of Accelerating from Stationary State to Steady-state Rotation]

The control circuit 47 starts the motor 5 by the 2-phase acceleration mode. That is, the microcomputer 30 nullifies the outputs of the Rp signal setting circuit 14 and the Lp signal setting circuit 15 and thereafter makes ON/OFF the transistors 21b, 21c, 21e and 21f of the motor driving circuit 17 to thereby alternately output the driving voltage vector 3 and the driving voltage vector 5. When the transistors 21c and 21f are made ON, the driving voltage vector 3 is outputted to the motor windings 7V and 7W and when the transistors 21e and 21b are made ON, the driving voltage vector 5 is outputted to the motor winding 7W and 7U.

Further, FIG. 23 shows a relationship among numerals of the driving voltage vectors, directions of current flowing in the motor windings 7U, 7V and 7W and the transistors 21a, 21b, 21c, 21d, 21e and 21f for switching. For example, as is apparent from FIG. 23, when the driving voltage vector 1 is outputted, a direction of current supplied by the motor driving circuit 17 is a direction from the motor winding 7U to the motor winding 7V and the transistors which are switched ON are the transistors 7a and 7d. The relationship among other diving voltage vectors, directions of current and the transistors which are switched ON can be similarly read from FIG. 23.

Immediately after starting the motor 5, the microcomputer 30 alternately outputs the driving voltage vectors 3, 5 at a low frequency near to DC. Then, the rotor 6 is attracted to the magnetic field and starts rotating. When the rotational frequency of the rotor becomes about 1 [Hz], the magnetic flux predicting signal φ can be outputted and the comparator 4 can output the ROT signal.

The microcomputer 30 alternately outputs the driving voltage vector 3 and the driving voltage vector 5 by making ON/OFF the transistors 21b, 21c, 21e and 21f in synchronism with the ROT signal received from the comparator 4. Further, when the ROT signal is Hi, the driving voltage vector 5 is outputted and when the ROT signal is Lo, the driving voltage vector 3 is outputted. When the rotational frequency of the rotor 6 becomes about 1 [Hz] in this way, the outputs of the driving voltage vectors 3 and 5 can be controlled by a feedback control by detecting the positions of the magnetic poles of the rotor 6.

The rotation of the rotor 6 is accelerated by the above-described control. Further, when the microcomputer 30 detects that the rotational number of the rotor reaches 30 [Hz] from the ROT signal, all of the transistors of the motor driving circuit 17 are made OFF to thereby make the motor driving circuit 17 pause instantaneously for about 10 [μsecond] to 0.1 [second] and thereafter the motor shifts to the 3-phase acceleration mode. This is for preventing the transistors 21a, 21b, 21c, 21d, 21e and 21f from being short circuited in the mode switching.

When the microcomputer 30 shifts to the 3-phase acceleration mode, the microcomputer 30 makes the Rp signal setting circuit 14 and the Lp signal setting circuit 15 respectively output the resistance value signal Rp and the inductance value signal Lp and starts supplying the driving voltage vectors 1 through 6 to the motor windings 7U, 7V and 7W by making ON/OFF the transistors 21a, 21b, 21c, 21d, 21e and 21f of the motor driving circuit 17.

The magnetic flux predicting signal φ is provided from the adder 13 and the ROT signal is provided from the comparator 4 thereby. The PLL circuit 16 generates the 12×f ROT signal from the ROT signal received from the comparator 4.

The microcomputer 30 receives the 12×f ROT signal from the PLL circuit 13 and controls to switch current supplied to the motor windings 7U, 7V and 7W by a feedback control similar to the fourth embodiment.

The rotor 6 is accelerated to about 30,000 rotations per minute by the above-described 3-phase acceleration mode and carries out steady-state rotation.

[Case of Decelerating to Stop from Steady-state Rotation]

When the motor 5 is stopped, the motor 5 is braked by operating the magnetic field generated by the motor windings 7U, 7V and 7W to the magnetic poles of the rotor 6. First, an explanation will be given of a method of decelerating the rotor 6.

FIG. 24 illustrates drawings for explaining mechanism of decelerating the rotor 6 by the field.

FIG. 24A is a view showing a case of accelerating the rotor 6. The rotor 6 is rotated in the clockwise direction with respect to the paper face. Magnet poles disposed above and below the rotor 6 schematically represents the field generated by the motor windings 7U, 7V and 7W. In the case of FIG. 24A, it is shown that the field by the motor windings 7U, 7V and 7W is formed toward an upper side of the paper face.

When the field generated by the magnetic poles of the rotor shaft 6 and the motor windings 7U, 7V and 7W is in the relationship as shown by the drawing, that is, when the field for attracting the magnetic poles of the rotor shaft 6 is formed in a direction of rotating the rotor shaft 6, the rotor shaft 6 is accelerated.

Meanwhile, when the field is formed such that the magnetic poles of the rotor shaft 6 are repulsed in the direction of rotating the rotor shaft 6 as shown by FIG. 24B, the rotor shaft 6 is decelerated.

It is known from the above-described survey that when the rotor shaft 6 is decelerated, the driving voltage vectors in directions reverse to those of the driving voltage vectors outputted in acceleration may be outputted in synchronism with the ROT signal in the case of the 2-phase deceleration mode and in synchronism with the 12×f ROT signal in the case of the 3-phase deceleration mode.

In the case of stopping the rotor 6 in steady-state rotation (about 30,000 rotations per minute), the microcomputer 30 switched from the 3-phase acceleration mode to the 3-phase deceleration mode. Further, the microcomputer 30 supplies predetermined gate signals to the transistors 21a, 21b, 21c, 21d, 21e and 21f based on the 12×f ROT signal outputted from the PLL circuit 16 and successively switches current of the motor windings 7U, 7V and 7W. In this case, current supplied to the motor windings 7U, 7V and 7W is in a direction reverse to that of the 3-phase acceleration mode. For example, in the case of the 3-phase acceleration mode, in reference to FIG. 12, at the moment of rise of the ROT signal constituting an onset of the 12×f ROT signal, the transistors 21c and 21b are made ON and current is made to flow in V→U direction (driving voltage vector 1). In order to direct the field generated by the motor windings 7U and 7V in the reverse direction, current may be made to flow in U→V direction (driving voltage vector 4). For that purpose, the microcomputer 30 may make the transistors 21a and 21d ON.

In this way, the microcomputer 30 decelerates the rotor 6 by supplying current in directions reverse to the case of the 3-phase acceleration mode to the motor windings 7U, 7V and 7W in synchronism with the 12×f ROT signal.

The microcomputer 30 monitors the rotational frequency of the rotor 6 by the ROT signal outputted by the comparator 4 and switches the control mode of the motor driving circuit 17 from the 3-phase deceleration mode to the 2-phase deceleration mode when the microcomputer 30 detects that the rotational frequency of the rotor 6 is reduced to 60 [Hz]. Also in the mode switching, the motor driving circuit 17 is instantaneously made to pause in order to prevent the transistors 21a, 21b, 21c, 21d, 21e and 21f from being short circuited.

The microcomputer 30 nullifies both of the outputs of the Rp signal setting circuit 14 and the Lp signal setting circuit 15 when the 2-phase deceleration mode is brought about and alternately outputs the driving voltage vector 3 and the driving voltage vector 5 by making ON/OFF the transistors 21b, 21c, 21e and 21f. However, contrary to the case of the 2-phase acceleration mode, the driving voltage vector 3 is outputted when the ROT signal is Hi and the driving voltage vector 5 is outputted when the ROT signal is Lo.

As described above, the rotor 6 is swiftly stopped by using both of the 3-phase deceleration mode and the 2-phase deceleration mode.

According to the embodiment described above, the following effect can be achieved.

Since the function of the control circuit 142 according to the second embodiment (FIG. 3) is realized by using portions of the control circuit 41 according to the fourth embodiment (FIG. 11), by using the control circuit 47, even when the rotor 6 is rotated at the rotational frequency equal to or lower than the frequency at which the rotor 6 can lock the PLL circuit 16 (for example, about 20 [Hz]), the field can be controlled by the feedback control by detecting the positions of the magnetic poles, further, when the motor 5 is operated in steady state, even in the case of causing rapid variation of load, the operation can be maintained without bringing the motor 5 into out of phase.

Therefore, not only the time period of starting the motor 5 can be shortened but also the stability in steady-state operation can be promoted.

Further, either of starting and steady-state operation of the motor 5 can be controlled by the single control circuit 47 and therefore, it is not necessary to add the control circuit 142 to the control circuit 41 and the fabrication cost can be reduced.

Although according to the embodiment, the magnetic flux predicting signal φ outputted from the integrator 1 is inputted to the comparator 4 via the adder 13, when the direct current cut filter is inserted between the adder 13 and the comparator 4, the operation of the control circuit 47 can further be stabilized by the following reason.

According to the 2-phase mode, the signal outputted from the Lp signal setting circuit 15 is nullified and therefore, the output of the multiplier 12 is to be nullified theoretically. However, since the multiplier 12 is fabricated by combining various elements such as operational amplifiers, by properties of the elements, even when the inductance value signal Lp is nullified, there is a case in which offset voltage (direct current) is outputted from the multiplier.

Therefore, there is a case in which in the 2-phase mode, a direct current component is superposed on the magnetic flux predicting signal φ outputted from the adder 13. Meanwhile, the comparator 4 compares the level of the magnetic flux predicting signal and the ground level and therefore, when the magnetic flux predicting signal φ is offset, the comparator 4 cannot operate pertinently. Hence, when the direct current cut filter is inserted between the adder 13 and the comparator 4 to thereby remove the direct current component superposed at the adder 13, the comparator 4 can be operated further pertinently.

The direct current cut filter inserted between the adder 13 and the comparator 4 may stay to be attached even when the control circuit 47 is operated in the 3-phase mode. This is because it is preferable that the magnetic flux predicting signal φ inputted to the comparator 4 is removed of the direct current component and therefore, even when the direct current cut filter is provided on the input side of the comparator 4, no adverse influence is effected and further, when the output of the multiplier 12 is provided with a direct current component in the 3-phase mode by properties of elements or the like, the direct current component can be removed.

(Modified Example 1 of Ninth Embodiment)

Figure 25:
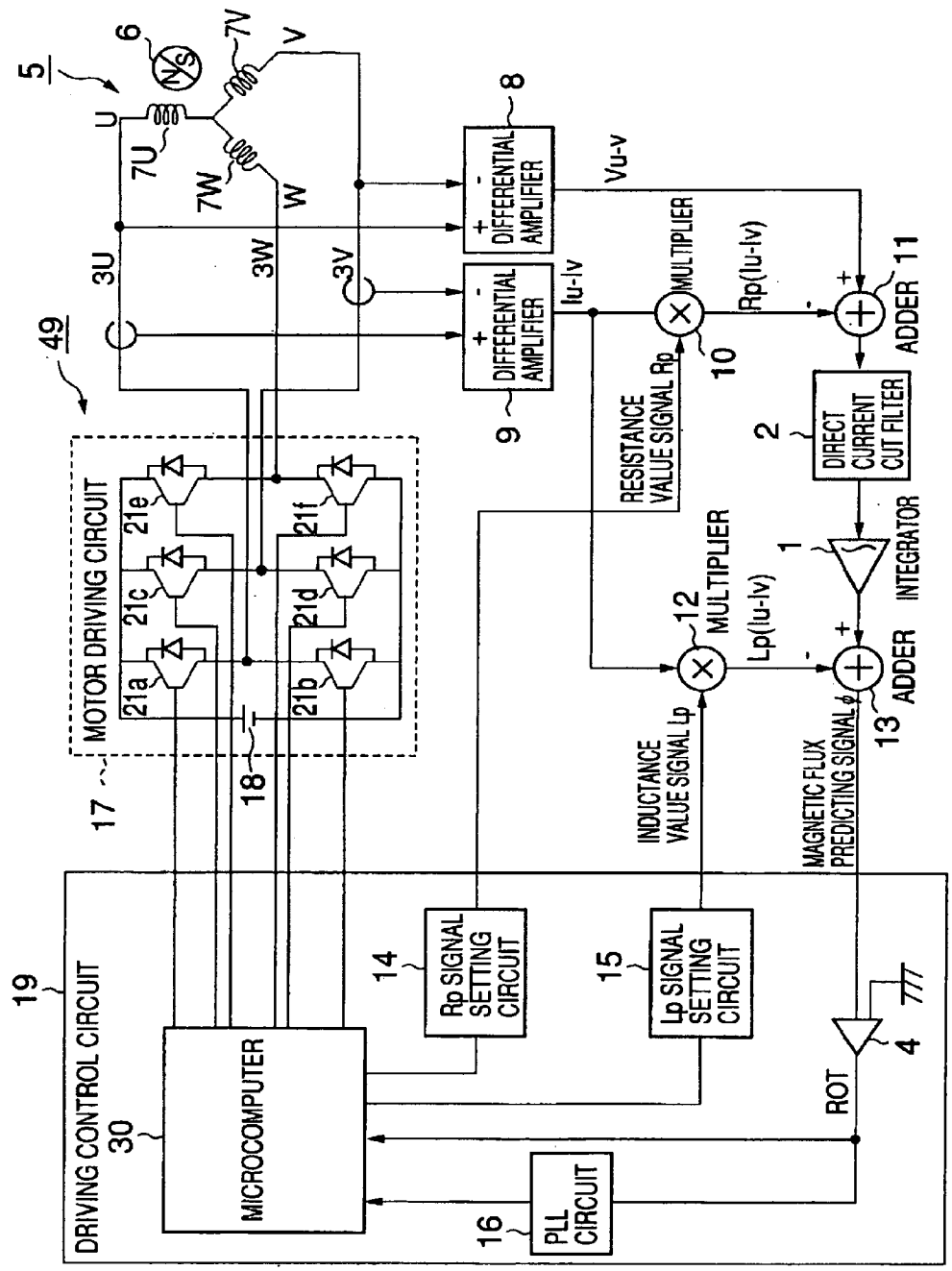
FIG. 25 is a diagram showing a constitution of a control circuit according to a first modified example of the ninth embodiment.

FIG. 25 is a drawing showing a constitution of a control circuit 49 according to the modified example. In the 2-phase mode, the control circuit 49 nullifies only the output of the Lp signal setting circuit 15 and outputs the resistance value signal Rp from the Rp signal setting circuit 14 regardless of the modes and the other circuit constitution is similar to that of the control circuit 47. When the resistance value signal Rp is outputted in the 2-phase mode, the characteristic of the control circuit 47 immediately after starting can be promoted by the following reason.

The direct current cut filter 2 (FIG. 21) is constituted by combining, for example, a high pass filter and an integrator and is normally provided with an integration characteristic. Therefore, a delay is caused in response to an inputted signal and even when the input signal is rapidly changed, the direct current cut filter 2 cannot follow thereto immediately.

Therefore, during a predetermined time period immediately after starting the control circuit 47 (about 1 second), the direct current cut filter 2 cannot sufficiently cut the direct current component and the direct current component is outputted to the integrator 1.

Meanwhile, the adder 11 subtracts the output of the multiplier 10 (direct current component of the differential amplifier 8) from the output of the differential amplifier 8. That is, by inputting the output of the multiplier 10 to the adder 11, the direct current component of the output of the differential amplifier 8 is eliminated.

Meanwhile, in the 2-phase mode, even when the resistance value signal Rp is outputted from the Rp signal setting circuit 14 to the multiplier 10, the output of the multiplier 10 is originally for eliminating the direct current component of the differential amplifier 8 and therefore, no influence is effected to operation of the motor 5. That is, the direct current component is removed from the output of the differential amplifier 8 by the adder 11 and the direct current component is further removed by the direct current cut filter 2. Further, the direct current component is eliminated by the adder 11 immediately after starting the motor 5.

FIG. 26 illustrates diagrams for explaining a difference of outputs of the direct current cut filter 2 by presence or absence of the output of the resistance value signal Rp.

FIG. 26A is a diagram showing a direct current component outputted from the differential amplifier 8, the ordinate designates voltage and the abscissa designates time. When the control circuit 47 is started at time t1, the signal is outputted from the differential amplifier 8 and the signal includes the direct current component. That is, as shown by the drawing, when the control circuit 47 is started, the direct current component 81 appears from the differential amplifier 8 in a step-like shape.

FIG. 26B is a diagram showing the direct current component of the signal outputted from the direct current cut filter 2 when the output of the Rp signal setting circuit 14 is nullified and the output of the multiplier 10 is nullified, the ordinate designates voltage and the abscissa designates time. The original point of the time axis is aligned to that of FIG. 26A.

As shown by FIG. 26B, when the output of the multiplier 10 is nullified, the direct current component 82 is outputted immediately after starting the control circuit 47 and is attenuated after a predetermined time period.

FIG. 26C is a diagram showing the direct current component of the signal outputted from the direct current cut filter 2 when the resistance value signal Rp is outputted from the Rp signal setting circuit 14. The ordinate designates voltage and the abscissa designates time. The original point of the time axis is aligned to that of FIG. 26A.

As is shown by FIG. 26C, in this case, the direct current cut filter 2 can cut the direct current component immediately after starting the control circuit 47.

As described above, in the 2-phase mode, by outputting the resistance value signal Rp from the Rp signal setting circuit 14, the direct current component from the direct current cut filter 2 immediately after starting the control circuit 47 can be restrained from outputting.

In this way, according to the modified example, the characteristic of the control circuit 47 immediately after starting can be promoted.

(Modified Example 2 of Ninth Embodiment)

As has been explained in the modified example 1 of the ninth embodiment, there are eight kinds of switching between the 2-phase mode and the 3-phase mode (FIG. 22). It has been newly found that there is a case in which among the eight kinds, in switching from the 2-phase mode to the 3-phase mode, that is, in the mode switching of <3> and <5>, the magnetic flux predicting signal φ outputted from the adder 13 (FIG. 21) becomes unstable.

According to the modified example, in order to promote the stability of the magnetic flux predicting signal φ, when the mode is switched from the 2-phase mode to the 3-phase mode, small current to a degree of not effecting influence on the torque of the rotor 6 is conducted to the motor windings 7U, 7V and 7W for a predetermined time period (about 1 through 5 seconds).

First, an explanation will be given of operation of the magnetic flux predicting signal φ when small current is not conducted to the motor windings 7U, 7V and 7W in switching the mode from the 2-phase mode to the 3-phase mode.

FIG. 27 is a diagram showing changes of the direct current component of the signal of the differential amplifier 8, the magnetic flux predicting signal φ and current Iw of W-phase after the mode is switched form the 2-phase deceleration mode to the 3-phase acceleration mode after a pause time period (mode switching of <5>) and the abscissa designates time. The microcomputer 30 provides a predetermined pause time period (about 10μ second through 0.1 second) between the 2-phase mode and the 3-phase mode in order to prevent the transistors 21a, 21b, 21c, 21d, 21e and 21f from being short circuited when the mode is switched from the 2-phase deceleration mode to the 3-phase acceleration mode.

When the microcomputer 30 drives the motor 5 by the 3-phase mode after the pause time period, a variation (offset) 71 of the direct current component of the signal appears in the differential amplifier 8. The variation is caused by a dispersion in the characteristic of the motor 5 or the circuit element.

The direct current cut filter 2 is provided with integrating operation and therefore, a time period is required to some degree for cutting the variation 71 of the direct current voltage. Therefore, immediately after the variation 71 of the direct current voltage has appeared, the variation cannot sufficiently be cut and accordingly, the integrator 1 integrates the direct current component. As a result, the magnetic flux predicting signal φ is fluctuated. When the operation is carried out in the 3-phase mode based on the fluctuated magnetic flux predicting signal φ, there is a case in which phases of conducting the motor windings 7U, 7V and 7W cannot be switched by correct timings and the accelerating operation cannot be carried out regularly.

Notation 72 designates the magnetic flux predicting signal φ and notation 73 designates an envelope of the magnetic flux predicting signal φ. As is shown by the drawings, when the mode is switched to the 3-phase acceleration mode, the magnetic flux predicting signal φ is significantly fluctuated positively and negatively and the fluctuation does not attenuate swiftly.

Meanwhile, current is supplied to the motor windings 7U, 7V and 7W as follows. Notation 74 designates Iw and notation 75 designates an envelope of Iw. As shown by the drawing, when the mode is switched from the 2-phase mode to the 3-phase mode, the microcomputer 30 temporarily nullifies Iw (also Iu, Iv) to thereby make the motor driving circuit 17 pause and thereafter increases gradually the amplitude of Iw in synchronism with the ROT signal generated from the magnetic flux predicting signal φ and shifts to the 3-phase mode.

Meanwhile, since the comparator 4 generates the ROT signal by comparing the level of the magnetic flux predicting signal φ and the ground level, when the magnetic flux predicting signal φ is fluctuated, the ROT signal does not coincide with the positions of the magnetic poles of the rotor 6 and Iw is not conducted to the correct phase as shown by a portion designated by notation 76.

It seems that the fluctuation of the magnetic flux predicting signal φ is not swiftly converged because new fluctuation of the magnetic flux predicting signal φ is caused by supplying current of the 3-phase acceleration mode to the motor 5 before converging the fluctuation of the magnetic flux predicting signal φ by the variation 71.

Next, an explanation will be given of operation of the magnetic flux predicting signal φ when small current is conducted to the motor windings 7U, 7V and 7W before switching the mode from the 2-phase mode to the 3-phase mode.

FIG. 28 is a diagram showing changes of the direct current component of the differential amplifier 8, the magnetic flux predicting signal φ and current Iw of W-phase in this case.

According to the example, when the mode is switched from the 2-phase deceleration mode (section 51) to the 3-phase acceleration mode (section 55), the microcomputer 30 temporarily makes OFF current supply to the motor 5 by the motor driving circuit 17 (section 52, time period is about 10μ second through 0.1 second) and thereafter, small current of three phases to a degree of not effecting influence on the torque of the motor 5 is supplied to the motor 5 for a constant time period (about 1 second through 5 seconds) (section 53). Thereafter, the microcomputer 30 gradually increases the current value of the 3-phase current (section 54) and shifts to the 3-phase mode (section 55).

Further, the magnitude of Iw in the 3-phase acceleration mode is about 6 [A] and the magnitude of the 3-phase small current is about 0.1 through 0.5 [A].

When the microcomputer 30 starts conducting the 3-phase small current, a variation 58 is caused in the direct current component of the signal outputted from the differential amplifier 8. Then, although fluctuation of the magnetic flux predicting signal φ is caused (section 57), the fluctuation is swiftly converged during the time period of conducting the phase small current.

Although the variation 58 of the direct current component is caused at a time point of starting the 3-phase mode, according to the example, large 3-phase current is not supplied to the motor 5 until the variation of the magnetic flux predicting signal φ is converged and therefore, new fluctuation of the magnetic flux predicting signal φ caused by current supplied to the motor windings 7U, 7V and 7W is not caused, as a result, the fluctuation of the magnetic flux predicting signal φ can swiftly be converged.

Further, although in the above-described, an explanation has been given of the case in which the mode is switched from the 2-phase deceleration mode to the 3-phase acceleration mode, even when the mode is switched from the 2-phase acceleration mode to the 3-phase acceleration mode, by supplying small three-phase current to the motor 5 after a predetermined pause time period, the fluctuation of the magnetic flux predicting signal φ can swiftly be converged.

According to the above-described modified example, the stability of the control circuit 47 in shifting from the 2-phase mode to the 3-phase mode can be increased, as a result, the rotor 6 can normally be accelerated.

(Modified Example 3 of Ninth Embodiment)

According to the embodiment, the magnetic flux predicting signal φ is made to pass the direct current cut filter before inputting to the comparator 4 and the cutoff frequency of the direct current cut filter is switched by whether the rotor shaft 5 is rotated at low speed or at high speed.

As described in the ninth embodiment, there is a case in which in the control circuit 47, even when the output of the Lp signal setting circuit 15 is nullified, the multiplier 12 outputs offset voltage which is not nullified, as a result, the direct current component is superposed on the magnetic flux predicting signal φ outputted by the adder 13. Hence, by inserting the direct current cut filter between the adder 13 and the comparator 4, the direct current component superposed on the magnetic flux predicting signal φ can be removed.

Meanwhile, since the control circuit 47 controls the motor 5 by the feedback control by the magnetic flux predicting signal φ from start of the rotor 6 to steady-state rotation, it is necessary for the direct current cut filter to pass even the magnetic flux predicting signal φ having a small frequency of about 1 [Hz] in the rotational frequency.

Meanwhile, the direct current cut filter is formed by using, for example, a high pass filter. Therefore, according to the frequency characteristic of a circuit combined with the direct current cut filter 2 and the integrator 1, as explained later, there is a case in which when the cut-off frequency is reduced, the gain is increased and even small direct current noise is also amplified. When the direct current noise is amplified by the circuit combined with the direct current cut filter 2 and the integrator 1, the comparator 4 cannot output the ROT signal correctly.

Hence, according to the modified example, the direct current cut filter is inserted between the adder 13 and the comparator 4 and the cutoff frequency of the direct current cut filter is switched by whether the rotor 6 is rotated at low speed or at high speed to thereby generate more pertinent magnetic flux predicting signal φ.

The direct current cut filter used in the modified example is constituted by a high pass filter. Therefore, the frequency characteristic (gain-frequency characteristic) of the circuit combined with the direct current cut filter and the integrator is constituted by adding the frequency characteristic of the high pass filter and the frequency characteristic of the integrator.

An explanation will be given of the frequency characteristics of these in reference to FIG. 29 as follows.

Figure 29A:
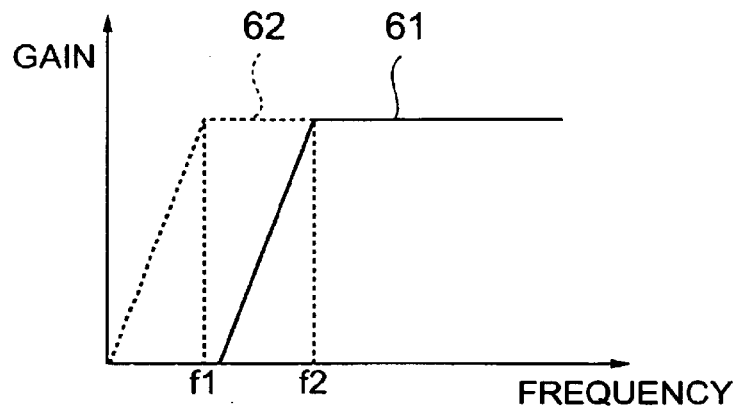
FIG. 29A is a diagram showing a frequency characteristic when a cutoff frequency is set to f1 and f2 by a high pass filter having a variable cutoff frequency.

FIG. 29A is a diagram showing frequency characteristics when a cutoff frequency of the high pass filter having variable cutoff frequency is set to f1 and f2.

When the cutoff frequency is f1, as shown by a curve 62, the gain is increased rapidly from a low frequency side to the frequency f1 and at frequencies larger than the frequency f1, the gain is saturated to a predetermined constant value.

Similarly, when the cutoff frequency is f2 (f2>f1), as shown by a curve 61, the gain is increased rapidly from a low frequency side to the frequency f2 and at frequencies larger than the frequency f2, the gain is saturated to a predetermined constant value.

Figure 29B:
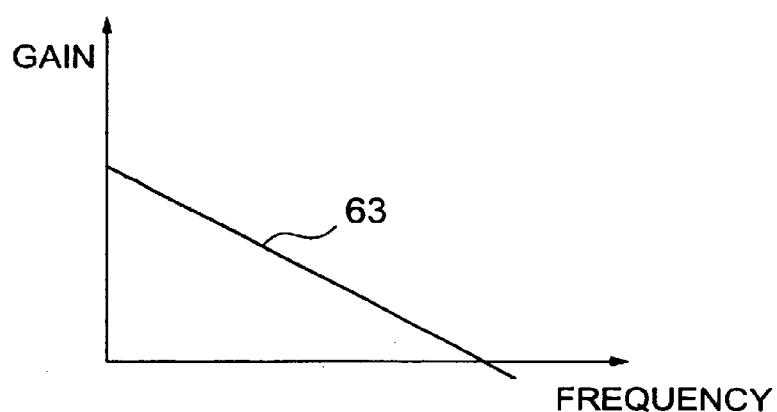

FIG. 29B is a diagram showing a frequency characteristic of the integrator. As shown by a straight line 63, the gain of the integrator is linearly reduced as the frequency increases.

Figure 29C:
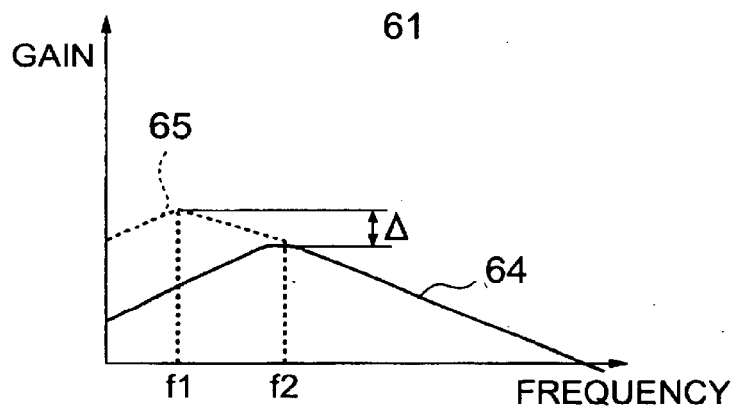

FIG. 29C is a diagram of a frequency characteristic of the circuit combined with the direct current cut filter and the integrator. Since the direct current cut filter is formed by the high pass filter, the gain of the circuit combined with the direct current cut filter and the integrator is constituted by adding the frequency characteristic of the high pass filter and the frequency characteristic of the integrator.

According to the frequency characteristic of the circuit combined with the direct current cut filter and the integrator, when the frequency characteristic of the high pass filter is represented by the curve 61, as shown by a curve 64, the gain becomes a maximum at the cutoff frequency f2 and when the frequency characteristic of the high pass filter is represented by the curve 62, as shown by a curve 65, the gain becomes a maximum at the cutoff frequency f1.

As is apparent from FIG. 29C, when the cutoff frequency of the circuit combined with the direct current cut filter and the integrator is reduced by reducing the cutoff frequency of the high pass filter, the circuit combined with the direct current cut filter and the integrator can further pass a signal at a low frequency, however, the gain is increased by Δ.

In this way, when the cutoff frequency of the circuit combined with the direct current cut filter and the integrator is reduced, although the magnetic flux predicting signal φ at a low frequency can be passed, the gain is increased and therefore, even DC noise (direct current component of noise) is also amplified.

When the cutoff frequency of the circuit combined with the direct current cut filter and the integrator is reduced, since the magnetic flux predicting signal φ at a low frequency can be passed, the operation in starting the motor is stabilized, however, there is a case in which the operation becomes unstable when the motor is operated in steady state because the direct current noise is amplified. Meanwhile, when the cutoff frequency of the circuit combined with the direct current cut filter and the integrator is increased, although the steady-state operation of the motor is stabilized because the direct current noise is not amplified, there is a case in which operation in starting the motor becomes unstable because the magnetic flux predicting signal at a low frequency is difficult to pass.

Therefore, it is preferable to change the cutoff frequency of the high pass filter when the motor 5 is started (it is necessary to pass the magnetic flux predicting signal φ at a low frequency) and at a time point at which the rotational number of the rotor 6 is increased to some degree.

Figure 30:
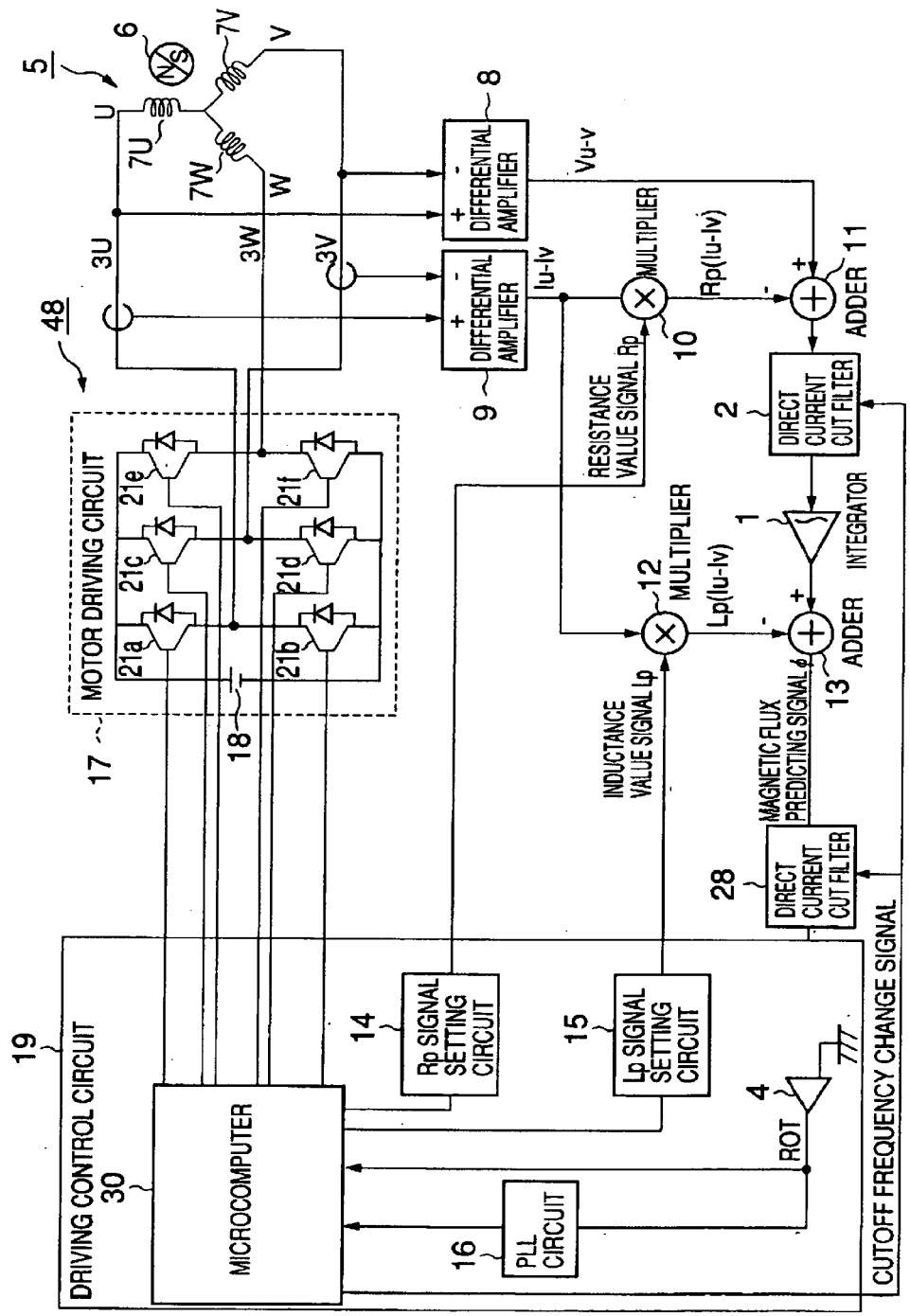
FIG. 30 is a diagram showing a constitution of a control circuit according to a second modified example of the ninth embodiment.

FIG. 30 is a diagram showing a constitution of a control circuit 48 according to the modified example. The control circuit 48 is constituted such that a direct current cut filter 28 is newly added to the control circuit 47 according to the ninth embodiment between the adder 13 and the comparator 4 and a cutoff frequency change signal is transmitted to the direct current cut filter 28 and the direct current cut filter 2 from the microcomputer 30. The same notations are attached to constituent elements in correspondence with those of the control circuit 47. Further, according to the embodiment, the cutoff frequency can be changed also with respect to the direct current cut filter 2 along with the direct current cut filter 28. This is for restraining the direct current component from being integrated by the integrator 1 by increasing the cutoff frequency when the rotational number of the rotor 6 is increased to some degree. Further, there may be constructed a constitution in which the cutoff frequency can be changed only at the direct current cut filter 28.

Both of the direct current cut filters 28 and 2 are constituted by high pass filters. It is not preferable that the direct current component is inputted to and integrated by the integrator 1 and therefore, according to the modified example, the cutoff frequency of the direct current cut filter 2 is made variable.

The microcomputer 30 sets the cutoff frequencies of direct current cut filters 28 and 2 to f1 [Hz] during a predetermined time period from the stationary state of the motor 5 after starting the motor 5 (for example, 10 seconds) and sets to increase the cutoff frequency to f2 (f1<f2) [Hz] after elapse of the predetermined time period.

The microcomputer 30 can set the cutoff frequencies to f1 [Hz] by setting the cutoff frequency change signal to a reset side and transmitting the cutoff frequency change signal to the direct current cut filters 28 and 2 and set the cutoff frequencies to f2 by setting the cutoff frequency change signal to a set side and transmitting the cutoff frequency change signal to the direct current cut filters 28 and 2. That is, the microcomputer 30 constitutes switching means for switching the cutoff frequencies.

According to the modified example, f1=0.05 [Hz] and f2=0.5 [Hz].

The gain is proportional to the frequency and therefore, the gain at the cutoff frequency f1 is ten times as much as the gain at the cutoff frequency f2.

The control circuit 48 constituted as described above is operated as follows.

When the motor 5 is started from the stationary state, the microcomputer 30 outputs the cutoff frequency change signal to the direct current cut filters 28 and 2 by setting the signal to the reset side and sets the cutoff frequencies to f1=0.05 [Hz].

Thereafter, when the motor driving circuit 17 is started in the 2-phase acceleration mode, the microcomputer 30 starts measuring an elapse time period after starting the motor 5 simultaneously therewith.

When 10 seconds have elapsed after starting the motor 5, the microcomputer 30 outputs the cutoff frequency change signal to the direct current cut filters 28 and 2 by setting the signal to the set side and sets the cutoff frequencies to f2=0.5 [Hz].

Thereafter, the motor 5 is operated similar to the ninth embodiment.

According to the above-described modified example, the motor 5 is operated by reducing the cutoff frequencies of the direct current cut filters 28 and 2 only in a short time period after starting the rotation (for example, 10 seconds) (for example, 0.05 [Hz]) and setting the cutoff frequencies to be slightly higher (for example, 0.5 [Hz]) after elapse of the short time period and therefore, signals for predicting the positions of the magnetic poles in starting and steady-state rotation of the motor 5 (magnetic flux predicting signal φ, ROT signal etc.) are stabilized and the stability of the motor is promoted.

Further, according to the modified example, there can also be constructed a constitution in which the microcomputer 30 detects from the ROT signal whether the rotational frequency of the rotor 6 is larger or smaller than a predetermined value, when the rotational frequency is equal to or smaller than the predetermined value, the microcomputer 30 sets the cutoff frequencies of the direct current cut filters 28 and 2 to f1 [Hz] and when the rotational frequency is larger than the predetermined value, the microcomputer 30 sets the cutoff frequencies to f2 (f1<f2) [Hz]

As described above, an explanation has been given of the ninth embodiment and the first modified example through the third modified example of the ninth embodiment and the embodiments and the modified examples can individually be executed or can be executed by arbitrary combinations.

(Tenth Embodiment)

According to the embodiment, an explanation will be given of a vacuum pump in which a motor is controlled by the control circuit 47 explained in the ninth embodiment.

In this embodiment, an explanation will be given of a turbo-molecular pump of a magnetic bearing type as an example of a vacuum pump.

Figure 31:
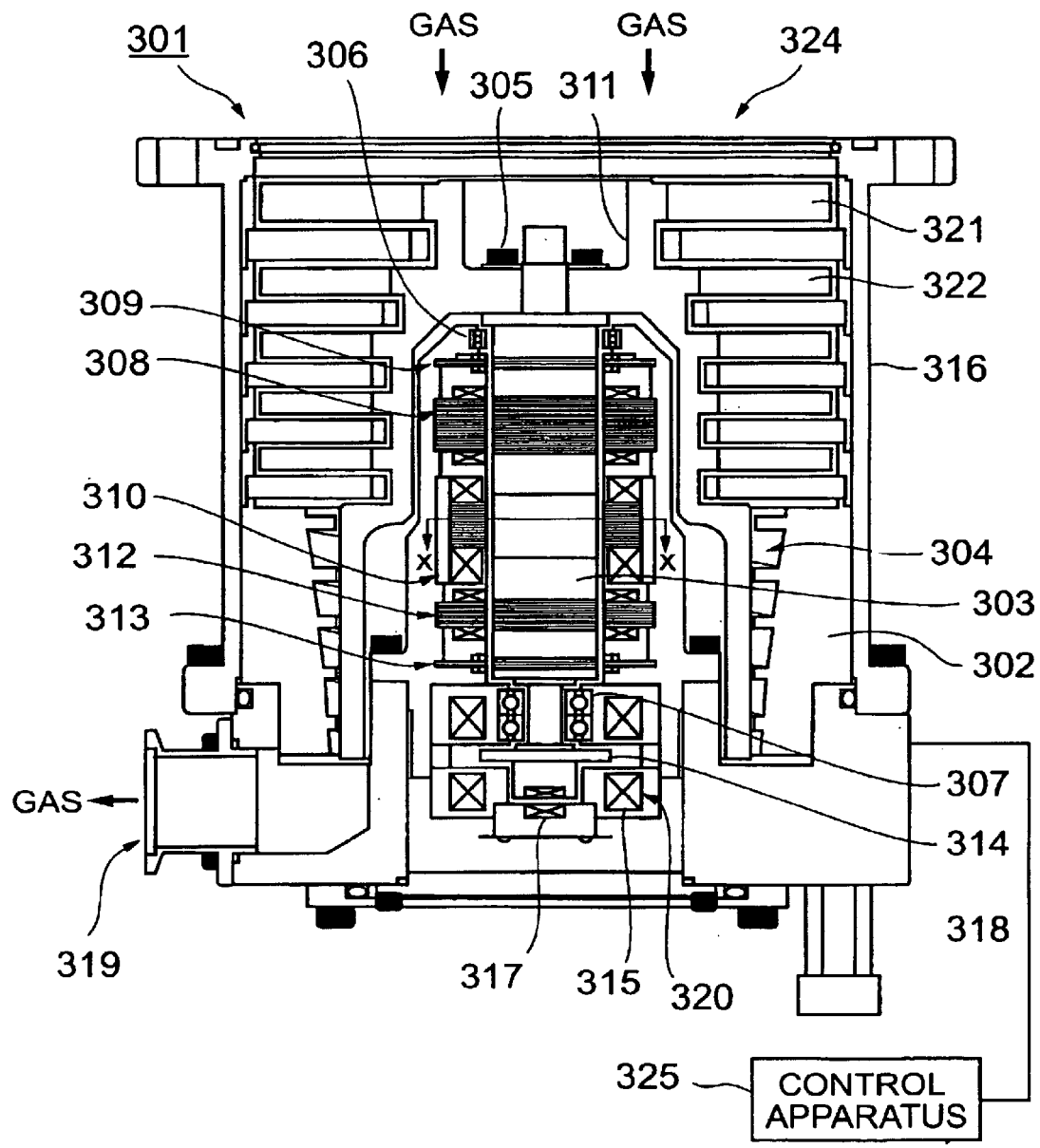
FIG. 31 is a view showing an example of a sectional view of a turbo-molecular pump.

FIG. 31 is a view showing one example of a sectional view of a turbo-molecular pump 301 in an axis line direction of a rotor shaft 303.

A casing 316 is provided with a cylindrical shape and forms an exterior member of the turbo-molecular pump 301.

The rotor shaft 303 is installed at a center of the casing 316.

Magnetic bearing portions 308, 312 and 320 are respectively provided at an upper portion, a lower portion and a bottom portion of the rotor shaft 303 in view of the paper face. When the turbo-molecular pump 301 is operated, the rotor shaft 303 is magnetically floated up and supported in noncontact by the magnetic bearing portions 308 and 312 in a radial direction (diameter direction of the rotor shaft 303) and magnetically floated up and axially supported by the magnetic bearing portion 320 in a thrust direction (axial direction of the rotor shaft 303).

These magnetic bearing portions constitute a magnetic bearing of a so-to-speak five axes control type and the rotor shaft 303 and a rotor 311 fixedly attached to the rotor shaft 303 can be rotated around the axis line of the rotor shaft 303.

At the magnetic bearing portion 308, four electromagnets are arranged at a surrounding the rotor shaft 303 to be opposed to each other at every 90°. The rotor shaft 3 is formed by a material having high permeability such as iron and is attracted by magnetic force of the electromagnets.

A displacement sensor 309 is a radial sensor for detecting a displacement of the rotor shaft 303 in the radial direction. When a control apparatus 325 detects that the rotor shaft 303 is displaced from a predetermined position in the radial direction by a displacement signal from the displacement sensor 309, the control apparatus 325 operates to return the rotor shaft 303 to the predetermined position by adjusting the magnetic force of the respective electromagnets. The magnetic force of the electromagnets is adjusted by controlling excitation current of the respective electromagnets by a feedback control.

In this way, a control portion 25 controls the control apparatus 325 by a feedback control based on a signal of the displacement sensor 309, thereby, the rotor shaft 303 is magnetically floated up in the radial direction at a predetermined clearance from the electromagnets in the magnetic bearing portion 308 and is held in noncontact in a space.

Constitution and operation of the magnetic bearing portion 312 are similar to those of the magnetic bearing portion 308.

In the magnetic bearing portion 312, four electromagnets are arranged at a surrounding of the rotor shaft 303 at every 90° and by attractive force of magnetic force of the electromagnets, the rotor shaft 303 is held in noncontact in the radial direction by the magnetic bearing portion 312.

A displacement sensor 313 is a radial sensor for detecting the displacement in the radial direction of the rotor shaft 303.

When the control apparatus 325 receives a displacement signal in the radial direction of the rotor shaft 303 from the displacement sensor 313, the control apparatus 325 controls excitation current of electromagnets by a feedback control such that the rotor shaft 303 is held at a predetermined position by correcting the displacement.

The control apparatus 325 controls the magnetic bearing portion 312 by a feedback control based on the signal of the displacement sensor 313, thereby, the rotor shaft 303 is magnetically floated up in the radial direction by the magnetic bearing portion 312 and is held in noncontact in a space.

The magnetic bearing portion 320 provided at a lower end of the rotor shaft 303 is constituted by a metal disk 318, electromagnets 314 and 315 and a displacement sensor 317 and holds the rotor shaft 303 in the thrust direction.

The metal disk 318 is constituted by a material having high permeability such as iron and is fixed orthogonally to the rotor shaft 303 at its center. The electromagnet 314 is installed above the metal disk 318 and the electromagnet 315 is installed therebelow. The electromagnet 314 attracts the metal disk 315 in an upper direction by the magnetic force and the electromagnet 315 attracts the metal disk 318 in a lower direction. The control apparatus 325 pertinently adjusts the magnetic forces exerted to the metal disk 318 by the electromagnets 314 and 315, thereby, the rotor shaft 303 is magnetically floated up in the thrust direction and held in noncontact in a space.

The displacement sensor 317 is an axial sensor for detecting the displacement of the rotor shaft 303 in the thrust direction and transmits a detected signal to the control apparatus 325. The control apparatus 325 detects the displacement of the rotor shaft 303 in the thrust direction by the detected signal of displacement received from the displacement sensor 317.

When the rotor shaft 303 is displaced from a predetermined position by moving to either side in the thrust direction, the control apparatus 325 adjusts the magnetic force by controlling excitation current of the electromagnets 314 and 315 by a feedback control to correct the displacement and operates to return the rotor shaft 303 to the predetermined position. By the feedback control of the control apparatus 325, the rotor shaft 303 is magnetically floated and held at the predetermined position in the thrust direction.

As has been explained above, the rotor shaft 303 is held in the radial direction by the magnetic bearing portions 308 and 312 and held in the thrust direction by the magnetic bearing portion 320 and therefore, the rotor shaft 303 is axially supported in noncontact around the axis line by magnetic levitation.

In the axis line direction of the rotor shaft 303, a protection bearing 306 is provided above the magnetic bearing portion 308 and a protection bearing 307 is provided below the magnetic bearing portion 312, respectively.

Although the rotor shaft 303 is magnetically floated up and held in noncontact in the space by the magnetic bearing portions 308, 312 and 320, there is a case in which the rotor shaft 303 is significantly shifted from a held position by causing a deflection around the axis line of the rotor shaft 303. The protection bearings 306 and 307 are provided to prevent the rotor shaft 303 from being brought into contact with the electromagnets of the magnetic bearing portions 308, 312 and 320 or prevent a permanent magnet from being brought into contact with electromagnets at a motor portion 310 in such a case.

When the rotor shaft 303 is moved from the predetermined position by a certain amount or more, the rotor shaft 303 is brought into contact with the protection bearings 306 and 307 and movement of the rotor shaft 303 is physically restricted.

The rotor shaft 303 is provided with the motor portion 310 between the magnetic bearing portions 308 and 312. The motor portion 310 is constituted by a DC brush-less motor and a detailed explanation will be given later thereof in reference to FIG. 32. The rotor portion 310 generates torque and rotates the rotor shaft 303.

The rotor 311 is fixed to the rotor shaft 303 by a bolt 305 and when the rotor shaft 303 is driven and rotated by the motor portion 310. The rotor 311 is rotated along therewith.

On a side of an intake port 324 of the rotor 311, there are attached a plurality of stages of rotor blades 321 radially from the rotor 311 while being inclined to a plane orthogonal to the axis line of the rotor shaft 303 by a predetermined angle. The rotor blades 321 are fixedly attached to the rotor 311 and are rotated at high speed along with the rotor 311.

Further, at the casing 316, there are fixed stator blades 322 alternately with the stages of the rotor blades 321 toward an inner side of the casing 316. Further, the stator blades 322 are fixed to the casing 316 with a predetermined angle from a plane orthogonal to the axis line of the rotor shaft 303.

An outer peripheral face of portion of the rotor 311 on a side of an exhaust port 319 is formed by a cylinder. At an outer periphery of the rotor 311, there is arranged a screw groove spacer 302 in a cylindrical shape at a predetermined clearance from the outer peripheral face. The screw groove spacer 302 is formed by, for example, aluminum. A screw groove pump portion is formed by the screw groove spacer 302 and the rotor 311.

An inner peripheral face of the screw groove spacer is formed with the screw groove 304 in a spiral shape and a depth of the screw groove 304 is reduced toward lower stages. When the rotor 311 is rotated, a gas is transported to the lower stages of the screw groove 304 and the depth of the screw grooves 304 is reduced toward the lower stages and therefore, the gas is compressed by being transported in the screw groove 304.

The control apparatus 325 is connected to a connector 4 of the turbo-molecular pump 1 and controls the magnetic bearing portions 308, 312 and 320 and the motor portion 310.

The control apparatus 325 is stored with the control circuit 47 described in the ninth embodiment and the control circuit 47 controls the motor portion 310.

The gas sucked from the intake portion 324 is compressed by operation of the rotor blades 321 and the stator blades 322 and delivered to the screw groove pump portion.

The gas transmitted to the screw groove pump potion is transported to the lower stages while being guided in the screw groove 304, compressed further and thereafter exhausted from the exhaust portion 319.

Figure 32:
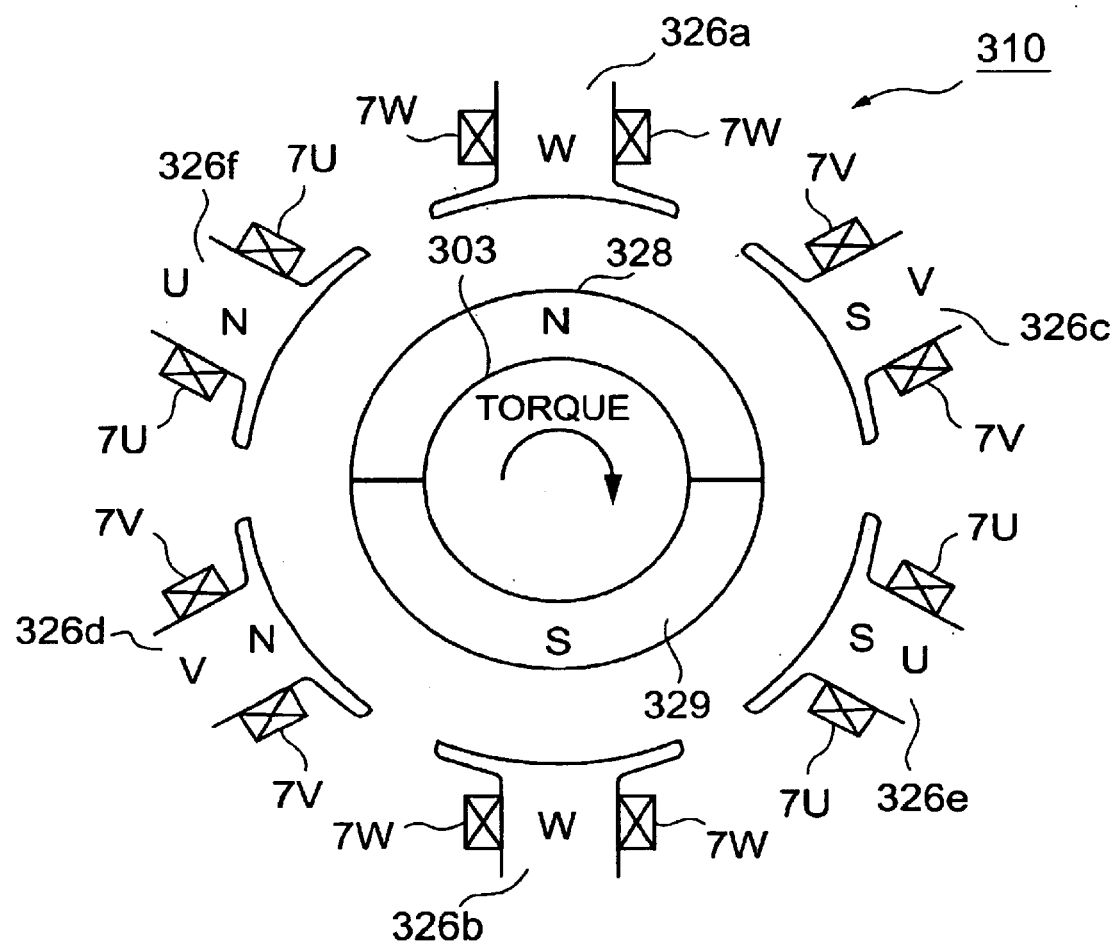
FIG. 32 is a schematic view showing a section of a motor portion.

FIG. 32 is a schematic view showing a section in X-X direction or the motor portion 310 (FIG. 31). The motor portion 310 is a portion in correspondence with the motor 5 of the control circuit 47 and is constituted by a motor of an inner rotor type constituted by the rotor shaft 303 fixedly attached with the permanent magnet and electromagnets (stator coils) arranged at a surrounding thereof.

The motor portion 10 is provided with the respective electromagnets of U-phase electromagnets 326e and 326f, V-phase electromagnets 326c and 326d and W-phase electromagnets 326a and 326b. The electromagnets are arranged concentrically at every 60 degrees and such that the electromagnets of the same phases are opposed to each other and the respective electromagnets are wound with the motor windings 7U, 7V and 7W in correspondence with the respective phases. Cores of the electromagnets are constituted by laminated steel sheets or the like and are excited when current is supplied to the motor windings. Further, the motor windings 7U, 7V and 7W are wound such that polarities of the respective electromagnets opposed to each other are reversed such that for example, when current is made to flow to the motor winding 7U, the U-phase electromagnet 326e constitutes N-pole and the U-phase electromagnet 326f constitutes S-pole.

The example of FIG. 32 shows that the driving voltage vector 1 is outputted (current is made to flow from the motor winding 7U to the motor winding 7V) and the electromagnets 326c and 326e constitutes S-poles. When the outputted driving voltage vectors are changed such that 2→3→4→5→6, the electromagnets constituting S-poles are changed such that 326e, 326b→326b, 326d→326d, 326f→326f, 326a→326a and 326c (the electromagnets opposed thereto respectively constitute N-poles), and when the driving voltage vectors make one turn from 1 to 6, the magnetic field generated on the rotor shaft 303 makes one turn in the rotational direction of the rotor shaft 303.

Meanwhile, two permanent magnets 328 and 329 are fixedly attached onto the rotor shaft 303 and faces of the electromagnets opposed to the respective electromagnets constitute N-pole (permanent magnet 328) and S-pole (permanent magnet 329) at every half turn of the rotor shaft 303 in the peripheral direction.

As shown by FIG. 32, when the driving voltage vector 1 is outputted, the electromagnets 326c and 326e constitute S-poles and the electromagnets 326d and 326f constitute N-poles, further, when the permanent magnet 328 is disposed on the upper side of the paper face and the permanent magnet 329 is disposed on the lower side of the paper face, the permanent magnet 328 is attracted to the electromagnets 326c and 326e, the permanent magnet 329 is attracted to the electromagnets 326d and 326f and therefore, torque in the clockwise direction in view of the paper face is generated in the rotor shaft 303.

In this way, by successively outputting the driving voltage vectors such that 1→2→3→4→5→6 to thereby generate the torque in the rotor shaft 303 while the positions of the magnetic poles 328 and 329 are detected, the rotor shaft 303 can be rotated. Further, the positions of the magnetic poles 328 and 329 are detected by the magnetic flux predicting signal $\phi$.

Further, conversely, when the electromagnets 326c and 326e are made to constitute N-poles and the electromagnets 326d and 326f are made to constitute S-poles (that is, when polarities are reversed) in the case in which the permanent magnets 328 and 329 are disposed at positions illustrated in FIG. 32, torque in the counterclockwise direction is generated in the rotor shaft 303 and the rotor shaft 303 (assumed to be rotated in the clockwise direction) can be braked.

The turbo-molecular pump 301 constituted as described above is operated as follows. When the turbo-molecular pump 301 is started from the stationary state, the control apparatus 325 drives the magnetic bearing portions 308, 312 and 320 to thereby magnetically float up the rotor shaft 303 and thereafter drive the motor portion 310 by the 2-phase acceleration mode to thereby rotate the rotor shaft 303.

When the rotational frequency of the rotor 303 reaches a frequency capable of locking the PLL circuit (for example, 30 Hz), the control apparatus 325 switches to drive the motor portion 310 by the 3-phase acceleration mode and accelerates the rotor shaft 303 to steady-state rotation (for example, 30,000 rotations per minute). Further, rotation of the rotor shaft 303 is maintained by the 3-phase acceleration mode as it is.

When the rotor shaft 303 is rotated, a gas in a chamber (vessel to be exhausted) connected with the turbo-molecular pump 301, is sucked from the intake port 324 and is compressed by operation of the rotor blades 321 and the stator blades 322.

The gas compressed by the rotor blades 321 and the stator blades 322 is further compressed while being transported in the screw groove 304 of the screw groove pump portion and thereafter exhausted from the exhaust port 319.

When the turbo-molecular pump 301 is stopped from a steady-state operating state, the control apparatus 325 decelerates rotation of the rotor shaft 303 to a predetermined rotational frequency (for example, about 60 [Hz]) by the 3-phase deceleration mode and thereafter further decelerates the rotation by switching the mode to the 2-phase deceleration mode and stops the rotation. The control apparatus 325 stops the magnetic bearing portions 309, 312 and 320 after stopping to rotate the rotor shaft 303.

Further, according to the above-described, the turbo-molecular pump 301 is operated in an order of 2-phase acceleration mode→3-phase acceleration mode→3-phase deceleration mode→2-phase deceleration mode, however, there are eight kinds of mode switching as explained in the ninth embodiment.

According to the embodiment described above, the following effect can be achieved.

According to the 2-phase acceleration mode, rotation of the rotor shaft 3 can be started regardless of initial positions of the magnetic poles 328 and 329 and therefore, it is not necessary to brake the magnetic poles 328 and 329 by direct current in starting the rotor shaft 3.

Even at a rotational frequency which cannot lock the PLL circuit 16, by detecting the positions of the magnetic poles 328 and 329 by the magnetic flux predicting signal $\phi$, the field can be controlled by a feedback control.

By the above-described two points, a time period of starting the turbo-molecular pump 301 can be shortened and failure of starting can be restrained.

Further, even when the rotational frequency of the rotor shaft 3 is significantly changed by causing a disturbance, for example, outside air intrusion in operating the turbo-molecular pump 301, the rotor shaft 3 can be controlled by the magnetic flux predicting signal $\phi$ without being brought into out of phase.

Although according to the embodiment described above, the motor portion 310 is constituted by the two permanent magnets fixedly attached to the rotor shaft 3 and the sixth electromagnets arranged at the surrounding (3 phases 2 poles), the embodiment is not limited thereto but may be constituted by permanent magnets and electromagnets having other numbers.

Further, although it is conceivable to attenuate vibration of the rotor shaft 303 when the permanent magnets 328 and 329 are braked by the direct current in starting by mechanical friction by using the protection bearings 306 and 307 without using the magnetic bearing portions 308, 312 and 320, it is necessary to constitute the circuit for stopping and braking by direct current, the magnetic bearing portions 308, 312 and 320, further, wear of the protection bearings 306 and 307 results and therefore, the attenuating operation is not preferable.

Further, although according to the embodiment, as the control circuit of the motor portion 310, the control circuit 325 is mounted with the control circuit 47 according to the ninth embodiment, the embodiment is not limited thereto but the control apparatus 325 can be mounted with the control apparatus (control circuit) according to the first embodiment through the eighth embodiment and the respective modified examples of the ninth embodiment. Further, when the control circuit 143 according to the third embodiment is used, the rotational number sensor 125 is attached to the vicinity of the rotor shaft 103. For example, there can be constructed a constitution in which a permanent magnet is attached to the lower end of the rotor shaft 303 as the target and the target is detected by a Hall sensor or the like.

Although according to the embodiment, there is pointed out the example of the turbo-molecular pump of the magnetic bearing type, the system of the bearing is not limited thereto but there may be constructed a constitution of using mechanical type bearing such as roller bearing or sliding bearing. As a sliding bearing, there may be used a static pressure bearing or a dynamic pressure bearing by gas or liquid.

(Eleventh Embodiment)

Figure 33:
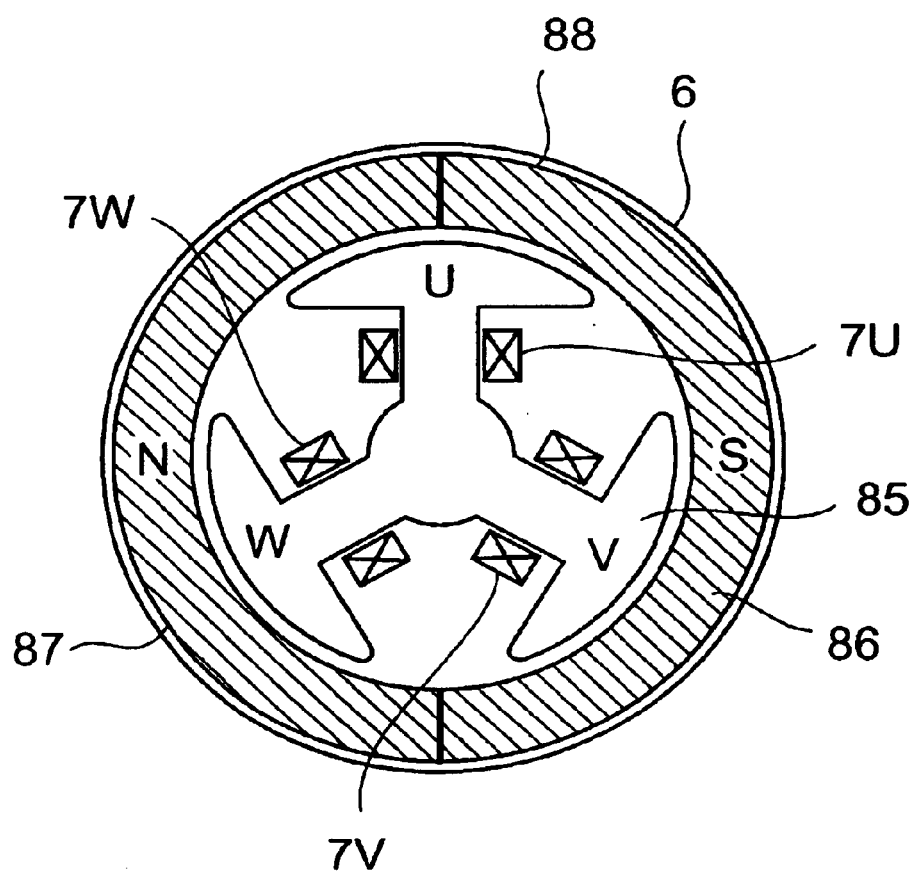
FIG. 33 is a view showing an example of a constitution of a motor of an outer rotor type.

According to the embodiment, the motor 5 is constituted by a motor of an outer rotor type. An explanation will be given of an example of a constitution of the motor 5 of the outer rotor type in reference to FIG. 33 as follows. Further, constitution and operation of the control circuit 47 are similar to those of the ninth embodiment and therefore, an explanation thereof will be omitted.

The rotor 6 is constituted by permanent magnets 86 and 87 a yoke 8 and a rotor shaft, not illustrated.

The yoke 88 is constituted by iron or the like formed in a cylindrical shape and the permanent magnets 86 and 87 are fixedly attached to an inner peripheral face thereof. According to the embodiment, the permanent magnets constitute two poles and respective inner peripheral face sides constitute S-pole on the side of the permanent magnet 86 and N-pole on the side of the permanent magnet 87.

Meanwhile, a stator is constituted by a stator core 85 and the motor windings 7U, 7V and 7W and so on. The stator core 85 is formed with magnetic poles of U-phase, V-phase and W-phase at every 120 degrees and the respective magnetic poles are wound with the motor windings 7U, 7V and 7W.

The motor 5 constituted in this way is operated as follows.

[Case of 2-phase Mode]

The microcomputer 30 (control circuit 47, refer to FIG. 11) makes ON/OFF the transistors 7b, 7c, 7e and 7f of the motor driving circuit 17 in synchronism with the ROT signal outputted from the comparator 4 and outputs the driving voltage vectors 3 and 5 alternately to the motor windings 7U, 7V and 7W. Thereby, the rotor 6 is rotated.

Further, when the driving voltage vector 3 is outputted, current flows in V→W direction and when the driving voltage vector 5 is outputted, current flows in W→U direction.

The microcomputer 30 nullifies the outputs of the multiplier 12 and the multiplier 10 by nullifying the inductance value signal Lp and the resistance value signal Rp.

[Case of 3-phase Mode]

The microcomputer 30 makes ON/OFF the transistors 7a, 7b, 7c, 7d, 7e and 7f of the motor driving circuit 17 in synchronism with the 12×f ROT signal outputted from the PLL circuit 16 and outputs the driving voltage vector 1 through the driving voltage vector 6 successively to the motor windings 7U, 7V and 7W. Thereby, the rotor 6 is rotated.

The microcomputer 30 makes the Rp signal setting circuit 14 and the Lp signal setting circuit respectively output the resistance value signal Rp and the inductance value signal Lp.

Although according to the above-described example, the motor 5 is driven by the control circuit 47 according to the ninth embodiment, the motor 5 can be driven by using the control apparatus according to the first embodiment through the eighth embodiment and the respective modified examples of the ninth embodiment. Among them, when the motor 5 is driven by the control circuit 143 according to the third embodiment, the rotational speed sensor 125 (FIG. 5) is installed to the motor 5.

Further, the motor 5 can be constituted by the motor according to the other embodiment such as a motor in which, for example, a number of poles of the stator coil is 6 and a number of poles of the rotor 6 is 6.

Further, although the motor 5 of the embodiment is a motor of a radial air gap type having an air gap in the radial direction, the motor 5 may be a motor of an axial air gap type having an air gap in the axial direction (direction of rotational shaft).

According to the control circuit of a brush-less motor of the invention described in claim 1 through claim 7, even at the low speed rotation of the rotor in which the PLL circuit cannot be locked, it is possible that the positions of the magnetic poles of the rotor are detected without using sensors, thereby, the driving voltage vectors are controlled by a feedback control and accordingly, a time period of starting the motor can be shortened. Further, even when the load of the motor is changed and the rotational number of the rotor is changed, the rotor can be made to follow the rotating magnetic field without being brought into out of phase, further, even when supply of power is recovered after interruption, it is not necessary to stop the rotor by direct current braking and starting can be continued.

According to the control circuit of the sensor-less brush-less motor of the invention described in claim a through claim 13, during a time period of driving the sensor-less brush-less motor, the positions of the magnetic poles of the rotor are always monitored and therefore, even when the rotational number of the rotor is significantly changed by load variation or the like, the rotor can stably be controlled without being brought into output of phase. Further, even when noises are superposed on the motor windings the noises can be removed by integrating the noises and therefore, positions of the magnetic poles of the rotor can accurately be detected.

Further, the control circuit of the sensor-less brush-less motor according to the invention automatically measures the synthesized resistance value Rp of the resistance values of the motor windings and the resistance values of cables connecting the motor and the motor windings and the inductance Lp of the motor windings and therefore, even when a cable length is changed or the motor is interchanged by other motor at a site of use, the sensor-less brush-less motor can immediately be used without measuring Rp and Lp again by using measuring instruments.

Further, according to the invention, the starting speed is fast and the brush-less motor can be operated stably.

What is claimed is:

1. A control circuit of a brush-less motor comprising:

a rotor having magnetic poles;

a plurality of motor windings including plural driving windings used for driving the rotor and a non-driving winding not used for driving the rotor, the non-driving winding comprising a fixed one of the motor windings;

rotor rotating means for rotating the rotor by making a current flow to the plural driving windings;

voltage acquiring means for acquiring a voltage induced in the non-driving winding in response to rotational movement of the rotor;

magnetic pole position acquiring means for acquiring magnetic pole positions of the magnetic poles from the voltage acquired by the voltage acquiring means;

current switching means for switching the current such that a direction of a magnetic field produced by the driving windings is changed in accordance with the magnetic pole positions acquired by the magnetic pole position acquiring means; and a motor drive system having a PLL circuit for generating a motor drive pulse when a rotational speed of the rotor exceeds a predetermined value.

2. A control circuit for a brush-less motor comprising:

a rotor having magnetic poles;

a plurality of motor windings for rotating the rotor by making currents flow to at least two of the plurality of motor windings which have equal phases and equal magnitudes of voltage drop caused by inductances of the motor windings voltage difference acquiring means for acquiring a difference between voltages supplied to the two motor windings having the equal phases and magnitudes of voltage drop;

magnetic pole position acquiring means for acquiring positions of the magnetic poles from the difference between the voltages acquired by the voltage difference acquiring means;

winding current switching means for switching the currents applied to the motor windings in accordance with the positions of the magnetic poles acquired by the magnetic pole position acquiring means;

an integrator for integrating the voltage difference acquired by the voltage difference acquiring means; and a direct current cut out filter for filtering out a direct current component of the voltage acquired by the voltage difference acquiring means.

3. A control circuit of a brush-less motor according to claim 1; further comprising an integrator for integrating the voltage acquired by the voltage acquiring means; and a direct current cut out filter for filtering out a direct current component of the voltage acquired by the voltage acquiring means.

4. A control circuit of a brush-less motor according to claim 1; wherein the current switching means switches the currents of the plurality of motor windings in accordance with the magnetic pole positions acquired by the magnetic pole position acquiring means when a rotational speed of the rotor is equal to or smaller than a predetermined value.

5. A control circuit of a brush-less motor according to claim 1; further comprising a sensor for detecting the magnetic pole positions of the rotor;

rotational speed detecting means for detecting a rotational speed of the rotor from the magnetic pole positions detected by the sensor;

rotational speed determining means for determining whether the rotational speed detected by the rotational speed detecting means is equal to or larger than a predetermined rotational speed;

wherein the current switch means switches the currents of the plurality of motor windings in accordance with the magnetic pole positions detected by the sensor when the rotational speed is equal to or larger than the predetermined rotational speed; and wherein the current switching means switches the currents of the motor windings in accordance with the magnetic pole positions acquired by the magnetic pole position acquiring means when the rotational speed is less than the predetermined rotational speed.

6. A control circuit of a brush-less motor according to claim 1; further comprising a magnetic bearing for supporting the rotor; wherein when a displacement signal of the magnetic bearing is sampled, the currents of the motor windings are cut off or the currents are not switched.

7. A control circuit of a brush-less motor according to claim 1; further comprising magnetic flux acquiring means for acquiring an interlinking magnetic flux of at least one of the motor windings from the voltage acquired by the voltage acquiring means; wherein the magnetic pole position acquiring means acquires positions of the magnetic poles from a change in the interlinking magnetic flux acquired by the magnetic flux acquiring means.

8. A control circuit of a brush-less motor according to claim 7; wherein the magnetic flux acquiring means comprises first acquiring means for acquiring an inter-cable voltage of a predetermined two of the motor windings;

second acquiring means for acquiring a voltage drop caused by a synthesized resistance comprised of resistance values of the two predetermined motor windings and resistance values of cables connecting a power supply apparatus constituting the current supplying means and the motor windings;

third acquiring means for acquiring a difference between the currents of the two predetermined motor windings multiplied by inductance values of the two predetermined motor windings;

integrated value acquiring means for subtracting a value acquired by the second acquiring means from a value acquired by the first acquiring means and integrating the subtraction result; and subtracting means for subtracting a value acquired by the third acquiring means from a value acquired by the integrated value acquiring means.

9. A control circuit of a brush-less motor according to claim 8; further comprising claim synthesized resistance acquiring means for acquiring a value of the synthesized resistance, comprising direct current supplying means for supplying a direct current to the two predetermined motor windings; and first calculating means for calculating the value of the synthesized resistance by dividing a value of the inter-cable voltage by a current value of the direct current.

10. A control circuit of a brush-less motor according to claim 8, further comprising inductance acquiring means for acquiring the inductance values of the two predetermined motor windings, the inductance value acquiring means comprising:

high frequency current supplying means for supplying high frequency currents to the two predetermined motor windings;

inter-cable voltage value acquiring means for acquiring the value of the inter-cable voltage of the two motor windings when the high frequency currents are supplied thereto; and second calculating means for acquiring a value of the inter-cable voltage value divided by the current values of the high frequency currents, frequencies of the high frequency currents and a predetermined constant.

11. A control circuit of a brush-less motor according to claim 8; further comprising inductance value acquiring means for acquiring the inductance values of the two predetermined motor windings, the inductance value acquiring means comprising:

rotor rotating means for rotating the rotor by switching the currents of the motor windings in an open loop manner without feedback control;

sampling means for sampling integrated values acquired by the integrated value acquiring means before and after switching the currents of the motor windings;

peak current value acquiring means for acquiring peak values of the currents supplied to the two predetermined motor windings; and third calculating means for dividing an absolute value of a difference between the integrated values before and after switching the currents acquired by the sampling means by the peak current values acquired by the peak current value acquiring means.

12. A control circuit of a brush-less motor according to claim 1 further comprising:

assumed magnetic flux acquiring means for acquiring interlinking magnetic fluxes of the two predetermined motor windings by using assumed values of the resistance values of the two predetermined motor windings and assumed values of the inductances of the two predetermined motor windings; and correcting means for correcting the assumed values of the resistance values and the assumed values of the inductances from inter-cable voltage values of the two predetermined motor windings when the rotor is rotated by a predetermined angular speed by the rotor rotating means, inter-cable voltages of the two predetermined motor windings when supply of currents to the motor windings is stopped and the rotor is run freely by the predetermined angular speed, a signal provided by the assumed magnetic flux acquiring means when supply of the currents is stopped, and a phase difference of the signal provided by the assumed magnetic flux acquiring means when the supply of the currents is restarted.

13. A control circuit of a sensor-less brush-less motor, comprising:

magnetic flux signal acquiring means for acquiring a magnetic flux signal by integrating a voltage difference between two predetermined phases existing in a plurality of motor windings used for rotating a rotor having magnetic poles with equal phases and equal magnitudes of voltage drop caused by inductances of the motor windings;

first drive timing acquiring means for acquiring a drive timing of a driving voltage vector constituting a portion of outputable driving voltage vectors from the magnetic flux signal acquired by the magnetic flux signal acquiring means;

first driving voltage vector outputting means for outputting the poriton of the driving voltage vector in synchronism with the drive timing acquired by the first drive timing acquiring means;

second drive timing acquiring means for acquiring output timings of the outputable driving voltage vectors by multiplying the timing provided from the magnetic flux signal acquired by the magnetic flux signal acquiring means;

second driving voltage vector outputting means for outputting the outputable driving voltage vectors in synchronism with the drive timing acquired by the second drive timing acquiring means; and selecting means for selecting the first driving voltage vector outputting means and the second driving voltage vector outputting means.

14. A control circuit of sensor-less brush-less motor comprising:

current supplying means for supplying currents to a plurality of motor windings for rotating a rotor having magnetic poles;

inter-cable voltage acquiring means for acquiring an inter-cable voltage of two predetermined motor windings of the plurality of motor windings which have equal phases and equal magnitudes of voltage drop caused by inductances of the motor windings;

resistance amount correcting means for correcting a change of a voltage caused by a synthesized resistance comprised of resistances of the two predetermined motor windings and resistances of connection cables connecting a power supply apparatus constituting the current supplying means and the motor windings from the inter-cable voltage acquired by the inter-cable voltage acquiring means;

magnetic flux signal acquiring means for acquiring a magnetic flux signal by integrating the inter-cable voltage corrected by the resistance amount correcting means;

reactance amount correcting means for correcting a change amount caused by reactances of the two predetermined motor windings in the magnetic flux signal acquired by the magnetic flux signal acquiring means; and correction nullifying means for nullifying at least a reactance amount correcting means contained in the resistance amount correcting means and the reactance amount correcting means to prevent the nullified reactance amount correcting means from correcting the magnetic flux signal;

wherein when a rotational speed of the rotor is equal to or smaller than a predetermined rotation speed, at least the reactance amount correcting means is nullified by the correction nullifying means and the current supplying means supplies the currents to the two predetermined motor windings in accordance with a first mode of operation by switching the currents flowing in the two predetermined motor windings based on the positions of the magnetic poles acquired by the magnetic pole position acquiring means; and wherein when the rotational speed of the rotor is larger than the predetermined rotation speed, the currents are supplied to the motor windings in accordance with a second mode of operation by switching the currents of the motor windings based on the positions of the magnetic poles acquired by a magnetic pole position detecting means without using the correction nullifying means.

15. A control circuit of a sensor-less brush-less motor according to claim 14; wherein the current supplying means makes small currents flow in the plurality of motor windings in accordance with a predetermined order during a predetermined time period when the mode of operation is switched from the first mode to the second mode.

16. A control circuit of a sensor-less brush-less motor accoridng to claim 14; further comprising direct current cutting means for switching a first cutoff frequency and a second cutoff frequency larger than the first cutoff frequency for removing a direct current component superposed on the magnetic flux signal; and switching means for switching the first cutoff frequency and the second cutoff frequency of the direct current cutting means.

17. A control circuit of a sensor-less brush-less motor according to claim 16; wherein the switching means sets the cutoff frequency of the direct current cutting means to the first cutoff frequency during a predetermined time period from when the rotor is started and switches the cutoff frequency of the direct current cutting means to the second frequency when the predetermined time period has elapsed.

18. A sensor-less brush-less motor apparatus comprising:

a rotor having magnetic poles;

a plurality of motor windings for rotating the rotor;

magnetic flux signal acquiring means for acquiring a magnetic flux signal by integrating a voltage difference between predetermined two phases in the plurality of motor windings in which phases and magnitudes of voltage drop by inductances of the motor windings are equal to each other;

first drive timing acquiring means for acquiring a drive timing of a driving voltage vector constituting a portion of outputable driving voltage vectors form the magnetic flux signal acquired by the magnetic flux signal acquiring means;

first driving voltage vector outputting means for outputting the portion of the driving voltage vector in synchronism with the drive timing acquired by the first drive timing acquiring means;

second drive timing acquiring means for acquiring output timings of the outputable driving voltage vectors by multiplying the timing provided from the magnetic flux signal acquired by the magnetic flux signal acquiring means; second driving voltage vector outputting means for outputting the outputable driving voltage vectors in synchronism with the drive timings acquired by the second drive timing acquiring means; and selecting means for selecting the first driving voltage vector outputting means and the second driving voltage vector outputting means.

19. A vacuum pump apparatus comprising:

an exterior member having an intake port and an exhaust port;

a rotor axially supported rotatably by a magnetic bearing or a mechanical type bearing at an inside of the exterior member;

a motor for rotating the rotor; and a stator arranged at the inside of the exterior member;

wherein the motor comprises the brush-less motor apparatus according to claim 18.

20. A control circuit of a brush-less motor according to claim 2; wherein when a rotational speed of the rotor is equal to or smaller than a predetermined value, the currents of the plurality of motor windings are switched in accordance with the magnetic pole positions acquired by the magnetic pole position acquiring means.

* * * * *